US012701339B2

(12) United States Patent
Yoshita et al.

(10) Patent No.: US 12,701,339 B2
(45) Date of Patent: Aug. 4, 2026

(54) SOLID-STATE IMAGING ELEMENT, IMAGING DEVICE, AND METHOD FOR CONTROLLING SOLID-STATE IMAGING ELEMENT

(71) Applicant: SONY SEMICONDUCTOR SOLUTIONS CORPORATION, Kanagawa (JP)

(72) Inventors: Ryoto Yoshita, Kanagawa (JP); Luonghung Asakura, Kanagawa (JP); Yoshiaki Inada, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 150 days.

(21) Appl. No.: 18/699,435

(22) PCT Filed: Aug. 22, 2022

(86) PCT No.: PCT/JP2022/031480
§ 371 (c)(1),
(2) Date: Apr. 8, 2024

(87) PCT Pub. No.: WO2023/062940
PCT Pub. Date: Apr. 20, 2023

(65) Prior Publication Data
US 2024/0414451 A1     Dec. 12, 2024

(30) Foreign Application Priority Data
Oct. 15, 2021     (JP) ................................. 2021-169352

(51) Int. Cl.
*H04N 25/65* (2023.01)
*H04N 25/532* (2023.01)
(Continued)

(52) U.S. Cl.
CPC ........... *H04N 25/65* (2023.01); *H04N 25/532* (2023.01); *H04N 25/703* (2023.01);
(Continued)

(58) Field of Classification Search
CPC .... H04N 25/65; H04N 25/532; H04N 25/703; H04N 25/771; H04N 25/78; H04N 25/79; H04N 25/59
See application file for complete search history.

(56) References Cited

U.S. PATENT DOCUMENTS 8,896,733 B2 * 11/2014 Solhusvik .............. H04N 25/59
                                                           348/242
2021/0099659 A1 * 4/2021 Miyauchi ............. H04N 25/583
(Continued)

FOREIGN PATENT DOCUMENTS

JP      2016-127593 A      7/2016
JP      2016-219857 A      12/2016
JP      2019-057873 A      4/2019

OTHER PUBLICATIONS

International Search Report and Written Opinion of PCT Application No. PCT/JP2022/031480, issued on Sep. 27, 2022, 09 pages of ISRWO.
(Continued)

*Primary Examiner* — Albert H Cutler
(74) *Attorney, Agent, or Firm* — CHIP LAW GROUP

(57)     ABSTRACT

The present invention improves image quality while preventing a decrease in frame rate in a solid-state imaging element in which all pixels are exposed simultaneously. The solid-state imaging element includes a comparison unit, a pre-stage circuit, a capacitor unit, and a post-stage circuit. The comparison unit compares a signal level corresponding to an exposure amount with a predetermined threshold and outputs a comparison result. The pre-stage circuit converts charges into a voltage at a conversion efficiency selected
(Continued)

from among a plurality of different conversion efficiencies on the basis of the comparison result and outputs the voltage. The capacitor unit holds the voltage. The post-stage circuit reads the voltage thus held and outputs the voltage to a vertical signal line.

17 Claims, 49 Drawing Sheets

(51) Int. Cl.
| | | |
|---|---|---|
| *H04N 25/703* | (2023.01) | |
| *H04N 25/771* | (2023.01) | |
| *H04N 25/78* | (2023.01) | |
| *H04N 25/79* | (2023.01) | |

(52) U.S. Cl.
CPC ........... *H04N 25/771* (2023.01); *H04N 25/78* (2023.01); *H04N 25/79* (2023.01)

(56) References Cited

U.S. PATENT DOCUMENTS

| | | | | |
|---|---|---|---|---|
| 2021/0384237 A1* | 12/2021 | Yamakawa | .......... | H04N 25/766 |
| 2021/0400220 A1* | 12/2021 | Jung | .................... | H04N 25/771 |

OTHER PUBLICATIONS

Park, et al., "A 2.2μm stacked back side illuminated voltage domain global shutter CMOS image sensor", International Electron Devices Meeting (IEDM), Dec. 7-11, 2019.

\* cited by examiner

*FIG. 38*

| OPERATION | NOISE | RN ( $\mu$ Vrms) | | REMARKS |
|---|---|---|---|---|
| | | FIRST EMBODIMENT | SEVENTH EMBODIMENT | |
| GLOBAL SHUTTER | PIXEL kTC NOISE | 450 | 450 | SH CAPACITANCE 50fF |
| SEQUENTIAL READING | NOISE IN PRE-STAGE SF | 380 | 0 | — |
| | NOISE IN POST-STAGE SF AND SUBSEQUENT STAGES | 160 | 160 | INCLUDE ADC NOISE |
| TOTAL | | 610 | 478 | — |

SOLID-STATE IMAGING ELEMENT, IMAGING DEVICE, AND METHOD FOR CONTROLLING SOLID-STATE IMAGING ELEMENT

CROSS REFERENCE TO RELATED APPLICATIONS

This application is a U.S. National Phase of International Patent Application No. PCT/JP2022/031480 filed on Aug. 22, 2022, which claims priority benefit of Japanese Patent Application No. JP 2021-169352 filed in the Japan Patent Office on Oct. 15, 2021. Each of the above-referenced applications is hereby incorporated herein by reference in its entirety.

TECHNICAL FIELD

The present technology relates to a solid-state imaging element. More specifically, the present technology relates to a solid-state imaging element of a voltage domain system, an imaging device, and a method for controlling a solid-state imaging element.

BACKGROUND ART

A global shutter complementary MOS (CMOS) image sensor of a voltage domain system that converts signal charges into a voltage and holds the voltage has attracted attention. Such a sensor is hereinafter referred to as "VD.GS". There is a possibility that the VD.GS suffers an increase in kTC noise, so that a configuration where a sample and hold circuit including a pair of capacitor elements is provided for each pixel has been proposed (see, for example, Non-Patent Document 1).

CITATION LIST

Non-Patent Document

Non-Patent Document 1: Geunsook Park, et al., A 2.2 μm stacked back side illuminated voltage domain global shutter CMOS image sensor, IEDM 2019.

SUMMARY OF THE INVENTION

Problems to be Solved by the Invention

The known technology described above causes the sample and hold circuit to hold the voltage, so as to reduce the kTC noise in the VD.GS. It is, however, required for the above-described solid-state imaging element to increase, in a case where conversion efficiency at which charges are converted into a voltage is switched in a plurality of levels, the number of capacitor elements in the sample and hold circuit as the number of levels of conversion efficiency increases. In a case where pixels are of uniform area, when the number of capacitor elements is increased, the capacitance value of each of the capacitor elements becomes smaller, and image quality deteriorates due to dark current noise or deterioration of signal-noise (SN) characteristics. Furthermore, the larger the number of conversion efficiency levels, the larger the number of times of holding by the capacitor elements, thereby causing a decrease in frame rate. As described above, it is difficult for the solid-state imaging element to improve image quality while suppressing a decrease in frame rate.

The present technology has been made in view of such circumstances, and it is therefore an object of the present technology to improve image quality while suppressing a decrease in frame rate for a solid-state imaging element in which all pixels are exposed simultaneously.

Solutions to Problems

The present technology has been made to solve the above-described problems, and according to a first aspect of the present technology, provided are a solid-state imaging element and a method for controlling the solid-state imaging element, the solid-state imaging element including: a comparison unit configured to compare a signal level corresponding to an exposure amount with a predetermined threshold and output a comparison result; a pre-stage circuit configured to convert charges into a voltage at a conversion efficiency selected from among a plurality of different conversion efficiencies on the basis of the comparison result and output the voltage; a capacitor unit configured to hold the voltage; and a post-stage circuit configured to read the voltage held and output the voltage to a vertical signal line. This brings about an effect of suppressing an increase in the number of capacitor elements when the conversion efficiency is switched.

Furthermore, in the first aspect, the pre-stage circuit may select one of first and second conversion efficiencies, and the comparison unit may include a comparator configured to compare the signal level with the threshold. This brings about an effect of controlling the conversion efficiency in two levels.

Furthermore, in the first aspect, the pre-stage circuit may select one of first, second, and third conversion efficiencies, the threshold may include first and second thresholds different from each other, and the comparison unit may include: a first comparator configured to compare the signal level with the first threshold; and a second comparator configured to compare the signal level with the second threshold. This brings about an effect of controlling the conversion efficiency in three levels.

Furthermore, in the first aspect, the voltage may be either a predetermined reset level or the signal level, and the comparison unit may compare the signal level output through the vertical signal line with the threshold. This brings about an effect of comparing the held signal level with the threshold.

Furthermore, in the first aspect, the voltage may be either a predetermined reset level or the signal level, and the comparison unit may compare the signal level output from the pre-stage circuit with the threshold. This brings about an effect of increasing a reading speed.

Furthermore, in the first aspect, the pre-stage circuit may include: a photoelectric conversion element configured to generate the charges by photoelectric conversion; and a pre-stage transfer transistor configured to transfer the charges from the photoelectric conversion element to a floating diffusion layer. This brings about an effect of converting charges into a voltage.

Furthermore, in the first aspect, the pre-stage circuit may further include: an additional capacitor; and a conversion efficiency control transistor configured to open and close a path between the floating diffusion layer and the additional capacitor on the basis of the comparison result. This brings about an effect of controlling the conversion efficiency in two levels.

Furthermore, in the first aspect, the comparison result may include first and second comparison results, and the pre-stage circuit may further include: an additional capacitor; a second conversion efficiency control transistor configured to open and close a path between the floating diffusion layer and a predetermined node on the basis of the second comparison result; and a first conversion efficiency control transistor configured to open and close a path between the predetermined node and the additional capacitor on the basis of the first comparison result. This brings about an effect of controlling the conversion efficiency in three levels.

Furthermore, in the first aspect, the capacitor unit may include first and second capacitor elements. This brings about an effect of holding the reset level and the signal level.

Furthermore, in the first aspect, a selection circuit configured to sequentially perform control to connect one of the first and second capacitor elements to a predetermined post-stage node, control to disconnect both of the first and second capacitor elements from the post-stage node, and control to connect another of the first and second capacitor elements to the post-stage node, and a post-stage reset transistor configured to initialize a level of the post-stage node when both of the first and second capacitor elements are disconnected from the post-stage node may be further included, in which the post-stage circuit may read, via the post-stage node, the voltage held. This configuration brings about an effect of reducing kTC noise.

Furthermore, in the first aspect, the pre-stage circuit may include: a photoelectric conversion element; a pre-stage transfer transistor configured to transfer charges from the photoelectric conversion element to a floating diffusion layer; a first reset transistor configured to initialize the floating diffusion layer; and a pre-stage amplification transistor configured to amplify a voltage of the floating diffusion layer and output the voltage to a predetermined pre-stage node, and the first and second capacitor elements may have their respective one ends commonly connected to the pre-stage node and have their respective other ends connected to the selection circuit. This brings about an effect of supplying the signal corresponding to the potential of the floating diffusion layer to the pre-stage node.

Furthermore, in the first aspect, a switching unit configured to adjust a source voltage to be supplied to a source of the pre-stage amplification transistor may be further included, in which the pre-stage circuit may further include a current source transistor connected to a drain of the pre-stage amplification transistor, and the current source transistor may shift from an on state to an off state after an end of an exposure period. This brings about an effect of bringing the pre-stage source follower into the off state at the time of reading.

Furthermore, in the first aspect, the switching unit may supply a predetermined power supply voltage as the source voltage during the exposure period, and supply a generated voltage different from the power supply voltage as the source voltage after the end of the exposure period. This brings about an effect of adjusting the source voltage of the pre-stage source follower.

Furthermore, in the first aspect, a control circuit configured to control a reset power supply voltage of the pre-stage circuit may be further included, in which the first reset transistor may initialize the voltage of the floating diffusion layer to the reset power supply voltage, and the control circuit may set, during a read period in which the reset level and the signal level are read, the reset power supply voltage different from the voltage during the exposure period. This configuration brings about an effect of facilitating pixel miniaturization.

Furthermore, in the first aspect, the pre-stage circuit may be provided in a first chip, and the capacitor unit and the post-stage circuit may be provided in a second chip. This configuration brings about an effect of facilitating pixel miniaturization.

Furthermore, in the first aspect, an analog to digital converter configured to sequentially convert the voltage output through the vertical signal line into a digital signal may be further included, in which the analog to digital converter may be provided in the second chip. This configuration brings about an effect of facilitating pixel miniaturization.

Furthermore, in the first aspect, an analog to digital converter configured to sequentially convert the voltage output through the vertical signal line into a digital signal may be further included, in which the analog to digital converter may be provided in a third chip. This configuration brings about an effect of facilitating pixel miniaturization.

Furthermore, according to a second aspect of the present technology, provided is an imaging device including: a comparison unit configured to compare a signal level corresponding to an exposure amount with a predetermined threshold and output a comparison result; a pre-stage circuit configured to convert charges into a voltage at a conversion efficiency selected from among a plurality of different conversion efficiencies on the basis of the comparison result and output the voltage; a capacitor unit configured to hold the voltage; a post-stage circuit configured to read the voltage held and output the voltage as a pixel signal to a vertical signal line; and a signal processing circuit configured to perform predetermined signal processing on the pixel signal. This brings about an effect of suppressing an increase in the number of capacitor elements when the conversion efficiency is switched in the imaging device.

BRIEF DESCRIPTION OF DRAWINGS

FIG. 38 is a diagram for describing effects according to the seventh embodiment of the present technology.

FIG. 44 is a circuit diagram depicting a configuration example of the pixel according to the second comparative example with three levels of conversion efficiency.

FIG. 48 is a block diagram depicting a schematic configuration example of a vehicle control system.

MODE FOR CARRYING OUT THE INVENTION

Modes for carrying out the present technology (hereinafter referred to as embodiments) will be described below. The description will be given in the following order.

1. First embodiment (example where first and second capacitor elements are caused to hold pixel signal)
2. Second embodiment (example where discharge transistor is added and first and second capacitor elements are caused to hold pixel signal)
3. Third embodiment (example where first and second capacitor elements are caused to hold pixel signal and reset power supply voltage is controlled)

4. Fourth embodiment (example where first and second capacitor elements are caused to hold pixel signal and a level to be held is changed for each frame)
5. Fifth embodiment (example where first and second capacitor elements are caused to hold pixel signal and black spot phenomenon is suppressed)
6. Sixth embodiment (example where first and second capacitor elements are caused to hold pixel signal and rolling shutter operation is performed)
7. Seventh embodiment (example where first and second capacitor elements are caused to hold pixel signal and pre-stage source follower is brought into off state at the time of reading)
8. Eighth embodiment (example where conversion efficiency is switched in two levels on the basis of comparison result)
9. Ninth embodiment (example where conversion efficiency is switched in three levels on the basis of comparison result)
10. Tenth embodiment (example where conversion efficiency is switched on the basis of comparison result between signal level before being held and threshold)
11. Example of application to mobile body

1. First Embodiment

[Configuration Example of Imaging Device]

Figure 1:
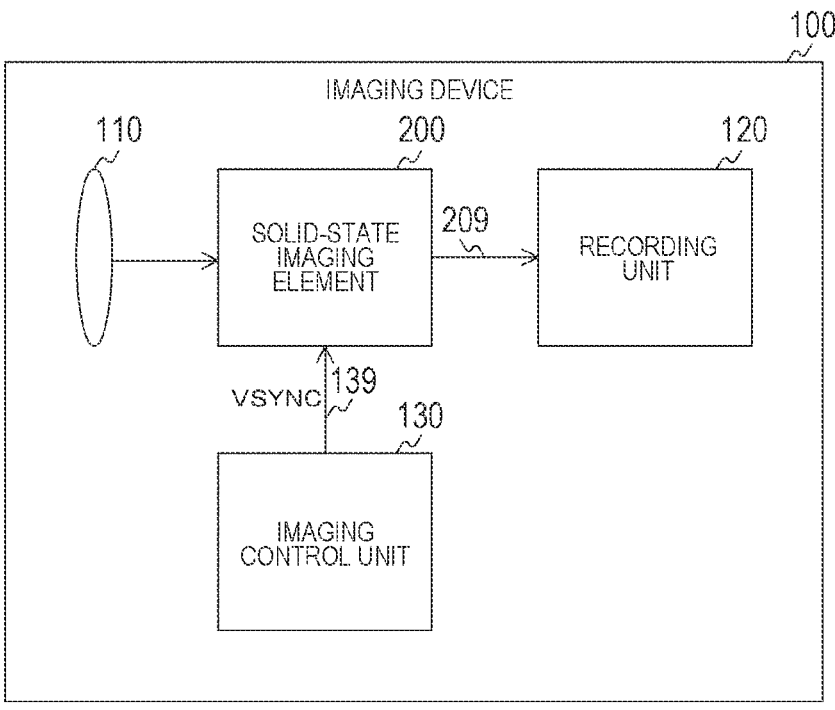
FIG. 1 is a block diagram depicting a configuration example of an imaging device according to a first embodiment of the present technology.

FIG. 1 is a block diagram depicting a configuration example of an imaging device 100 according to a first embodiment of the present technology. The imaging device 100 is a device that captures image data, and includes an imaging lens 110, a solid-state imaging element 200, a recording unit 120, and an imaging control unit 130. As the imaging device 100, a digital camera, and an electronic device (a smartphone, a personal computer, or the like) having an imaging function are assumed.

The solid-state imaging element 200 captures the image data under control of the imaging control unit 130. The solid-state imaging element 200 supplies the image data to the recording unit 120 via a signal line 209.

The imaging lens 110 condenses light and guides the light to the solid-state imaging element 200. The imaging control unit 130 controls the solid-state imaging element 200 to capture the image data. For example, the imaging control unit 130 supplies an imaging control signal including a vertical synchronization signal VSYNC to the solid-state imaging element 200 via a signal line 139. The recording unit 120 records the image data.

Here, the vertical synchronization signal VSYNC is a signal indicating imaging timing, and a periodic signal of a constant frequency (such as 60 hertz) is used as the vertical synchronization signal VSYNC.

Note that although the imaging device 100 records the image data, the image data may be transmitted to the outside of the imaging device 100. In this case, an external interface for transmitting the image data is further provided. Alternatively, the imaging device 100 may further display the image data. In this case, a display unit is further provided.

[Configuration Example of Solid-State Imaging Element]

Figure 2:
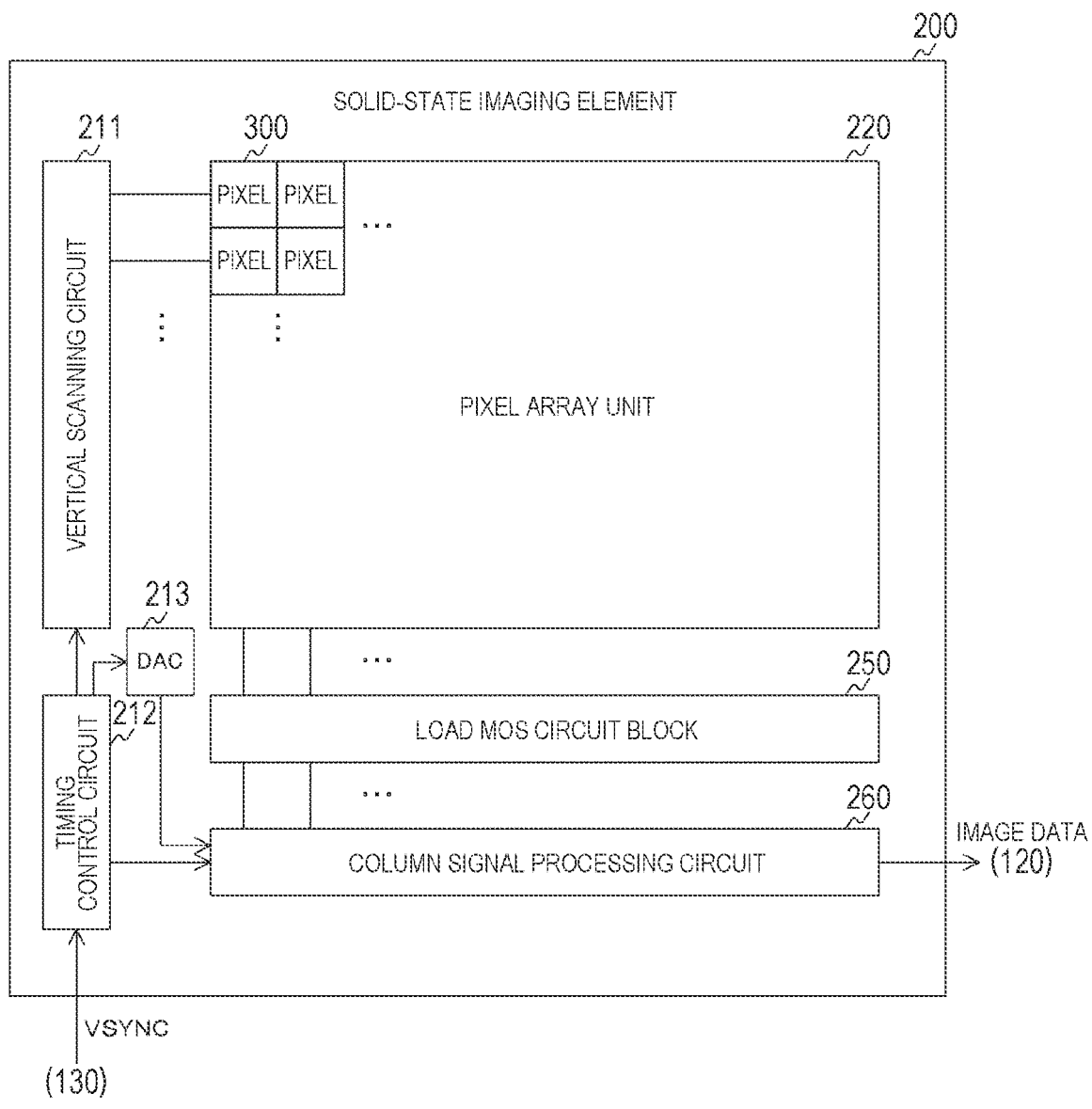
FIG. 2 is a block diagram depicting a configuration example of a solid-state imaging element according to the first embodiment of the present technology.

FIG. 2 is a block diagram depicting a configuration example of the solid-state imaging element 200 according to the first embodiment of the present technology. The solid-state imaging element 200 includes a vertical scanning circuit 211, a pixel array unit 220, a timing control circuit 212, a digital to analog converter (DAC) 213, a load MOS circuit block 250, and a column signal processing circuit 260. In the pixel array unit 220, a plurality of pixels 300 is arranged in a two-dimensional grid pattern. Furthermore, each circuit in the solid-state imaging element 200 is provided in, for example, a single semiconductor chip.

Hereinafter, a set of pixels 300 arranged in a horizontal direction is referred to as "row", and a set of pixels 300 arranged in a direction perpendicular to the row is referred to as "column".

The timing control circuit 212 controls operation timing of each of the vertical scanning circuit 211, the DAC 213, and the column signal processing circuit 260 in synchronization with the vertical synchronization signal VSYNC from the imaging control unit 130.

The DAC 213 generates a sawtooth wave-like ramp signal by digital to analog (DA) conversion. The DAC 213 supplies the generated ramp signal to the column signal processing circuit 260.

The vertical scanning circuit 211 sequentially selects and drives rows to output analog pixel signals. The pixel 300 photoelectrically converts incident light to generate the analog pixel signal. This pixel 300 supplies the pixel signal to the column signal processing circuit 260 via the load MOS circuit block 250.

In the load MOS circuit block 250, a MOS transistor that supplies a constant current is provided for each column.

The column signal processing circuit 260 performs signal processing such as AD conversion processing or CDS processing on the pixel signal for each column. The column signal processing circuit 260 supplies the image data including the processed signals to the recording unit 120. Note that the column signal processing circuit 260 is an example of a signal processing circuit described in the claims.

[Configuration Example of Pixel]

Figure 3:
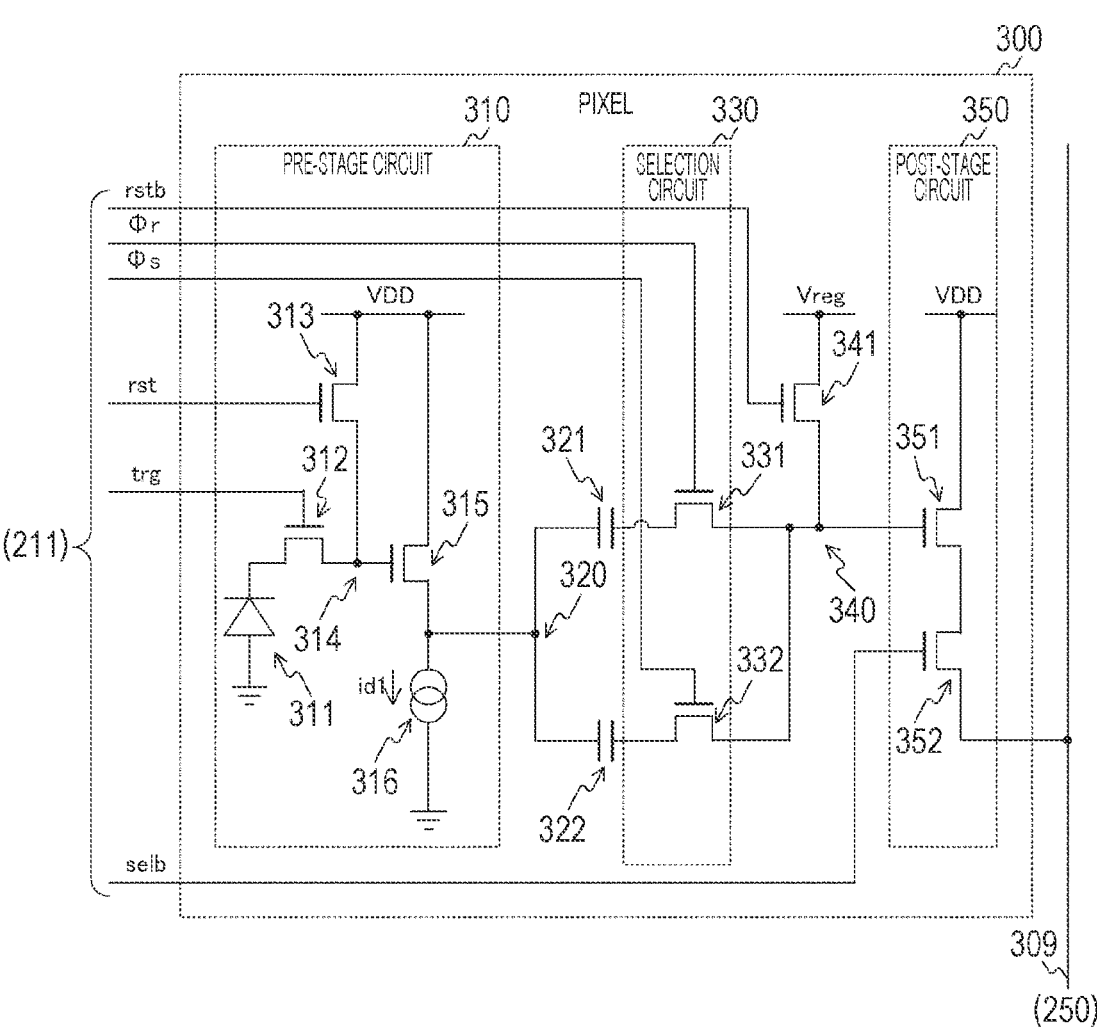
FIG. 3 is a circuit diagram depicting a configuration example of a pixel according to the first embodiment of the present technology.

FIG. 3 is a circuit diagram depicting a configuration example of the pixel 300 according to the first embodiment of the present technology. The pixel 300 includes a pre-stage circuit 310, capacitor elements 321 and 322, a selection circuit 330, a post-stage reset transistor 341, and a post-stage circuit 350.

The pre-stage circuit 310 includes a photoelectric conversion element 311, a transfer transistor 312, a floating diffusion (FD) reset transistor 313, an FD 314, a pre-stage amplification transistor 315, and a current source transistor 316.

The photoelectric conversion element 311 generates charges by the photoelectric conversion. The transfer transistor 312 transfers the charges from the photoelectric conversion element 311 to the FD 314 in accordance with a transfer signal trg from the vertical scanning circuit 211.

The FD reset transistor 313 extracts the charges from the FD 314 to initialize the FD 314 in accordance with an FD reset signal rst from the vertical scanning circuit 211. The FD 314 accumulates charges, and generates a voltage corresponding to a charge amount. The pre-stage amplification transistor 315 amplifies a level of a voltage of the FD 314, and outputs the amplified voltage to a pre-stage node 320. Note that the FD reset transistor 313 is an example of a first reset transistor described in the claims. Furthermore, the pre-stage amplification transistor 315 is an example of a first amplification transistor described in the claims.

Furthermore, the FD reset transistor 313 and the pre-stage amplification transistor 315 have their respective sources connected to a power supply voltage VDD. The current source transistor 316 is connected to a drain of the pre-stage amplification transistor 315. The current source transistor 316 supplies a current id1 under the control of the vertical scanning circuit 211.

The capacitor elements 321 and 322 have their respective one ends commonly connected to the pre-stage node 320 and have their respective other ends connected to the selection circuit 330. Note that the capacitor elements 321 and 322 are examples of first and second capacitor elements described in the claims.

The selection circuit 330 includes a selection transistor 331 and a selection transistor 332. The selection transistor 331 opens and closes a path between the capacitor element 321 and a post-stage node 340 in accordance with a selection signal Φr from the vertical scanning circuit 211. The selection transistor 332 opens and closes a path between the capacitor element 322 and the post-stage node 340 in accordance with a selection signal Φs from the vertical scanning circuit 211.

The post-stage reset transistor 341 initializes a level of the post-stage node 340 to a predetermined potential Vreg in accordance with a post-stage reset signal rstb from the vertical scanning circuit 211. A potential different from the power supply potential VDD (for example, a potential lower than VDD) is set as the potential Vreg.

The post-stage circuit 350 includes a post-stage amplification transistor 351, and a post-stage selection transistor 352. The post-stage amplification transistor 351 amplifies the level of the post-stage node 340. The post-stage selection transistor 352 outputs a signal at the level amplified by the post-stage amplification transistor 351 to a vertical signal line 309 as a pixel signal in accordance with a post-stage selection signal selb from the vertical scanning circuit 211.

Note that, for example, n-channel metal oxide semiconductor (nMOS) transistors are used as various transistors (transfer transistor 312 and the like) in the pixel 300.

The vertical scanning circuit 211 supplies a high-level FD reset signal rst and a high-level transfer signal trg to all the pixels at the start of exposure. Therefore, the photoelectric conversion element 311 is initialized. Hereinafter, this control is referred to as "PD reset".

Then, the vertical scanning circuit 211 supplies the high-level FD reset signal rst over a pulse period while setting the post-stage reset signal rstb and the selection signal Φr to the high level for all the pixels immediately before the end of exposure. Therefore, the FD 314 is initialized, and a level corresponding to the level of the FD 314 at that time is held in the capacitor element 321. This control is hereinafter referred to as "FD reset".

The level of the FD 314 at the time of FD reset and a level corresponding to the level of the FD 314 (the level held in the capacitor element 321 and the level of the vertical signal line 309) are hereinafter collectively referred to as "P-phase" or "reset level".

At the end of exposure, the vertical scanning circuit 211 supplies the high-level transfer signal trg over the pulse period while setting the post-stage reset signal rstb and the selection signal Φs to the high level for all the pixels. Therefore, signal charges corresponding to an exposure amount are transferred to the FD 314, and a level corresponding to the level of the FD 314 at that time is held in the capacitor element 322.

The level of the FD 314 at the time of signal charge transfer and a level corresponding to the level of the FD 314 (the level held in the capacitor element 322 and the level of the vertical signal line 309) are hereinafter collectively referred to as "D-phase" or "signal level".

The exposure control of simultaneously starting and ending the exposure for all the pixels in this manner is called a global shutter method. Under this exposure control, the pre-stage circuits 310 of all the pixels sequentially generate the reset level and the signal level. The reset level is held in the capacitor element 321, and the signal level is held in the capacitor element 322.

After the end of exposure, the vertical scanning circuit 211 sequentially selects a row, and sequentially outputs the reset level and the signal level of the row. In a case of outputting the reset level, the vertical scanning circuit 211 supplies the high-level selection signal Φr over a predetermined period while setting the FD reset signal rst and the post-stage selection signal selb of the selected row to the high level. Therefore, the capacitor element 321 is connected to the post-stage node 340, and the reset level is read.

After reading the reset level, the vertical scanning circuit 211 supplies the high-level post-stage reset signal rstb over the pulse period while keeping the FD reset signal rst and the post-stage selection signal selb of the selected row at the high level. Therefore, the level of the post-stage node 340 is initialized. At this time, both the selection transistor 331 and the selection transistor 332 are in an open state, and the capacitor elements 321 and 322 are disconnected from the post-stage node 340.

After the initialization of the post-stage node 340, the vertical scanning circuit 211 supplies the high-level selection signal Φs over a predetermined period while keeping the FD reset signal rst and the post-stage selection signal selb of the selected row at the high level. Therefore, the capacitor element 322 is connected to the post-stage node 340, and the signal level is read.

Under the above-described read control, the selection circuit 330 of the selected row sequentially performs control to connect the capacitor element 321 to the post-stage node 340, control to disconnect the capacitor elements 321 and 322 from the post-stage node 340, and control to connect the capacitor element 322 to the post-stage node 340. Furthermore, when the capacitor elements 321 and 322 are disconnected from the post-stage node 340, the post-stage reset transistor 341 of the selected row initializes the level of the post-stage node 340. Furthermore, the post-stage circuit 350 of the selected row sequentially read the reset level and the signal level from the capacitor elements 321 and 322 via the post-stage node 340, and output the reset level and the signal level to the vertical signal line 309.

[Configuration Example of Column Signal Processing Circuit]

Figure 4:
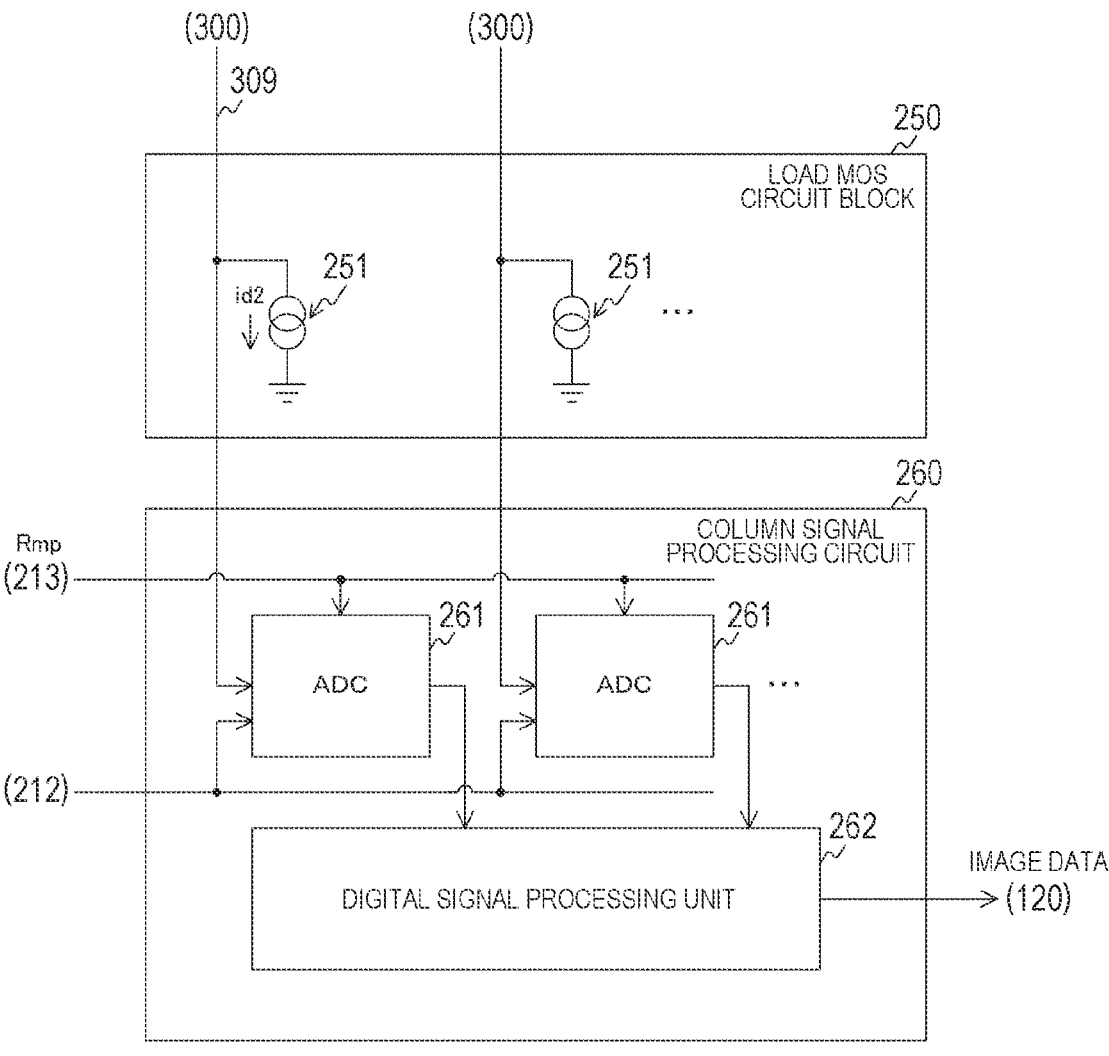
FIG. 4 is a block diagram depicting a configuration example of a column signal processing circuit and a load MOS circuit block according to the first embodiment of the present technology.

FIG. 4 is a block diagram depicting a configuration example of the load MOS circuit block 250 and the column signal processing circuit 260 according to the first embodiment of the present technology.

In the load MOS circuit block 250, the vertical signal line 309 is wired for each column. In a case where the number of columns is I (I is an integer), I vertical signal lines 309 are wired. Furthermore, a load MOS transistor 251 that supplies a constant current id2 is connected to each of the vertical signal lines 309.

In the column signal processing circuit 260, a plurality of ADCs 261 and a digital signal processing unit 262 are arranged. The ADC 261 is arranged for each column. In a case where the number of columns is I, I ADCs 261 are arranged.

The ADC 261 converts an analog pixel signal from the corresponding column into a digital signal using a ramp signal Rmp from the DAC 213. The ADC 261 supplies the digital signal to the digital signal processing unit 262. For example, a single-slope ADC including a comparator and a counter is arranged as the ADC 261.

The digital signal processing unit 262 performs predetermined signal processing such as CDS processing on the digital signal for each column. The digital signal processing unit 262 supplies image data including the processed digital signals to the recording unit 120.

[Operation Example of Solid-State Imaging Element]

Figure 5:
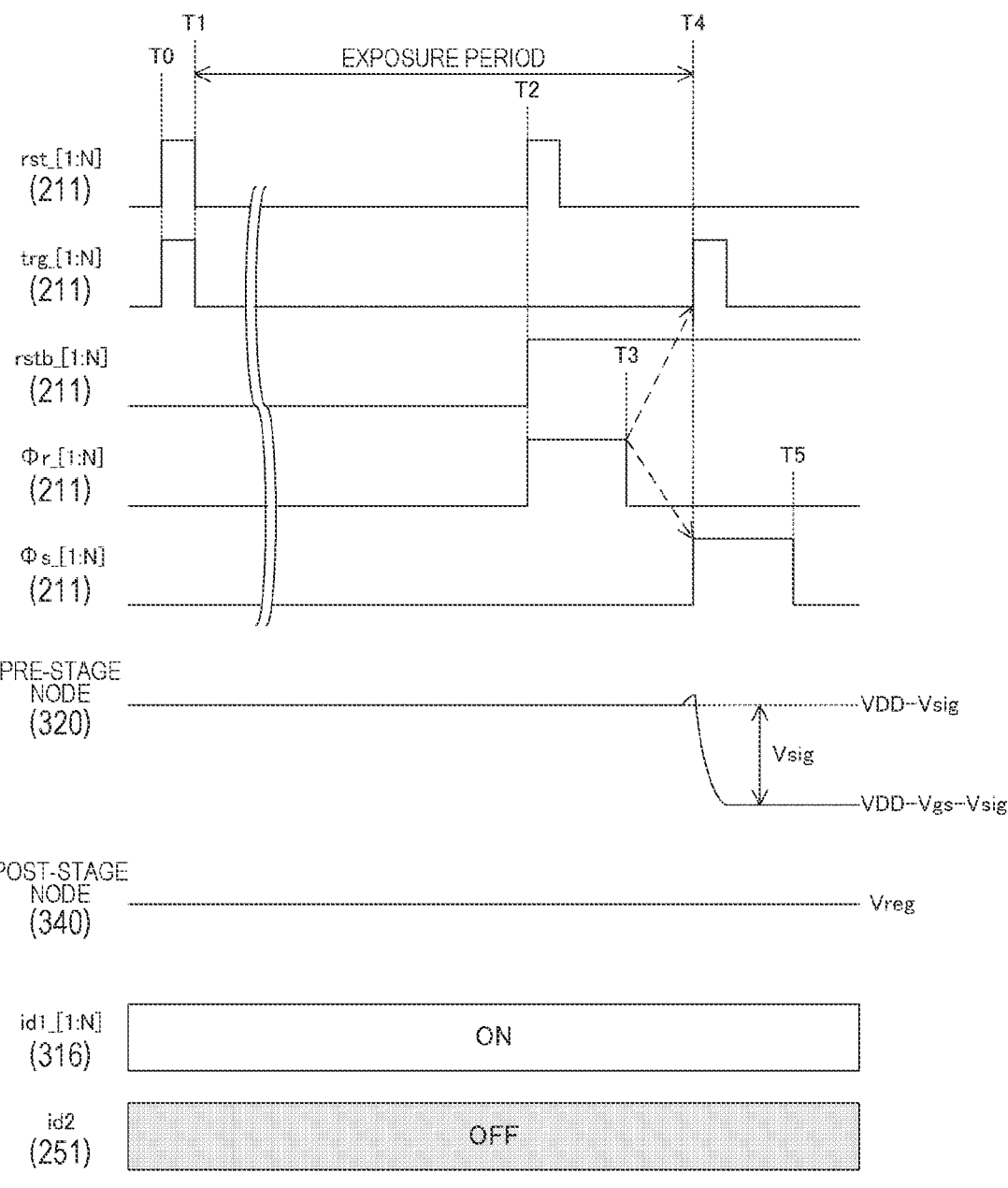
FIG. 5 is a timing chart depicting an example of a global shutter operation according to the first embodiment of the present technology.

FIG. 5 is a timing chart depicting an example of a global shutter operation according to the first embodiment of the present technology. The vertical scanning circuit 211 supplies the high-level FD reset signal rst and the high-level transfer signal trg to all the rows (in other words, all the pixels) over a period from timing T0 immediately before the start of exposure to timing T1 that is the end of the pulse period. Therefore, all the pixels are PD reset, and the exposure simultaneously starts in all the rows.

Here, rst_[n] and trg_[n] in the drawing indicate signals to pixels in an n-th row among N rows. N is an integer indicating the total number of rows, and n is an integer from 1 to N.

Then, at timing T2 immediately before the end of the exposure period, the vertical scanning circuit 211 supplies the high-level FD reset signal rst over the pulse period while setting the post-stage reset signal rstb and the selection signal Φr to the high level for all the pixels. Therefore, all the pixels are FD reset, and the reset level is sampled and held. Here, rstb_[n] and Φr_[n] in the drawing indicate signals to pixels in the n-th row.

At timing T3 after timing T2, the vertical scanning circuit 211 returns the selection signal Φr to the low level.

At timing T4 that is the end of exposure, the vertical scanning circuit 211 supplies the high-level transfer signal trg over the pulse period while setting the post-stage reset signal rstb and the selection signal Φs to the high level for all the pixels. Therefore, the signal level is sampled and held. Furthermore, the level of the pre-stage node 320 decreases from the reset level (VDD−Vsig) to the signal level (VDD−Vgs−Vsig). Here, VDD indicates a power supply voltage, and Vsig indicates a net signal level obtained as a result of the CDS processing. Vgs indicates a gate-source voltage of the pre-stage amplification transistor 315. Furthermore, Φs_[n] in the drawing indicates signals to pixels in the n-th row.

At timing T5 after timing T4, the vertical scanning circuit 211 returns the selection signal Φs to the low level.

Furthermore, the vertical scanning circuit 211 controls the current source transistors 316 of all the rows (all the pixels) to supply the current id1. Here, id1_[n] in the drawing indicates a current of pixels in the n-th row. The larger the current id, the larger IR drop becomes, so that it is required that the current id1 be on the order of several nanoamperes (nA) to several tens of nanoamperes (nA). On the other hand, the load MOS transistors 251 of all the columns are in the off state, and the current id2 is not supplied to the vertical signal line 309.

Figure 6:
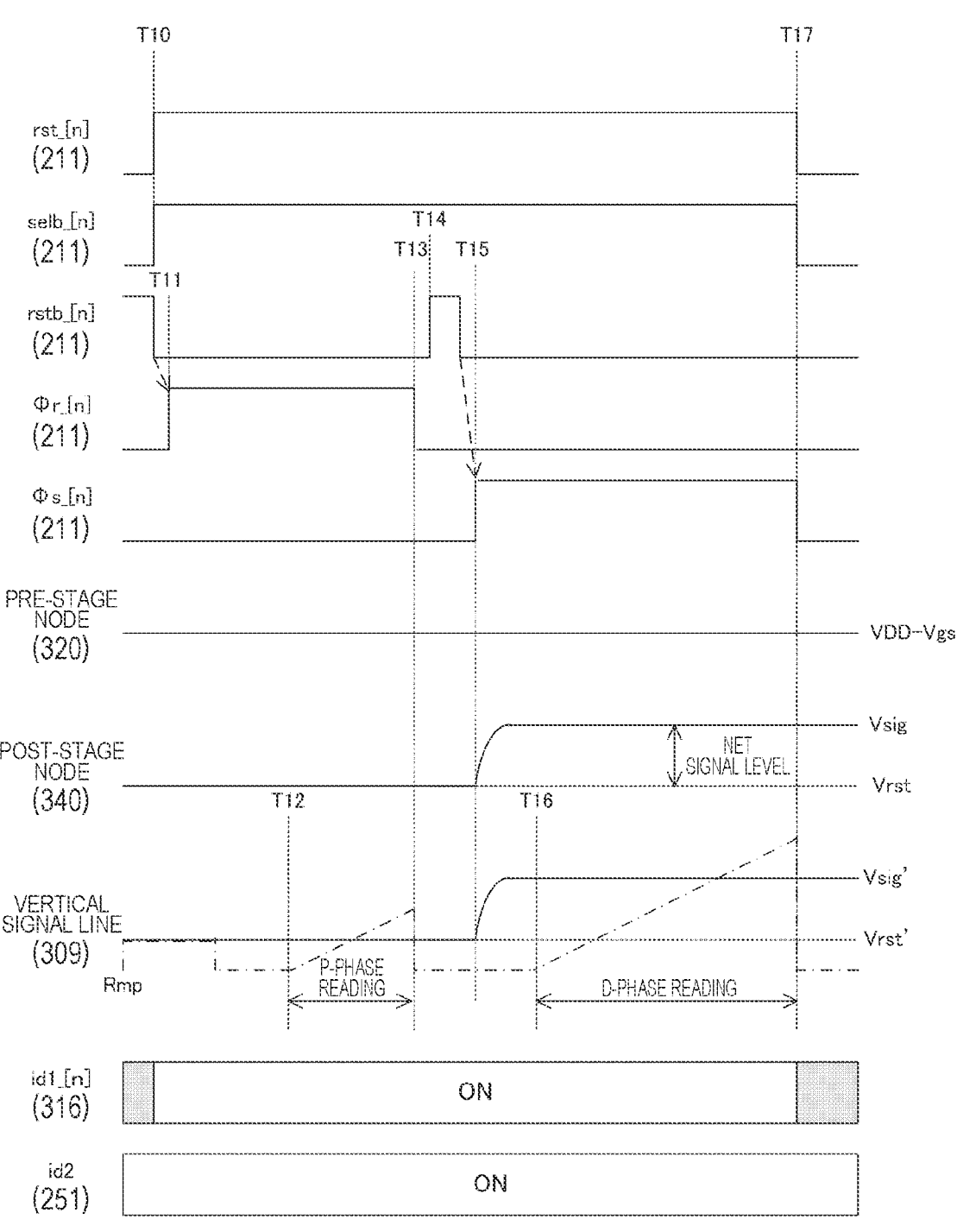
FIG. 6 is a timing chart depicting an example of a read operation according to the first embodiment of the present technology.

FIG. 6 is a timing chart depicting an example of a read operation according to the first embodiment of the present technology. Over a read period of the n-th row from timing T10 to timing T17, the vertical scanning circuit 211 sets the FD reset signal rst and the post-stage selection signal selb of the n-th row to the high level. Furthermore, over the read period, the post-stage reset signal rstb of all the rows is controlled to the low level. Here, selb_[n] in the drawing indicates signals to pixels in the n-th row.

The vertical scanning circuit 211 supplies the high-level selection signal Φr to the n-th row over a period from timing T11 immediately after timing T10 to timing T13. The potential of the post-stage node 340 becomes a reset level Vrst.

The DAC 213 gradually increases the ramp signal Rmp over a period from timing T12 after timing T11 to timing T13. The ADC 261 compares the ramp signal Rmp with a level Vrst' of the vertical signal line 309, and counts a count value over a period until the comparison result is inverted. Therefore, the P-phase level (reset level) is read.

The vertical scanning circuit 211 supplies the high-level post-stage reset signal rstb to the n-th row over the pulse period from timing T14 immediately after timing T13. Therefore, in a case where a parasitic capacitance exists in the post-stage node 340, the history of the previous signal held in the parasitic capacitance can be erased.

The vertical scanning circuit 211 supplies the high-level selection signal Φs to the n-th row over a period from timing T15 immediately after the initialization of the post-stage node 340 to timing T17. The potential of the post-stage node 340 becomes the signal level Vsig. During exposure, the signal level is lower than the reset level, but during reading, the signal level is higher than the reset level because the post-stage node 340 is used as a reference. A difference between the reset level Vrst and the signal level Vsig corresponds to a net signal level from which reset noise and offset noise of the FD have been removed.

The DAC 213 gradually increases the ramp signal Rmp over a period from timing T16 after timing T15 to timing T17. The ADC 261 compares the ramp signal Rmp with the level Vrst' of the vertical signal line 309, and counts a count value over a period until the comparison result is inverted. Therefore, the D-phase level (signal level) is read.

Furthermore, the vertical scanning circuit 211 controls the current source transistor 316 of the n-th row to be read over the period from timing T10 to timing T17 to supply the current id1. Furthermore, the timing control circuit 212 controls the load MOS transistors 251 of all the columns to supply the current id2 within the read period of all the rows.

Figure 7:
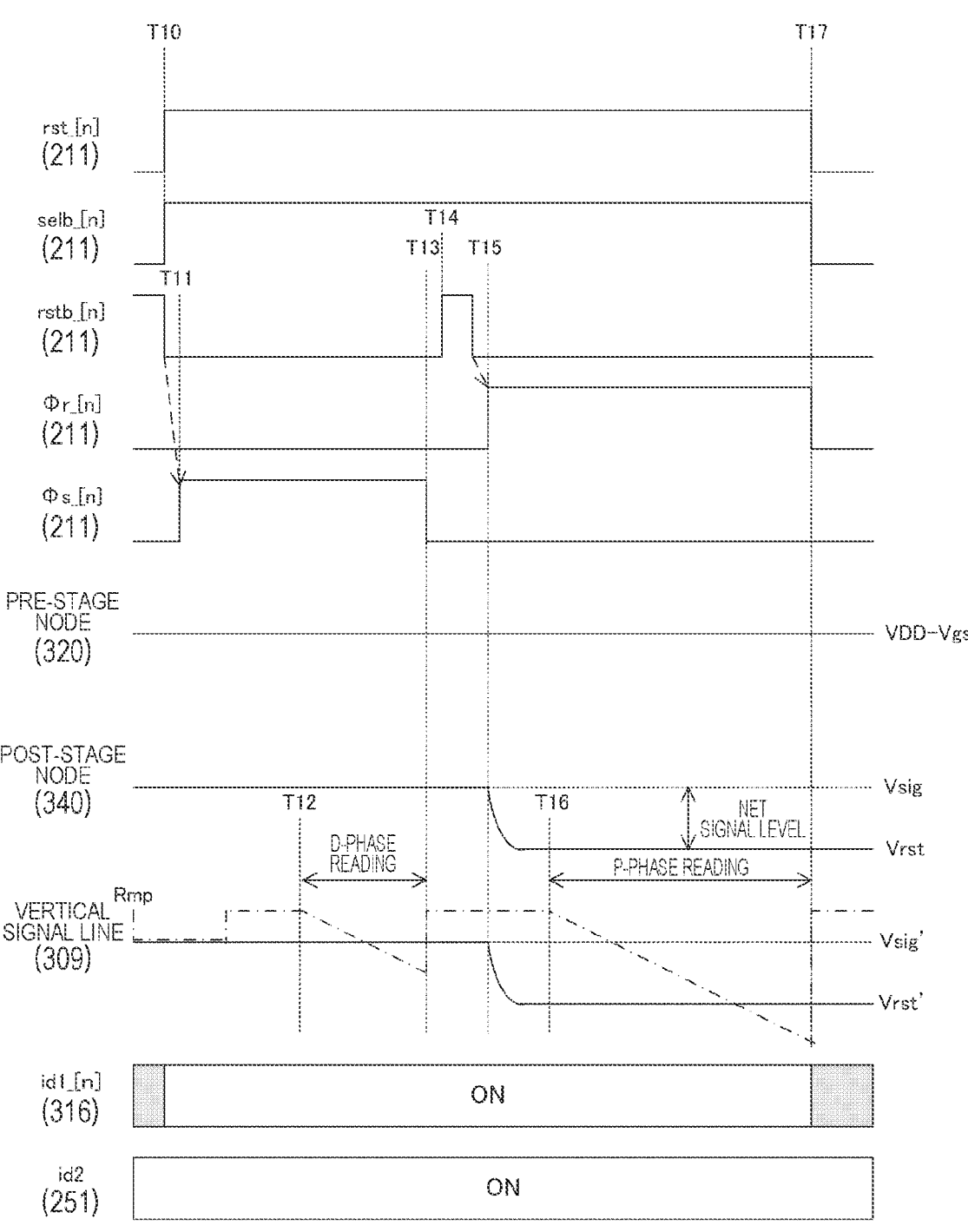
FIG. 7 is a timing chart depicting another example of the read operation according to the first embodiment of the present technology.

Note that the solid-state imaging element 200 reads the signal level after the reset level, but is not limited to this order. Alternatively, as depicted in FIG. 7, the solid-state imaging element 200 may read the reset level after the signal level. In this case, the vertical scanning circuit 211 supplies the high-level selection signal Φr after the high-level selection signal Φs. Furthermore, in this case, it is necessary to reverse the slope of the slope of the ramp signal.

Figure 8:
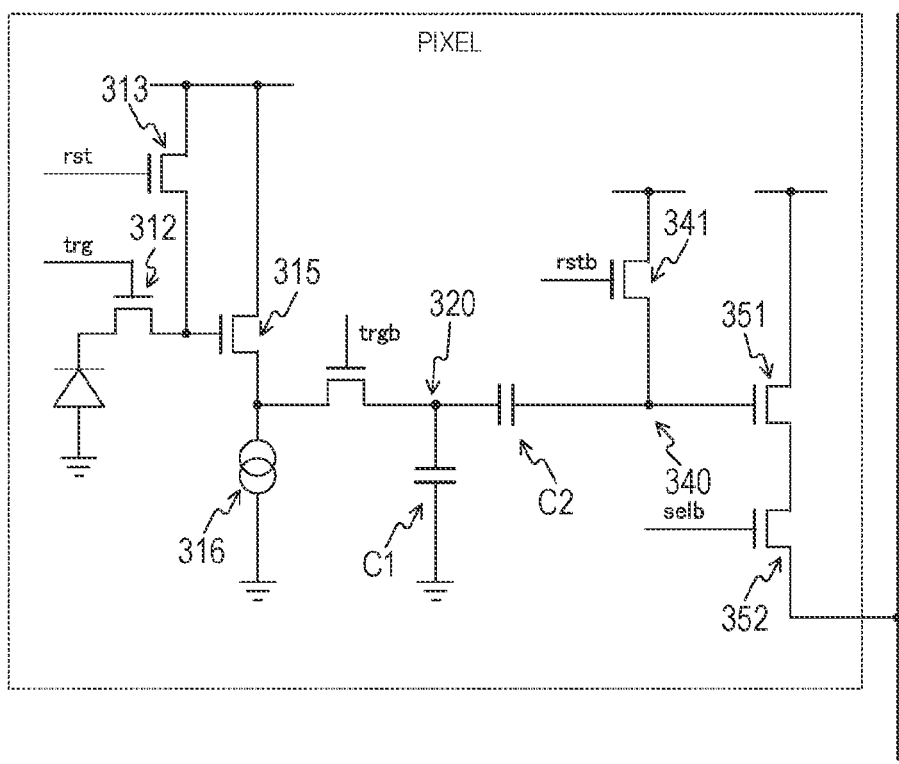
FIG. 8 is a circuit diagram depicting a configuration example of a pixel according to a first comparative example.

FIG. 8 is a circuit diagram depicting a configuration example of a pixel according to a first comparative example. In this first comparative example, the selection circuit 330 is not provided, and a transfer transistor is interposed between the pre-stage node 320 and the pre-stage circuit. Furthermore, capacitors C1 and C2 are interposed instead of the capacitor elements 321 and 322. The capacitor C1 is interposed between the pre-stage node 320 and the ground terminal, and the capacitor C2 is interposed between the pre-stage node 320 and the post-stage node 340.

Pixel exposure control and read control of this first comparative example are described in, for example, FIG. 5.5.2 of Non-Patent Document 1. In this first comparative example, assuming that the capacitance value of each of the capacitors C1 and C2 is C, a level Vn of kTC noise at the time of exposure and reading is expressed by the following expression.

$$Vn = \left(3 * kT/C\right)^{1/2} \qquad \text{Expression 1}$$

In the above expression, k is a Boltzmann constant, and the unit is, for example, Joule per Kelvin (J/K). T is an absolute temperature, and the unit is, for example, Kelvin (K). Furthermore, the unit of Vn is, for example, volt (V), and the unit of C is, for example, farad (F).

Figure 9A:
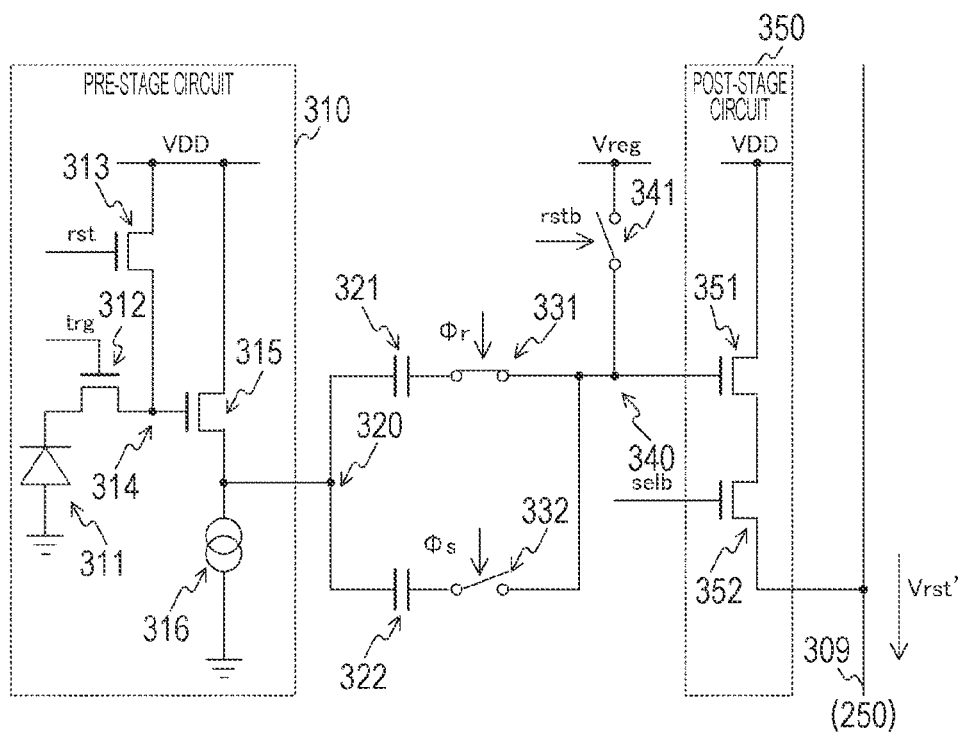
FIGS. 9A and 9B are diagrams depicting examples of states of the pixel at the time of reading a reset level and at the time of initialization of a post-stage node according to the first embodiment of the present technology.
Figure 9B:
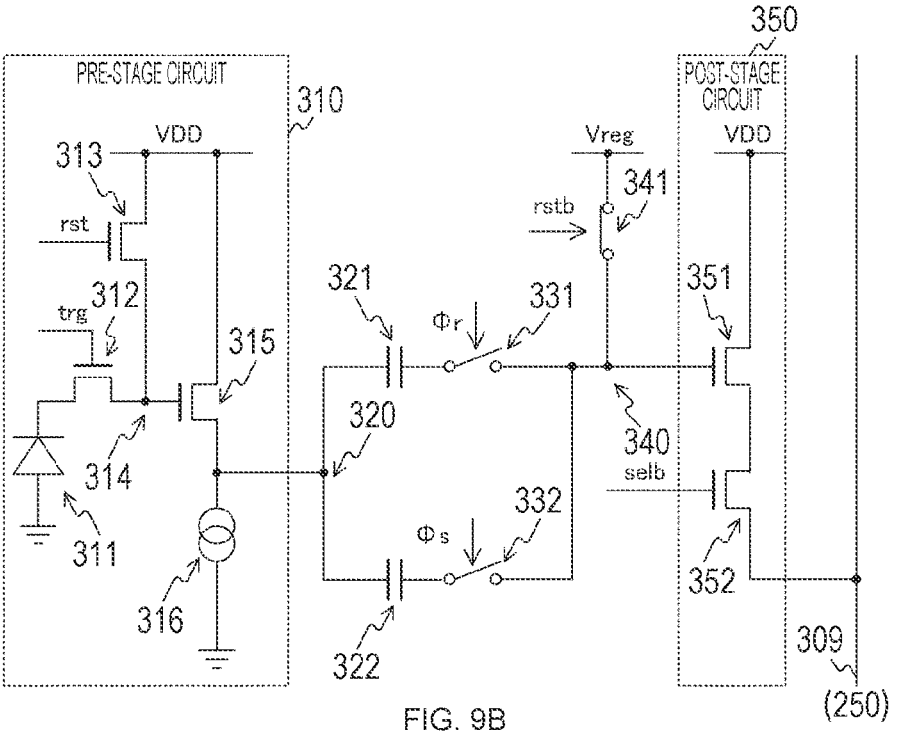

FIGS. 9A and 9B are diagrams depicting examples of pixel states at the time of reading the reset level and at the time of initialization of the post-stage node according to the first embodiment of the present technology. Of the drawing, FIG. 9A indicates a state of the pixel 300 at the time of reading the reset level, and FIG. 9B of the drawing indicates a state of the pixel 300 at the time of initialization of the post-stage node 340. Furthermore, in the drawing, the selection transistor 331, the selection transistor 332, and the post-stage reset transistor 341 are represented by graphical symbols of switches for convenience of description.

As depicted in FIG. 9A of the drawing, the vertical scanning circuit 211 closes the selection transistor 331, and opens the selection transistor 332 and the post-stage reset transistor 341. Therefore, the reset level is read through the post-stage circuit 350.

As depicted in FIG. 9B of the drawing, after the reset level is read, the vertical scanning circuit 211 opens the selection transistor 331 and the selection transistor 332, and closes the post-stage reset transistor 341. Therefore, the capacitor elements 321 and 322 are disconnected from the post-stage node 340, and the level of the post-stage node 340 is initialized.

A capacitance value of a parasitic capacitance Cp of the post-stage node 340 disconnected from the capacitor elements 321 and 322 in this manner is assumed to be very small as compared with the capacitor elements 321 and 322. For example, assuming that the parasitic capacitance Cp is several femtofarads (fF), the capacitor elements 321 and 322 are on the order of several tens of femtofarads.

Figure 10:
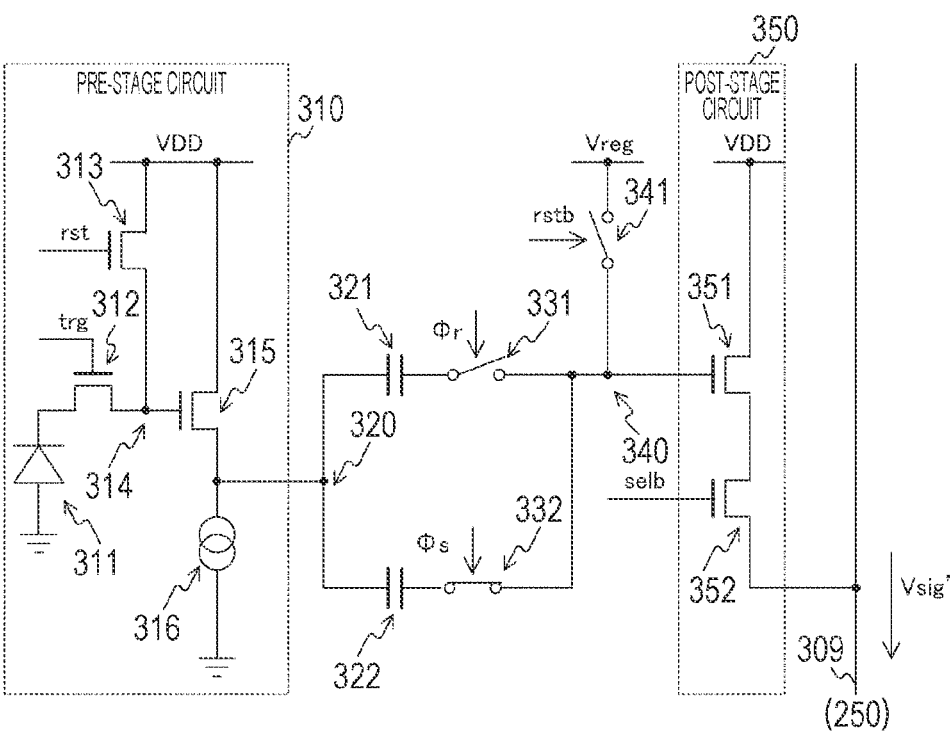
FIG. 10 is a diagram depicting an example of a state of the pixel at the time of reading a signal level according to the first embodiment of the present technology.

FIG. 10 is a diagram depicting an example of a state of the pixel 300 at the time of reading the signal level according to the first embodiment of the present technology.

After the initialization of the post-stage node 340, the vertical scanning circuit 211 closes the selection transistor 332, and opens the selection transistor 331 and the post-stage reset transistor 341. Therefore, the signal level is read through the post-stage circuit 350.

Here, consider kTC noise at the time of exposure of the pixel 300. At the time of exposure, kTC noise occurs in each of sampling of the reset level and sampling of the signal level immediately before the end of exposure. Assuming that the capacitance value of each of the capacitor elements 321 and 322 is C, the level Vn of the kTC noise at the time of exposure is expressed by the following expression.

$$Vn = (2 * kT/C)^{1/2} \qquad \text{Expression 2}$$

Furthermore, as depicted in FIGS. 9A, 9B, and 10, since the post-stage reset transistor 341 is driven at the time of reading, kTC noise occurs at that time. However, the capacitor elements 321 and 322 are disconnected at the time of driving the post-stage reset transistor 341, and the parasitic capacitance Cp at that time is small. Therefore, the kTC noise at the time of reading can be ignored as compared with the kTC noise at the time of exposure. Therefore, the kTC noise at the time of exposure and reading is expressed by Expression 2.

With Expressions 1 and 2, in the pixel 300 in which the capacitor is disconnected at the time of reading, the kTC noise is smaller than in the first comparative example in which the capacitor cannot be disconnected at the time of reading. Therefore, image quality of image data can be improved.

Figure 11:
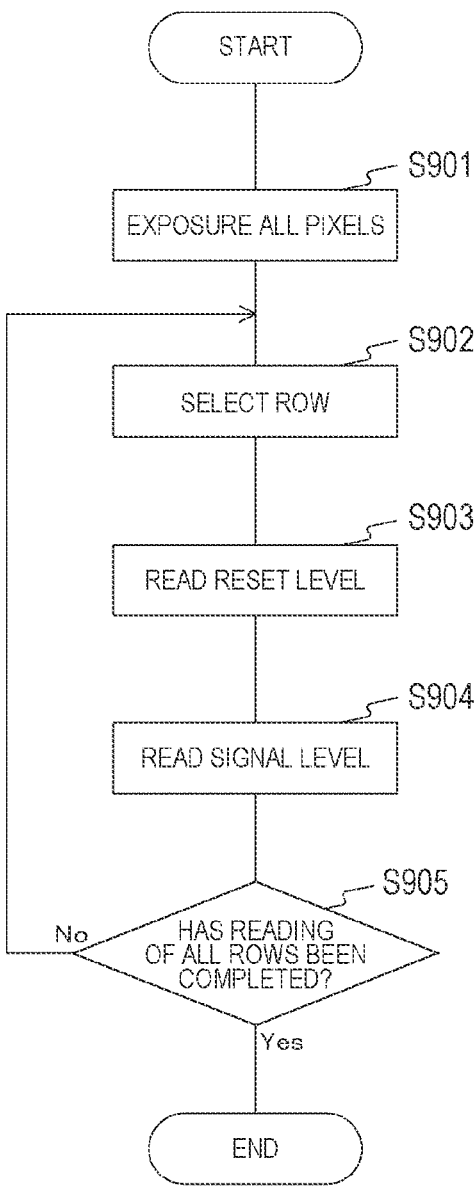
FIG. 11 is a flowchart depicting an example of an operation of the solid-state imaging element according to the first embodiment of the present technology.

FIG. 11 is a flowchart depicting an example of the operation of the solid-state imaging element 200 according to the first embodiment of the present technology. This operation is started, for example, in a case where a predetermined application for capturing image data is executed.

The vertical scanning circuit 211 exposes all the pixels (step S901). Then, the vertical scanning circuit 211 selects a row to be read (step S902). The column signal processing circuit 260 reads the reset level of the row (step S903), and then reads the signal level of the row (step S904).

The solid-state imaging element 200 determines whether or not reading of all the rows has been completed (step S905). In a case where the reading of all the rows has not been completed (step S905: No), the solid-state imaging element 200 repeatedly executes step S902 and subsequent steps. On the other hand, in a case where the reading of all the rows has been completed (step S905: Yes), the solid-state imaging element 200 performs CDS processing or the like, and ends the operation for imaging. In a case where a plurality of pieces of image data is continuously captured, steps S901 to S905 are repeatedly executed in synchronization with the vertical synchronization signal.

As described above, in the first embodiment of the present technology, the post-stage reset transistor 341 initializes the post-stage node 340 when the selection circuit 330 disconnects the capacitor elements 321 and 322 from the post-stage node 340. Since the capacitor elements 321 and 322 are disconnected, the level of the reset noise generated by the driving becomes a level corresponding to a parasitic capacitance smaller than the capacitor elements 321 and 322. This noise reduction allows an improvement in image quality of image data.

First Modification Example

In the first embodiment described above, the pre-stage circuit 310 reads a signal with the pre-stage circuit 310 connected to the pre-stage node 320, but this configuration cannot block noise from the pre-stage node 320 at the time of reading. A pixel 300 of this first modification example of the first embodiment is different from the pixel 300 of the first embodiment in that a transistor is interposed between the pre-stage circuit 310 and the pre-stage node 320.

Figure 12:
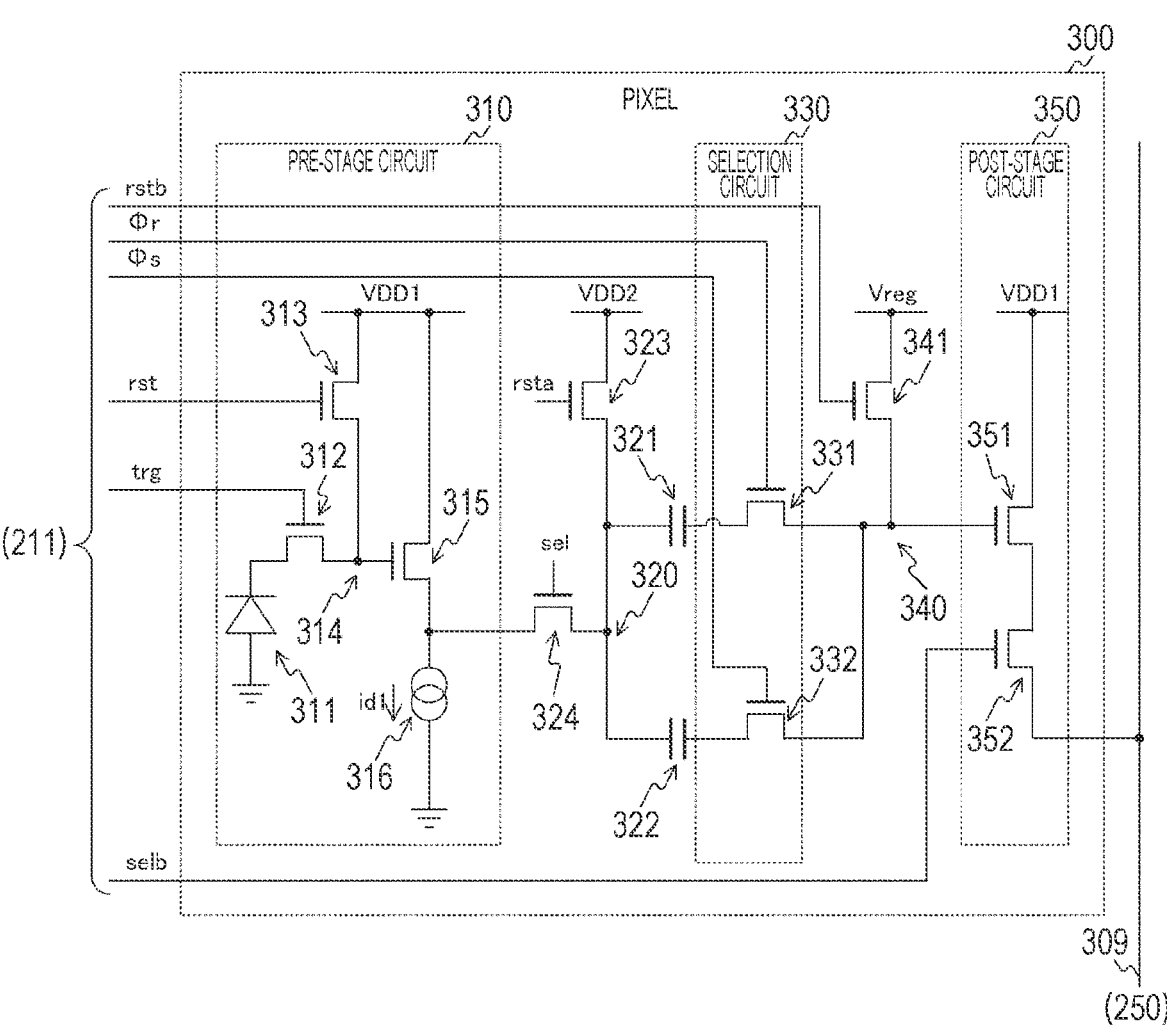
FIG. 12 is a circuit diagram depicting a configuration example of a pixel according to a first modification example of the first embodiment of the present technology.

FIG. 12 is a circuit diagram depicting a configuration example of the pixel 300 according to the first modification example of the first embodiment of the present technology. The pixel 300 of this first modification example of the first embodiment is different from the pixel 300 of the first embodiment in that a pre-stage reset transistor 323 and a pre-stage selection transistor 324 are further provided. Furthermore, the power supply voltage of the pre-stage circuit 310 and the post-stage circuit 350 of the first modification example of the first embodiment is denoted as VDD1.

The pre-stage reset transistor 323 initializes the level of the pre-stage node 320 with a power supply voltage VDD2. It is desirable that the power supply voltage VDD2 be set to a value satisfying the following expression.

$$VDD2 = VDD1 - Vgs \qquad \text{Expression 3}$$

In the above expression, Vgs is a gate-source voltage of the pre-stage amplification transistor 315.

Setting to the value satisfying Expression 3 allow a reduction in variations in potential between the pre-stage node 320 and the post-stage node 340 in the dark. It is therefore possible to improve photo response non-uniformity (PRNU).

The pre-stage selection transistor 324 opens and closes a path between the pre-stage circuit 310 and the pre-stage node 320 in accordance with a pre-stage selection signal sel from the vertical scanning circuit 211.

Figure 13:
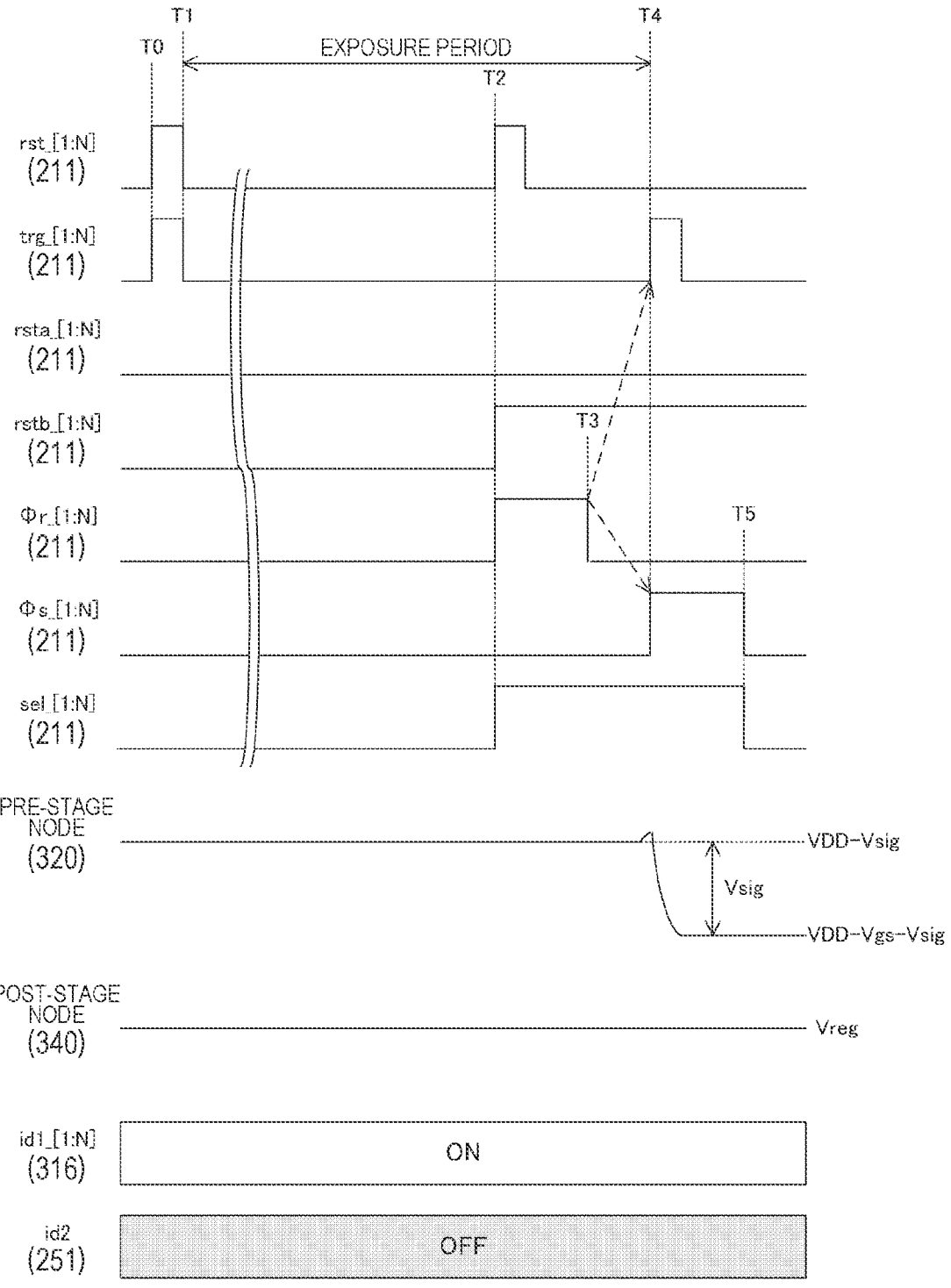
FIG. 13 is a timing chart depicting an example of a global shutter operation according to the first modification example of the first embodiment of the present technology.

FIG. 13 is a timing chart depicting an example of a global shutter operation according to the first modification example of the first embodiment the present technology. The timing chart of the first modification example of the first embodiment is different from the timing chart of the first embodiment in that the vertical scanning circuit 211 further supplies a pre-stage reset signal rsta and the pre-stage selection signal sel. In the drawing, rsta_[n] and sel_[n] indicate signals to pixels in the n-th row.

The vertical scanning circuit 211 supplies a high-level pre-stage selection signal sel to all the pixels over a period from timing T2 immediately before the end of exposure to timing T5. The pre-stage reset signal rsta is controlled to the low level.

Figure 14:
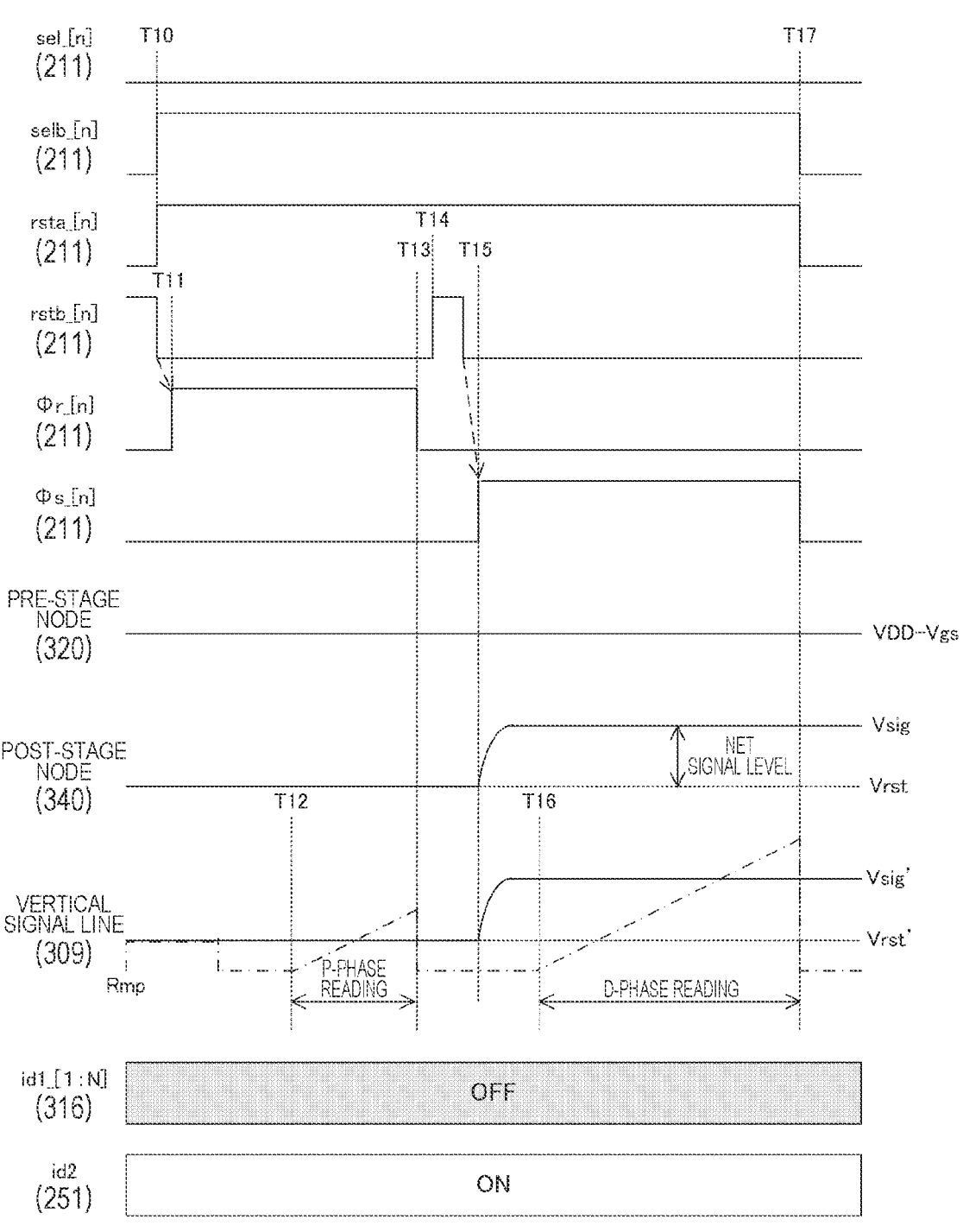
FIG. 14 is a timing chart depicting an example of a read operation according to the first modification example of the first embodiment of the present technology.

FIG. 14 is a timing chart depicting an example of a read operation according to the first modification example of the first embodiment of the present technology. At the time of reading of each row, the pre-stage selection signal sel is controlled to the low level. This control brings the pre-stage selection transistor 324 into the open state to disconnect the pre-stage node 320 from the pre-stage circuit 310. It is therefore possible to block noise from the pre-stage node 320 at the time of reading.

Furthermore, over the read period of the n-th row from timing T10 to timing T17, the vertical scanning circuit 211 supplies a high-level pre-stage reset signal rsta to the n-th row.

Furthermore, at the time of reading, the vertical scanning circuit 211 controls the current source transistors 316 of all the pixels to stop the supply of the current id1. The current id2 is supplied in a manner similar to the first embodiment. As described above, the control of the current id1 is simplified as compared with the first embodiment.

As described above, according to the first modification example of the first embodiment of the present technology, since the pre-stage selection transistor 324 shifts to the open state at the time of reading to disconnect the pre-stage circuit 310 from the pre-stage node 320, it is possible to block noise from the pre-stage circuit 310.

Second Modification Example

In the first embodiment described above, the circuits in the solid-state imaging element 200 are provided in a single semiconductor chip, but there is a possibility that this configuration prevents the elements from fitting in the semiconductor chip in a case where the pixel 300 is miniaturized. A solid-state imaging element 200 of this second modification example of the first embodiment is different from the solid-state imaging element 200 of the first embodiment in that the circuits in the solid-state imaging element 200 are dispersedly arranged on two semiconductor chips.

Figure 15:
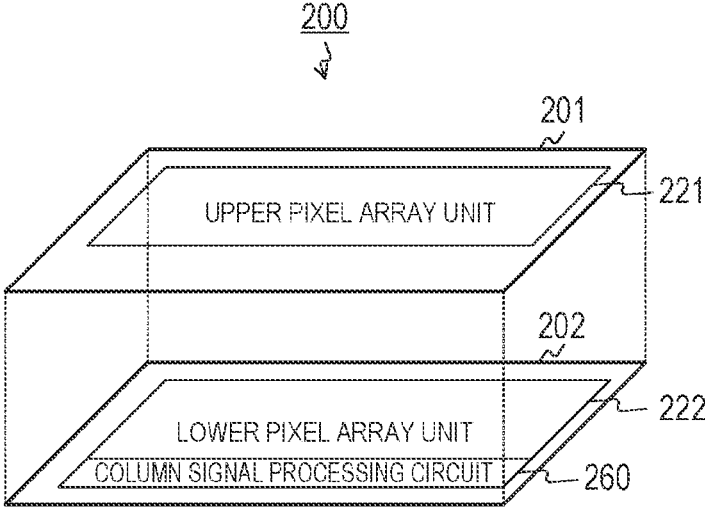
FIG. 15 is a diagram depicting an example of a laminated structure of a solid-state imaging element according to a second modification example of the first embodiment of the present technology.

FIG. 15 is a diagram depicting an example of a laminated structure of the solid-state imaging element 200 according to the second modification example of the first embodiment of the present technology. The solid-state imaging element 200 of the second modification example of the first embodiment includes a lower pixel chip 202 and an upper pixel chip 201 stacked on the lower pixel chip 202. These chips are electrically connected by, for example, Cu—Cu bonding. Note that, in addition to the Cu—Cu bonding, the connection can be made using a via or a bump.

An upper pixel array unit 221 is arranged in the upper pixel chip 201. A lower pixel array unit 222 and the column signal processing circuit 260 are arranged in the lower pixel chip 202. For each pixel in the pixel array unit 220, a part of the pixel is arranged in the upper pixel array unit 221, and the rest is arranged in the lower pixel array unit 222.

Furthermore, in the lower pixel chip 202, the vertical scanning circuit 211, the timing control circuit 212, the DAC 213, and the load MOS circuit block 250 are also arranged. These circuits are omitted in the drawing.

Furthermore, the upper pixel chip 201 is manufactured, for example, by a pixel-dedicated process, and the lower pixel chip 202 is manufactured, for example, by a complementary MOS (CMOS) process. Note that the upper pixel chip 201 is an example of a first chip described in the claims, and the lower pixel chip 202 is an example of a second chip described in the claims.

Figure 16:
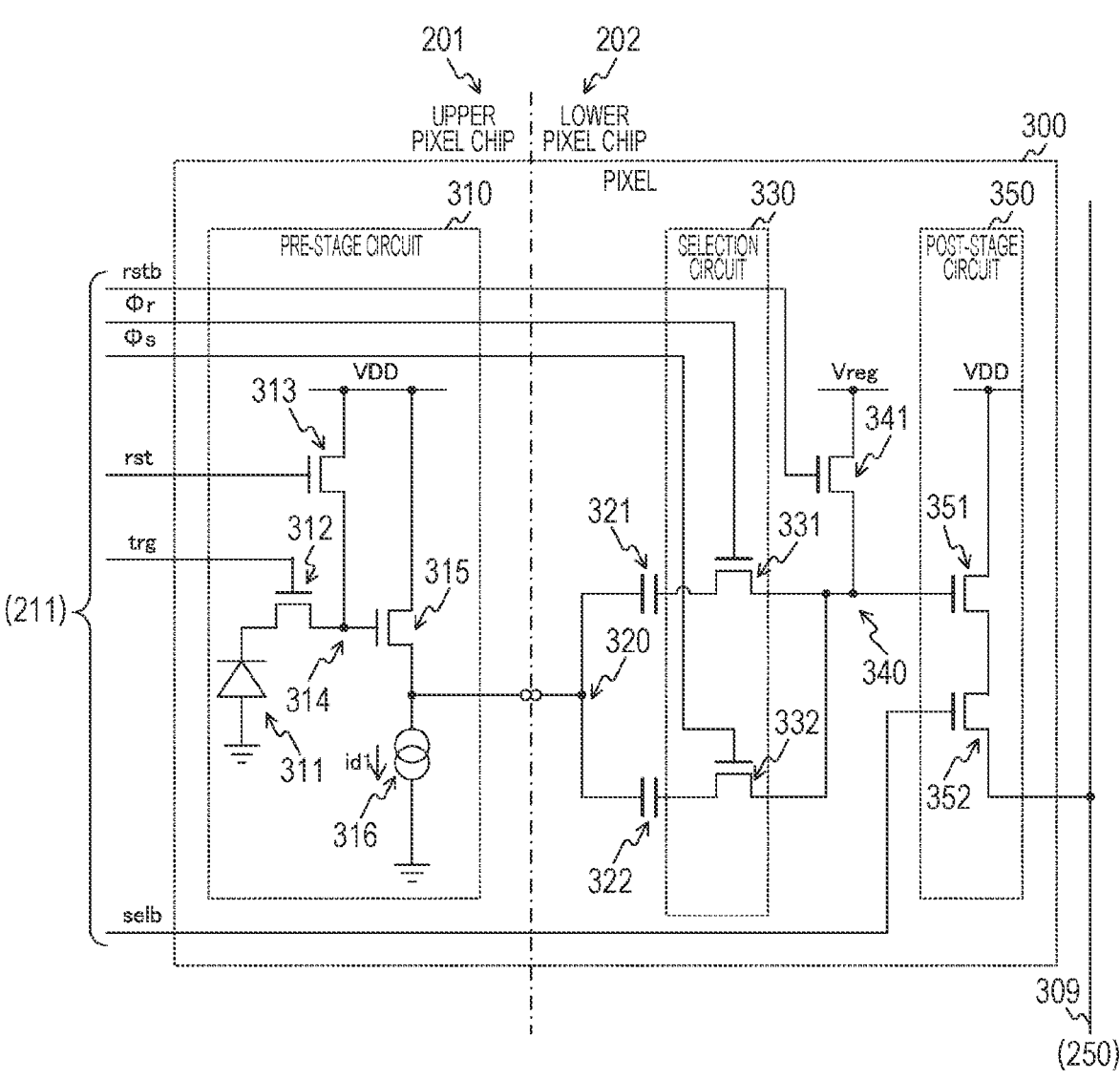
FIG. 16 is a circuit diagram depicting a configuration example of a pixel according to the second modification example of the first embodiment of the present technology.

FIG. 16 is a circuit diagram depicting a configuration example of a pixel 300 according to the second modification example of the first embodiment of the present technology. In the pixel 300, the pre-stage circuit 310 is arranged in the upper pixel chip 201, and the other circuits and elements (such as the capacitor elements 321 and 322) are arranged in the lower pixel chip 202. Note that the current source transistor 316 can be further arranged in the lower pixel chip 202. As depicted in the drawing, dispersedly arranging the elements in the pixel 300 in the upper pixel chip 201 and lower pixel chip 202 stacked on top of each other allows a reduction in pixel area, thereby facilitating pixel miniaturization.

As described above, according to the second modification example of the first embodiment of the present technology, since the circuits and elements in the pixel 300 are dispersedly arranged in the two semiconductor chips, pixel miniaturization is facilitated.

Third Modification Example

In the second modification example of the first embodiment described above, a part of the pixel 300 and the peripheral circuits (such as the column signal processing circuit 260) are provided in the lower pixel chip 202 on the lower side. However, in this configuration, the arrangement area of the circuits and elements on the lower pixel chip 202 side is larger than the arrangement area of the upper pixel chip 201 by the peripheral circuit, and there is a possibility that an unnecessary space without circuits and elements is generated in the upper pixel chip 201. The solid-state imaging element 200 of this third modification example of the first embodiment is different from the solid-state imaging element 200 of the second modification example of the first embodiment in that the circuits in the solid-state imaging element 200 are dispersedly arranged in three semiconductor chips.

Figure 17:
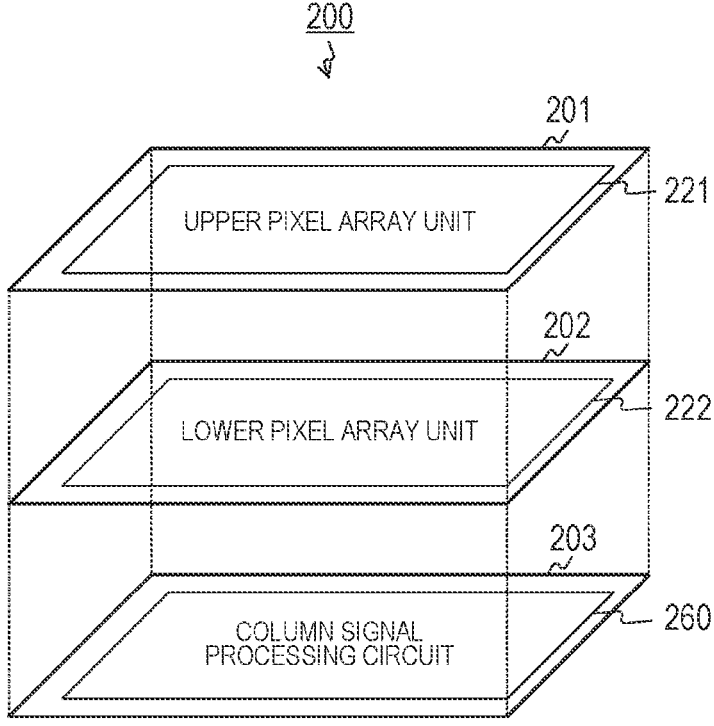
FIG. 17 is a diagram depicting an example of a laminated structure of a solid-state imaging element according to a third modification example of the first embodiment of the present technology.

FIG. 17 is a diagram depicting an example of a laminated structure of the solid-state imaging element 200 according to the third modification example of the first embodiment of the present technology. The solid-state imaging element 200 of the third modification example of the first embodiment includes the upper pixel chip 201, the lower pixel chip 202, and a circuit chip 203. These chips are stacked on top of each other, and are electrically connected by, for example, Cu—

Cu bonding. Note that, in addition to the Cu—Cu bonding, the connection can be made using a via or a bump.

The upper pixel array unit 221 is arranged in the upper pixel chip 201. The lower pixel array unit 222 is arranged in the lower pixel chip 202. For each pixel in the pixel array unit 220, a part of the pixel is arranged in the upper pixel array unit 221, and the rest is arranged in the lower pixel array unit 222.

Furthermore, in the circuit chip 203, the column signal processing circuit 260, the vertical scanning circuit 211, the timing control circuit 212, the DAC 213, and the load MOS circuit block 250 are arranged. Circuits other than the column signal processing circuit 260 are omitted in the drawing.

Note that the upper pixel chip 201 is an example of the first chip described in the claims, and the lower pixel chip 202 is an example of the second chip described in the claims. The circuit chip 203 is an example of a third chip described in the claims.

Adopting the three-layer configuration as depicted in the drawing allows a reduction in unnecessary space and further pixel miniaturization as compared with the two-layer configuration. Furthermore, the lower pixel chip 202 that is the second layer can be manufactured by a dedicated process for the capacitor and switch.

As described above, in the third modification example of the first embodiment of the present technology, since the circuits in the solid-state imaging element 200 are dispersedly arranged in the three semiconductor chips, the pixel can be further miniaturized as compared with a case where the circuits are dispersedly arranged in the two semiconductor chips.

2. Second Embodiment

In the first embodiment described above, the reset level is sampled and held in the exposure period, but this configuration prevents the exposure period from being shorter than the sample and hold period of the reset level. A solid-state imaging element 200 of this second embodiment is different from the solid-state imaging element 200 of the first embodiment in that a transistor that discharges charges from a photoelectric conversion element is added to make the exposure period shorter.

Figure 18:
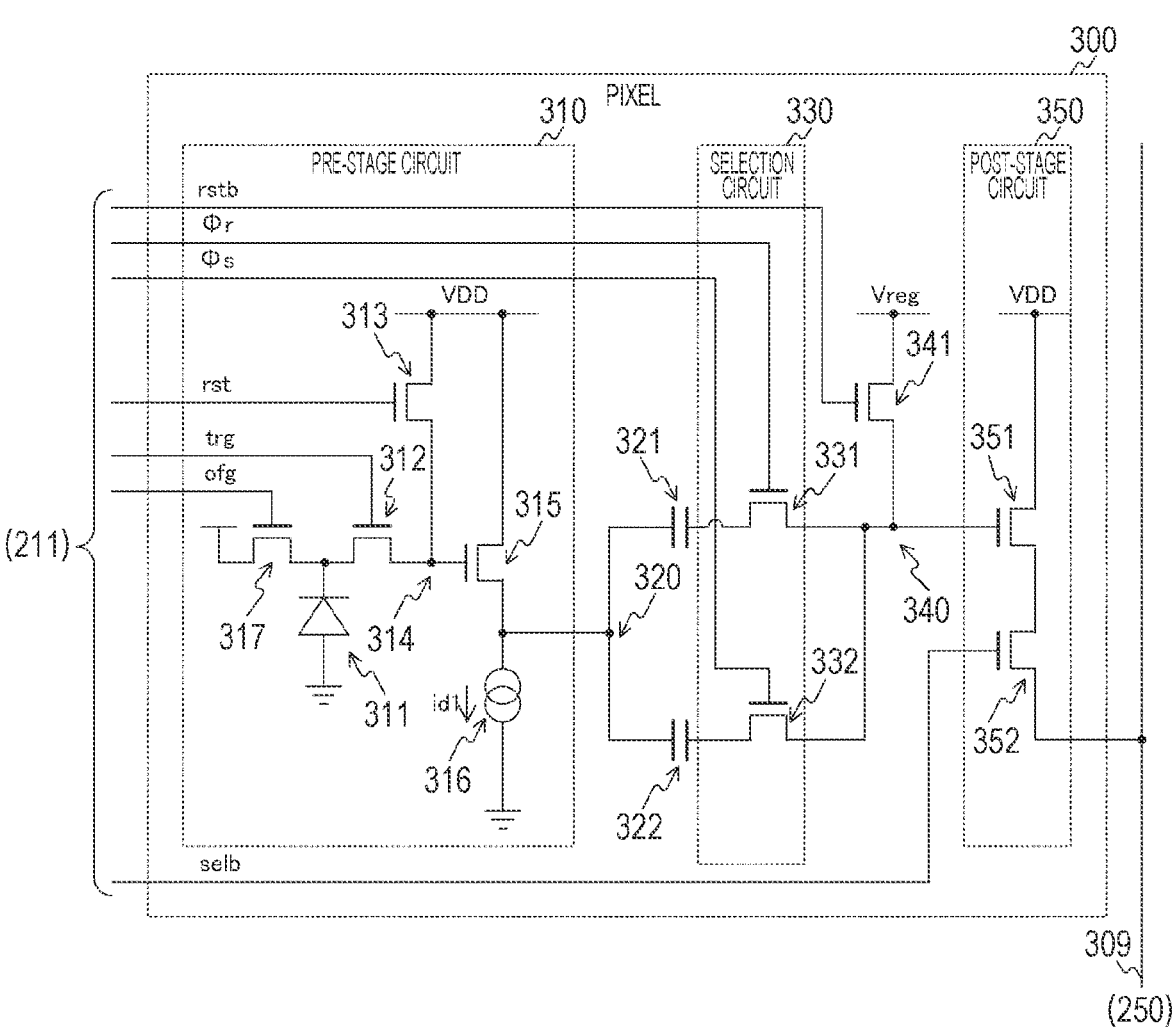
FIG. 18 is a circuit diagram depicting a configuration example of a pixel according to a second embodiment of the present technology.

FIG. 18 is a circuit diagram depicting a configuration example of the pixel 300 according to the second embodiment of the present technology. The pixel 300 of this second embodiment is different from the pixel 300 of the first embodiment in that a discharge transistor 317 is further provided in the pre-stage circuit 310.

The discharge transistor 317 functions as an overflow drain that discharges charges from the photoelectric conversion element 311 in accordance with a discharge signal ofg from the vertical scanning circuit 211. As the discharge transistor 317, for example, an nMOS transistors is used.

The configuration without the discharge transistor 317 as in the first embodiment may suffer blooming when charges are transferred from the photoelectric conversion element 311 to the FD 314 for all the pixels. Then, at the time of FD reset, the potential of the FD 314 and the potential of the pre-stage node 320 decrease. In response to the decrease in potential, charging and discharging currents of the capacitor elements 321 and 322 continue to occur, and IR drop in the power supply or the ground changes from a steady state without blooming.

On the other hand, at the time of sampling and holding the signal levels of all the pixels, after the transfer of the signal charges, the photoelectric conversion element 311 has no charge, so that blooming does not occur, and IR drop in the power supply or the ground goes into the steady state without blooming. Due to a difference in IR drop at the time of sampling and holding the reset level and the signal level, streaking noise occurs.

On the other hand, in the second embodiment in which the discharge transistor 317 is provided, the charges in the photoelectric conversion element 311 are discharged toward the overflow drain. Therefore, IR drops at the time of sampling and holding the reset level and the signal level become almost identical to each other, so that it is possible to suppress streaking noise.

Figure 19:
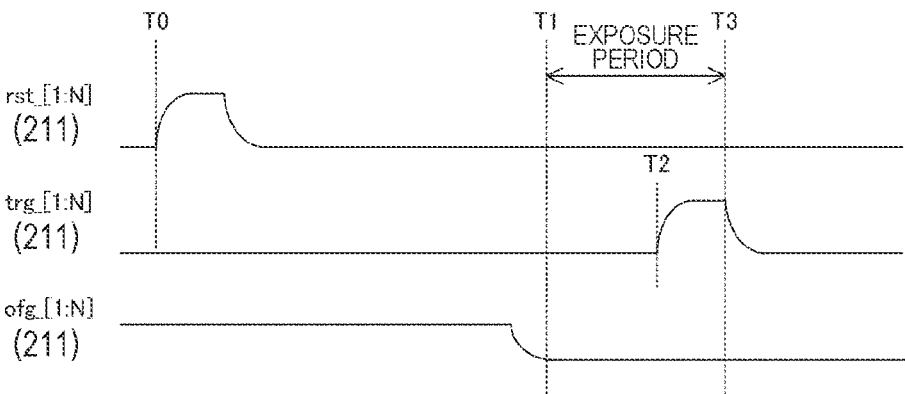
FIG. 19 is a timing chart depicting an example of a global shutter operation according to the second embodiment of the present technology.

FIG. 19 is a timing chart depicting an example of a global shutter operation according to the second embodiment of the present technology. At timing T0 before the start of exposure, the vertical scanning circuit 211 supplies the high-level FD reset signal rst to all the pixels over the pulse period while setting the discharge signal ofg to the high level for all the pixels. Therefore, the PD reset and the FD reset are performed on all the pixels. Furthermore, the reset level is sampled and held. Here, ofg_[n] in the drawing indicates signals to pixels in the n-th row of the N rows.

Then, at timing T1 that is the start of exposure, the vertical scanning circuit 211 returns the discharge signal ofg to the low level for all the pixels. Then, the vertical scanning circuit 211 supplies the high-level transfer signal trg to all the pixels over a period from timing T2 immediately before the end of exposure to timing T3 that is the end of exposure. Therefore, the signal level is sampled and held.

The configuration without the discharge transistor 317 as in the first embodiment needs to bring both the transfer transistor 312 and the FD reset transistor 313 into the on state at the start of exposure (that is, at the time of PD reset). Under this control, the FD 314 also needs to be reset at the time of PD reset. It is therefore necessary to perform the FD reset again within the exposure period to sample and hold the reset level, so that the exposure period cannot be made shorter than the sample and hold period of the reset level. When the reset levels of all the pixels are sampled and held, a certain waiting time is required until the voltage or the current stabilizes, and for example, a sample and hold period of several microseconds (µs) to several tens of microseconds (µs) is required.

On the other hand, in the second embodiment in which the discharge transistor 317 is provided, the PD reset and the FD reset can be separately performed. Therefore, as depicted in the drawing, it is possible to sample and hold the reset level by performing the FD reset before cancellation of the PD reset (the start of exposure). It is therefore possible to make the exposure period shorter than the sample and hold period of the reset level.

Note that, the first to third modification examples of the first embodiment may also be applied to the second embodiment.

As described above, according to the second embodiment of the present technology, since the discharge transistor 317 that discharges charges from the photoelectric conversion element 311 is provided, it is possible to sample and hold the reset level by performing the FD reset before the start of exposure. It is therefore possible to make the exposure period shorter than the sample and hold period of the reset level.

3. Third Embodiment

In the first embodiment described above, the FD 314 is initialized with the power supply voltage VDD, but there is a possibility that this configuration causes deterioration of photo response non-uniformity (PRNU) due to variations of the capacitor elements 321 and 322 or parasitic capacitance. A solid-state imaging element 200 of this third embodiment is different from the solid-state imaging element 200 of the first embodiment in that PRNU is improved by lowering the power supply of the FD reset transistor 313 at the time of reading.

Figure 20:
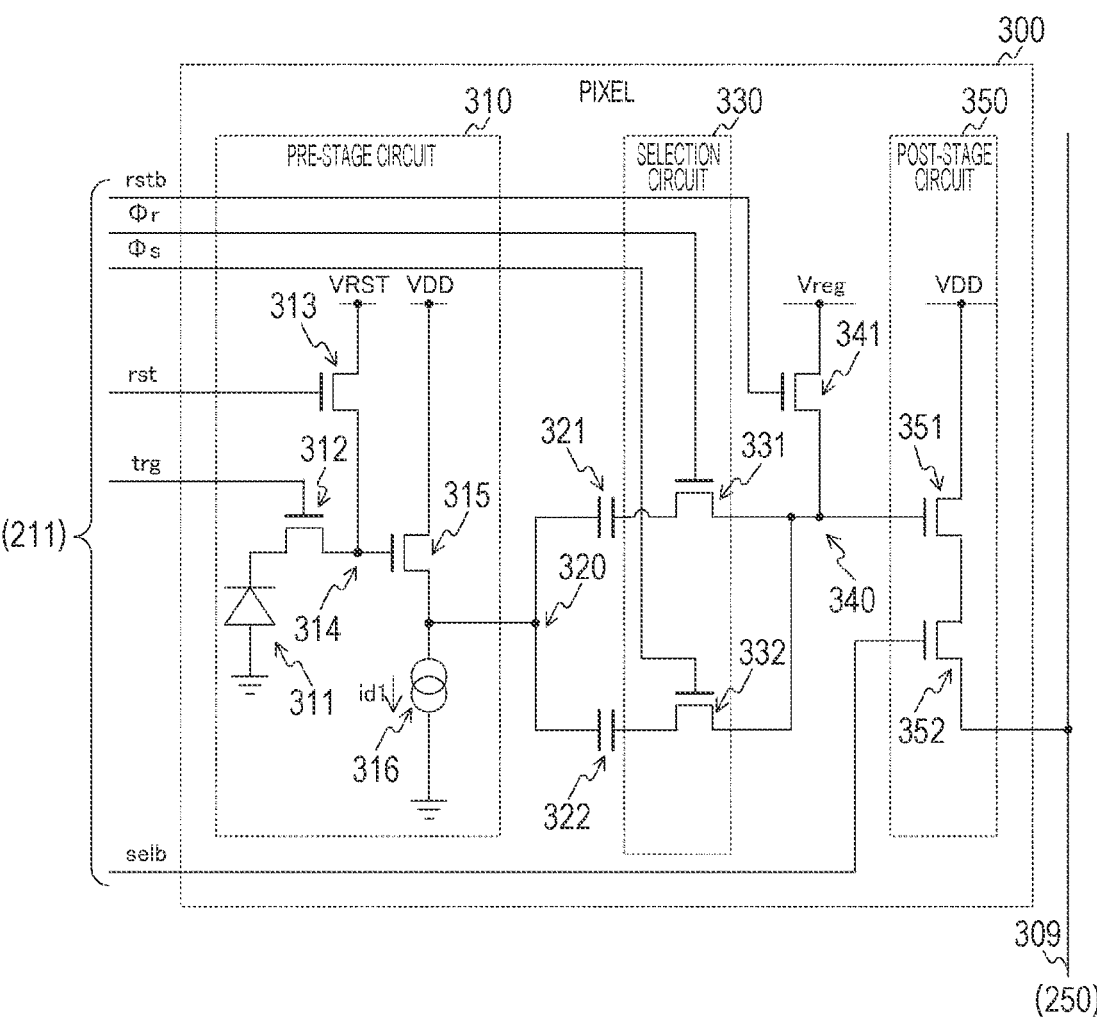
FIG. 20 is a circuit diagram depicting a configuration example of a pixel according to a third embodiment of the present technology.

FIG. 20 is a circuit diagram depicting a configuration example of the pixel 300 according to the third embodiment of the present technology. The pixel 300 of this third embodiment is different from the pixel 300 of the first embodiment in that the power supply of the FD reset transistor 313 is separated from the power supply voltage VDD of the pixel 300.

The FD reset transistor 313 of the third embodiment has a drain connected to a reset power supply voltage VRST. The reset power supply voltage VRST is controlled by, for example, the timing control circuit 212. Note that the timing control circuit 212 is an example of a control circuit described in the claims.

Figure 21:
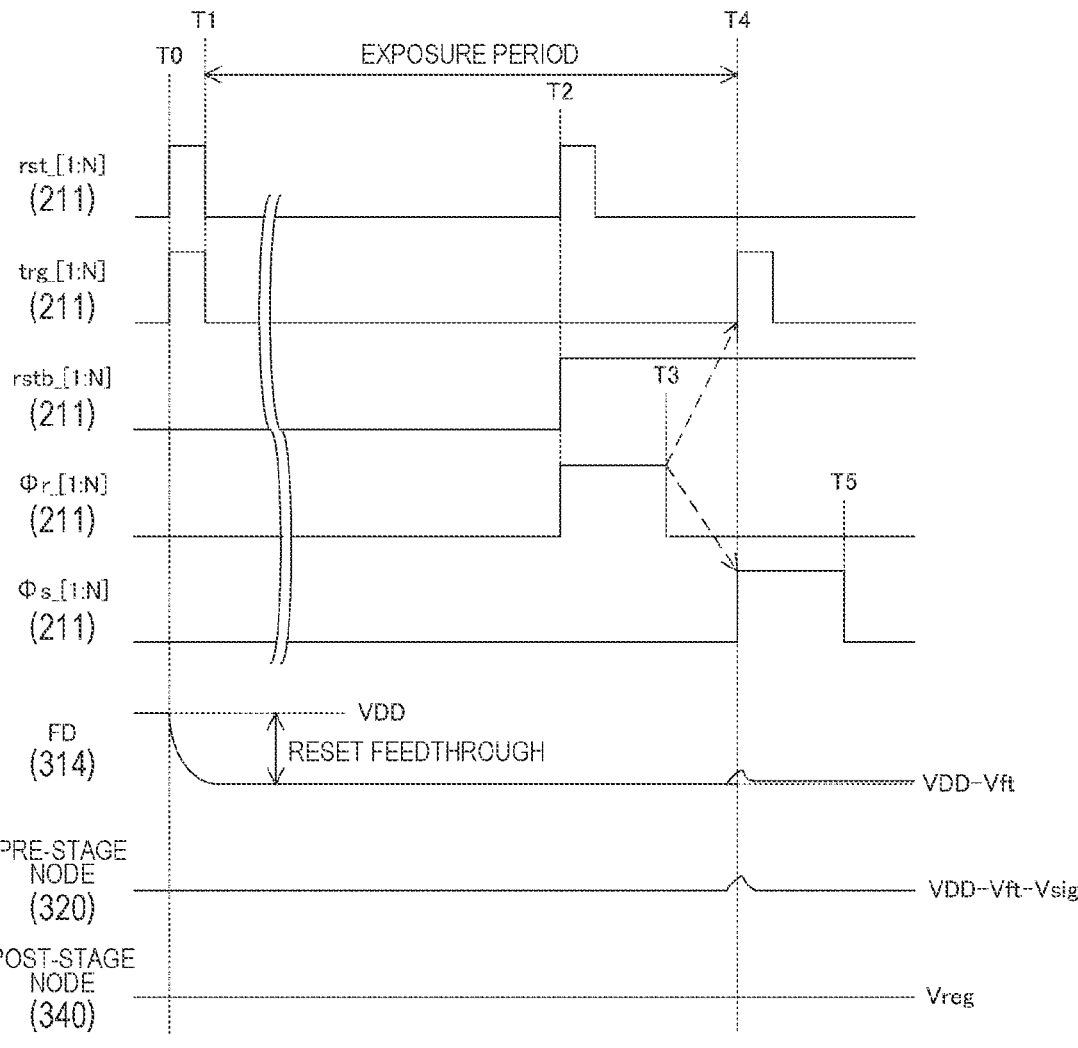
FIG. 21 is a diagram for describing reset feedthrough according to the third embodiment of the present technology.
Figure 22:
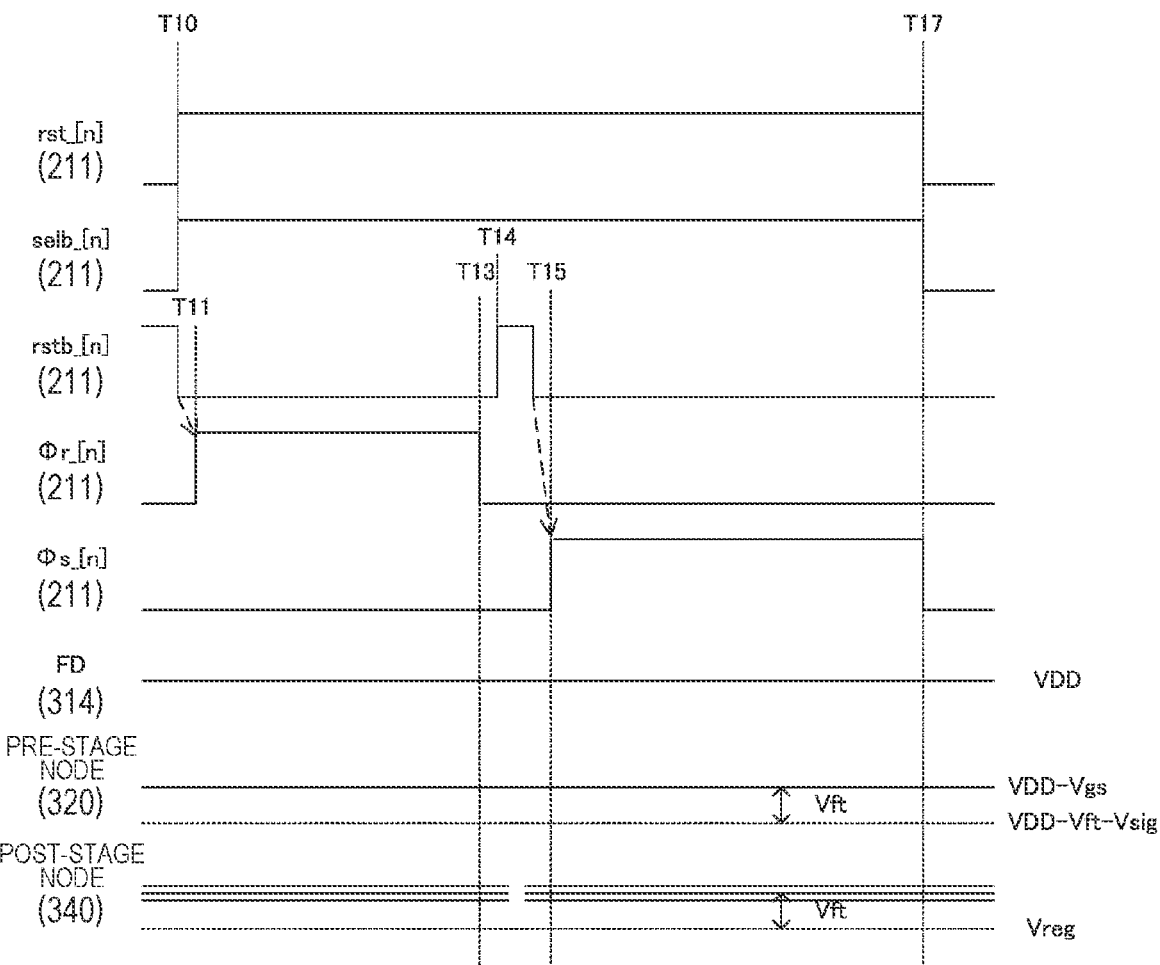
FIG. 22 is a diagram for describing variations in level caused by reset feedthrough according to the third embodiment of the present technology.

Here, consider deterioration of PRNU in the pixel 300 of the first embodiment with reference to FIGS. 21 and 22. In the first embodiment, as depicted in FIG. 21, at timing T0 immediately before the start of exposure, the potential of the FD 314 decreases due to reset feedthrough of the FD reset transistor 313. This variation is denoted as Vft.

In the first embodiment, since the power supply voltage of the FD reset transistor 313 is VDD, the potential of the FD 314 varies from VDD to VDD−Vft at timing T0. Furthermore, the potential of the pre-stage node 320 at the time of exposure becomes equal to VDD−Vft−Vsig.

Furthermore, in the first embodiment, as depicted in FIG. 22, the FD reset transistor 313 shifts to the on state at the time of reading to fix the FD 314 to the power supply voltage VDD. The potential of the pre-stage node 320 and the potential of the post-stage node 340 at the time of reading are shifted higher by about the variation Vft of the FD 314. However, due to variations in capacitance values of the capacitor elements 321 and 322 or parasitic capacitance, the shift voltage amount varies for each pixel, which causes deterioration of PRNU.

A shift amount of the post-stage node 340 in a case where the pre-stage node 320 is shifted by Vft is expressed by, for example, the following expression.

$$\{(Cs + \delta Cs)/(Cs + \delta Cs + Cp)\} * Vft \qquad \text{Expression 4}$$

In the above expression, Cs is a capacitance value of the capacitor element 322 on the signal level side, and δCs is a variation in Cs. Cp is a capacitance value of the parasitic capacitance of the post-stage node 340.

Expression 4 can be approximated by the following expression.

$$\{1 - (\delta Cs/Cs) * (Cp/Cs)\} * Vft \qquad \text{Expression 5}$$

From Expression 5, the variations of the post-stage node 340 can be expressed by the following expression.

$$\{(\delta Cs/Cs) * (Cp/Cs)\} * Vft \qquad \text{Expression 6}$$

With (δCs/Cs) set to $10^{-2}$, (Cp/Cs) set to $10^{-1}$, and Vft set to 400 millivolt (mV), PRNU is 400 μVrms according to Expression 6, which is a relatively large value.

In particular, in order to reduce kTC noise at the time of sampling and holding input conversion capacitance, it is necessary to increase a charge-voltage conversion efficiency of the FD 314. In order to increase the charge-voltage conversion efficiency, it is necessary to reduce the capacitance of the FD 314, but the smaller the capacitance of the FD 314, the larger the variation Vft, which may be several hundred millivolts (mV). In this case, PRNU impact may be non-negligible according to Expression 6.

Figure 23:
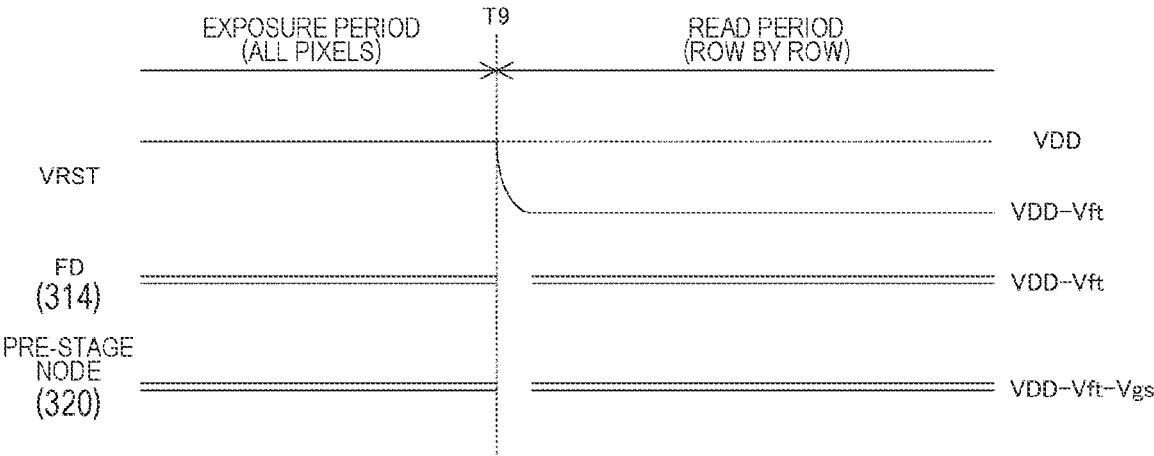
FIG. 23 is a timing chart depicting an example of voltage control according to the third embodiment of the present technology.

FIG. 23 is a timing chart depicting an example of voltage control according to the third embodiment of the present technology.

The timing control circuit 212 performs control to make the reset power supply voltage VRST for the row-by-row read period after timing T9 different from the reset power supply voltage VRST for the exposure period.

For example, for the exposure period, the timing control circuit 212 sets the reset power supply voltage VRST identical to the power supply voltage VDD. On the other hand, for the read period, the timing control circuit 212 decreases the reset power supply voltage VRST to VDD−Vft. That is, for the read period, the timing control circuit 212 decreases the reset power supply voltage VRST by amount approximately equal to the variation Vft caused by reset feedthrough. This control allows the reset level of the FD 314 at the time of exposure and the reset level at the time of reading to be identical to each other.

Controlling the reset power supply voltage VRST allows, as depicted in the drawing, a reduction in variations in voltage of the FD 314 and the pre-stage node 320. It is therefore possible to suppress variations of the capacitor elements 321 and 322 and deterioration of PRNU due to parasitic capacitance.

Note that the first to third modification examples of the first embodiment or the second embodiment may also be applied to the third embodiment.

As described above, according to the third embodiment of the present technology, since the timing control circuit 212 decreases the reset power supply voltage VRST by the variation Vft caused by reset feedthrough at the time of reading, it is possible to make the reset level at the time of exposure and the reset level at the time of reading identical to each other. It is therefore possible to suppress deterioration of photo response non-uniformity (PRNU).

4. Fourth Embodiment

In the first embodiment described above, the reset level and the signal level are read in this order for each frame, but there is a possibility that this configuration causes deterioration of photo response non-uniformity (PRNU) due to variations of the capacitor elements 321 and 322 or parasitic capacitance. A solid-state imaging element 200 of this fourth embodiment is different from the solid-state imaging element 200 of the first embodiment in that PRNU is improved by switching between the level held in the capacitor element 321 and the level held in the capacitor element 322 for each frame.

The solid-state imaging element 200 of the fourth embodiment continuously captures a plurality of frames in synchronization with the vertical synchronization signal. An odd-numbered frame is referred to as "odd frame", and an even-numbered frame is referred to as "even frame".

Figure 24:
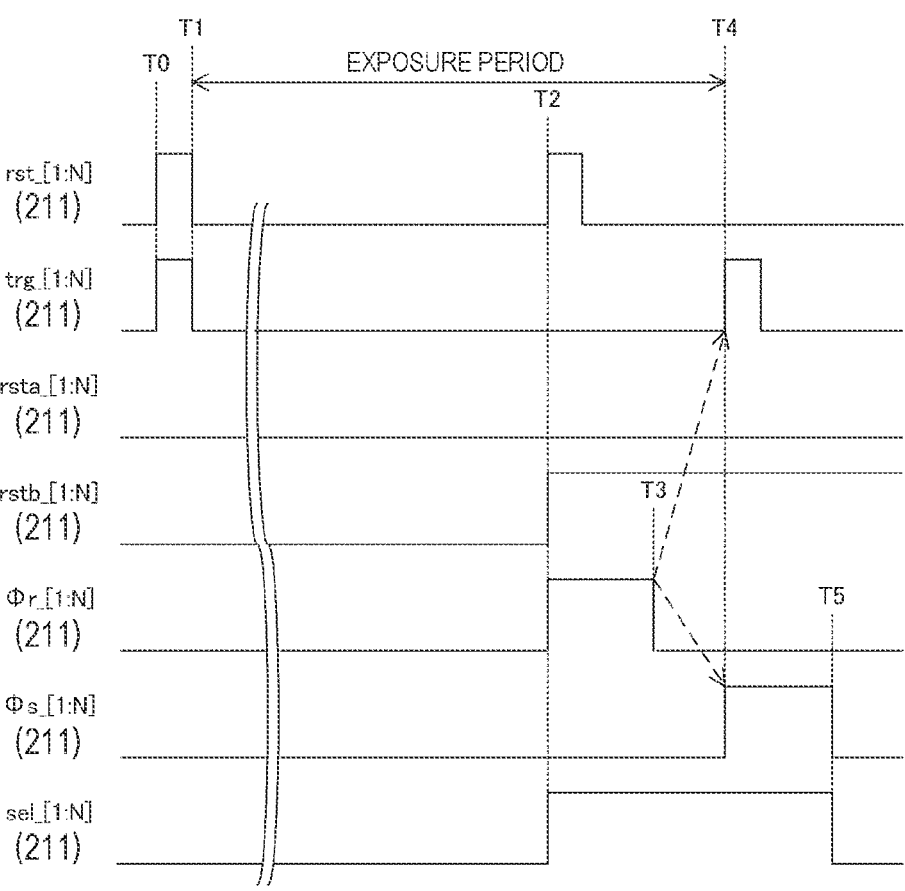
FIG. 24 is a timing chart depicting an example of a global shutter operation for odd frames according to a fourth embodiment of the present technology.

FIG. 24 is a timing chart depicting an example of a global shutter operation for the odd frame according to the fourth embodiment of the present technology. The pre-stage circuit 310 in the solid-state imaging element 200 sets the selection signal Φr and the selection signal Φs to the high level in this order within the exposure period of the odd frame, so as to cause the capacitor element 321 to hold the reset level and then cause the capacitor element 322 to hold the signal level.

Figure 25:
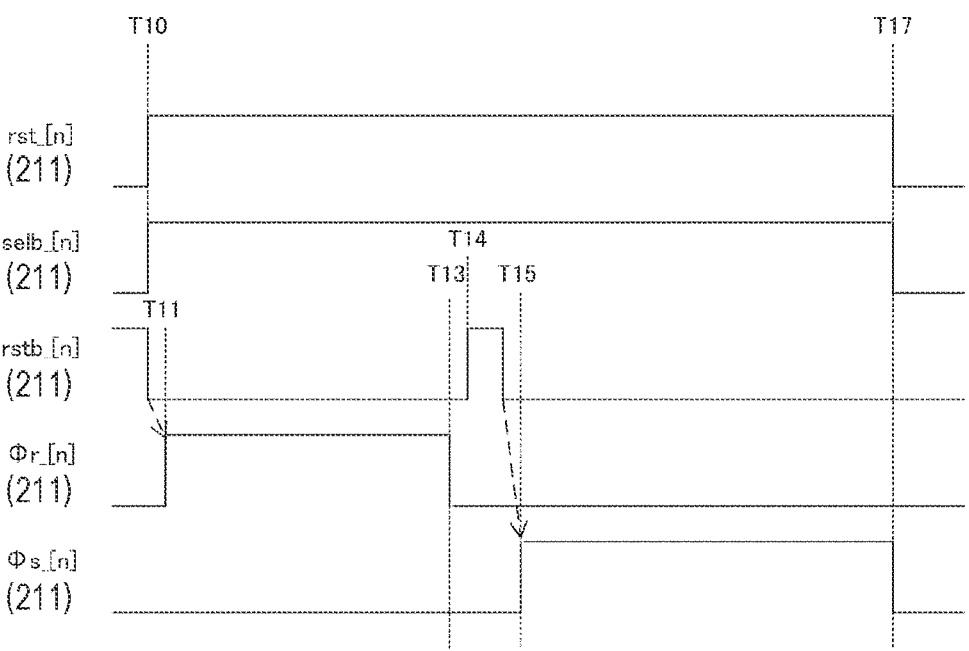
FIG. 25 is a timing chart depicting an example of a read operation for odd frames according to the fourth embodiment of the present technology.

FIG. 25 is a timing chart depicting an example of a read operation for the odd frame according to the fourth embodiment of the present technology. The post-stage circuit 350 in the solid-state imaging element 200 sets the selection signal Φr and the selection signal Φs to the high level in this order to read the reset level and the signal level in this order within the read period of the odd frame.

Figure 26:
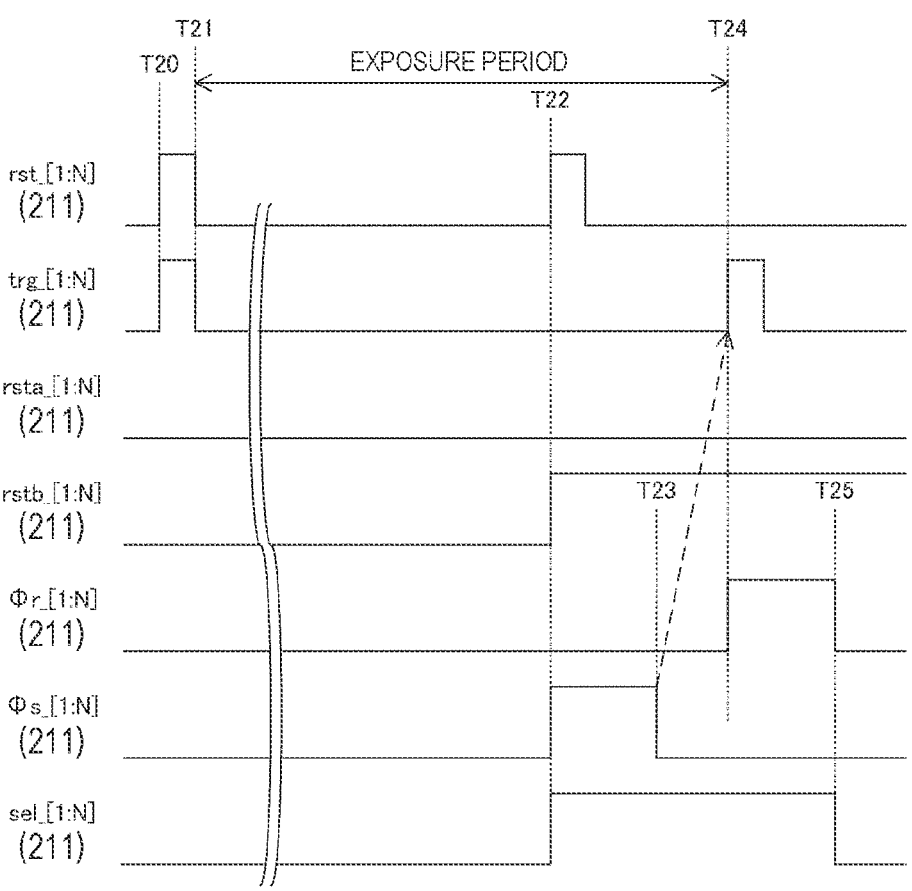
FIG. 26 is a timing chart depicting an example of a global shutter operation for even frames according to the fourth embodiment of the present technology.

FIG. 26 is a timing chart depicting an example of a global shutter operation for the even frame according to the fourth embodiment of the present technology. The pre-stage circuit 310 in the solid-state imaging element 200 sets the selection signal Φs and the selection signal Φr to the high level in this order within the exposure period of the even frame, so as to cause the capacitor element 322 to hold the reset level and then cause the capacitor element 321 to hold the signal level.

Figure 27:
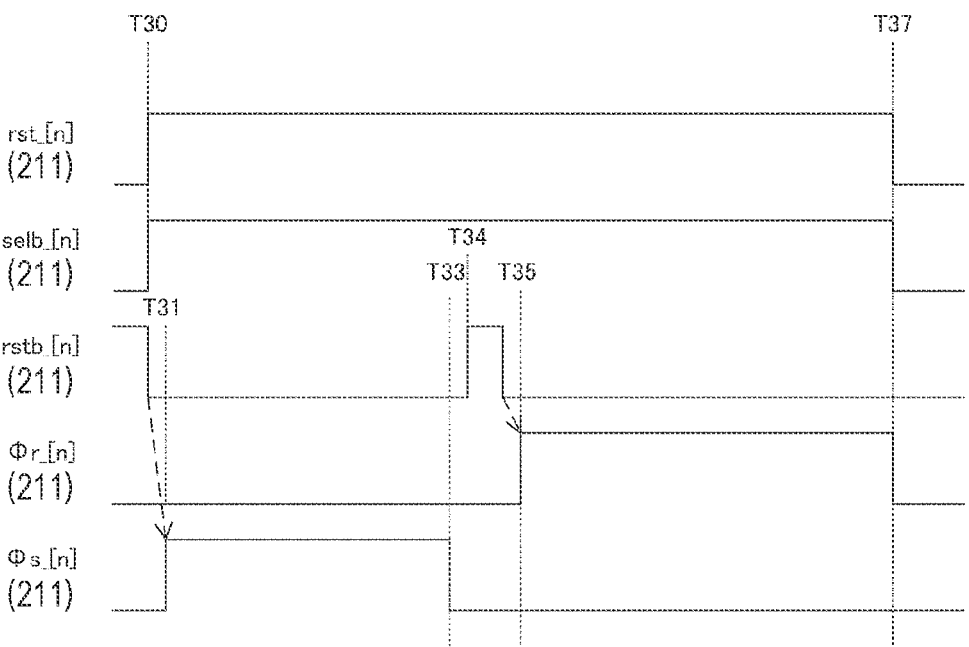
FIG. 27 is a timing chart depicting an example of a read operation for even frames according to the fourth embodiment of the present technology.

FIG. 27 is a timing chart depicting an example of a read operation for the even frame according to the fourth embodiment of the present technology. The post-stage circuit 350 in the solid-state imaging element 200 sets the selection signal Φs and the selection signal Φr to the high level in this order to read the reset level and the signal level in this order within the read period of the even frame.

As depicted in FIGS. 24 and 26, the levels held in the capacitor elements 321 and 322 are reversed between the even frame and the odd frame. This also reverses the polarity of PRNU between the even frame and the odd frame. The column signal processing circuit 260 in the subsequent stage obtains an arithmetic mean of the odd frame and the even frame. It is therefore possible to cancel out PRNU with opposite polarities.

This control is effective in capturing a moving image or adding up frames. Furthermore, it is not necessary to add an element to the pixel 300, and it can be realized only by changing a driving system.

Note that the first and third modification examples of the first embodiment, the second embodiment, or the third embodiment may also be applied to the fourth embodiment.

As described above, in the fourth embodiment of the present technology, since the level held in the capacitor element 321 and the level held in the capacitor element 322 are reversed between the odd frame and the even frame, the polarity of PRNU can be reversed between the odd frame and the even frame. The column signal processing circuit 260 adds up the odd frame and the even frame, so that it is possible to suppress deterioration of PRNU.

5. Fifth Embodiment

In the first embodiment described above, the column signal processing circuit 260 obtains a difference between the reset level and the signal level for each column. There is, however, a possibility that this configuration suffers, when very high intensity light is incident on the pixel, a black spot phenomenon in which luminance decreases due to overflow of charges from the photoelectric conversion element 311 and sinks into black. A solid-state imaging element 200 of this fifth embodiment is different from the solid-state imaging element 200 of the first embodiment in that whether or not the black spot phenomenon has occurred is determined for each pixel.

Figure 28:
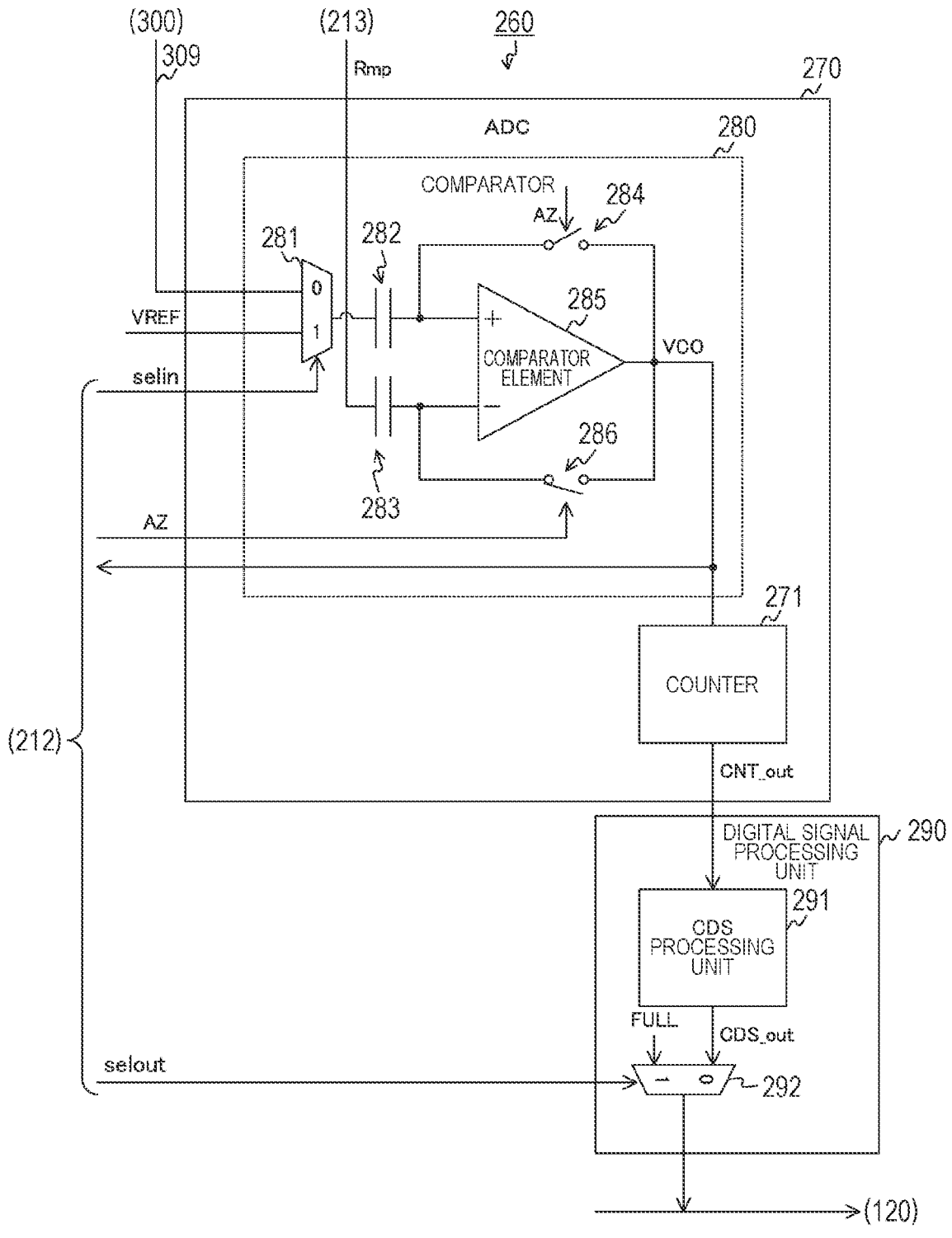
FIG. 28 is a circuit diagram depicting a configuration example of a column signal processing circuit according to a fifth embodiment of the present technology.

FIG. 28 is a circuit diagram depicting a configuration example of the column signal processing circuit 260 according to the fifth embodiment of the present technology. In the column signal processing circuit 260 of this fifth embodiment, a plurality of ADCs 270 and a digital signal processing unit 290 are arranged. Furthermore, in the digital signal processing unit 290, a plurality of CDS processing units 291 and a plurality of selectors 292 are arranged. The ADC 270, the CDS processing unit 291, and the selector 292 are provided for each column.

Furthermore, the ADC 270 includes a comparator 280 and a counter 271. The comparator 280 compares the level of the vertical signal line 309 with the ramp signal Rmp from the DAC 213, and outputs a comparison result VCO. The comparison result VCO is supplied to the counter 271 and the timing control circuit 212. The comparator 280 includes a selector 281, capacitor elements 282 and 283, auto-zero switches 284 and 286, and a comparator element 285.

The selector 281 connects either the vertical signal line 309 of the corresponding column or a node of a predetermined reference voltage VREF to a non-inverting input terminal (+) of the comparator element 285 via the capacitor element 282 in accordance with an input-side selection signal selin. The input-side selection signal selin is supplied from the timing control circuit 212.

The comparator element 285 compares a level of the non-inverting input terminal (+) with a level of an inverting input terminal (−), and outputs the comparison result VCO to the counter 271. The ramp signal Rmp is input to the inverting input terminal (−) via the capacitor element 283.

The auto-zero switch 284 short-circuits the non-inverting input terminal (+) and an output terminal of the comparison result VCO in accordance with an auto-zero signal Az from the timing control circuit 212. The auto-zero switch 286 short-circuits the inverting input terminal (−) and the output terminal of the comparison result VCO in accordance with the auto-zero signal Az.

The counter 271 counts a count value over a period until the comparison result VCO is inverted, and outputs a digital signal CNT_out indicating the count value to the CDS processing unit 291.

The CDS processing unit 291 performs CDS processing on the digital signal CNT_out. The CDS processing unit 291 calculates a difference between the digital signal CNT_out corresponding to the reset level and the digital signal CNT_out corresponding to the signal level, and outputs the difference to the selector 292 as CDS_out.

The selector 292 outputs, in accordance with an output-side selection signal selout from the timing control circuit 212, either the digital signal CDS_out subjected to the CDS processing or a full-code digital signal FULL as pixel data of the corresponding column.

Figure 29:
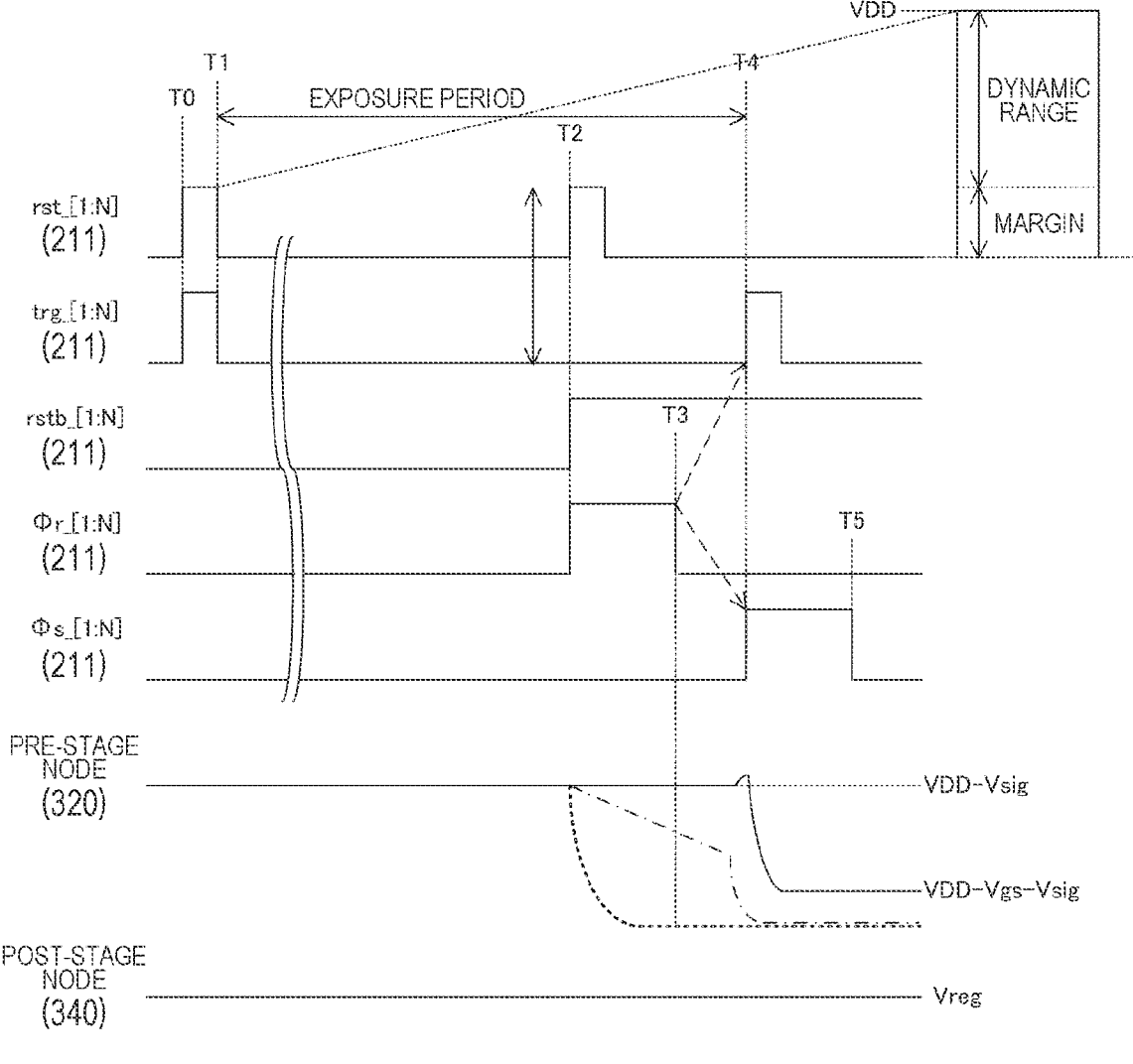
FIG. 29 is a timing chart depicting an example of a global shutter operation according to the fifth embodiment of the present technology.

FIG. 29 is a timing chart depicting an example of a global shutter operation according to the fifth embodiment of the present technology. A method for controlling transistors at the time of global shutter of the fifth embodiment is similar to the method of the first embodiment.

Here, it is assumed that very high intensity light is incident on the pixel 300. In this case, the photoelectric conversion element 311 becomes full of charges and the charges overflow from the photoelectric conversion element 311 to the FD 314, thereby causing a decrease in potential of the FD 314 subjected to the FD reset. A long dashed short dashed line in the drawing indicates variations in potential of the FD 314 when weak sunlight that causes a relatively small amount of charges to overflow is incident. A dotted line in the drawing indicates variations in potential of the FD 314 when strong sunlight that causes a relatively large amount of charges to overflow is incident.

When weak sunlight is incident, the reset level is dropping at timing T3 that is the end of the FD reset, but the level does not fully drop at this time.

On the other hand, when strong sunlight is incident, the reset level fully drops at timing T3. In this case, the signal level becomes the same as the reset level, and the potential difference between the signal level and the reset level becomes "0", so that the digital signal subjected to the CDS processing becomes the same as a digital signal in a dark state and sinks into black. As described above, a phenomenon in which the pixel becomes black even though very high intensity light such as sunlight is incident is called a black spot phenomenon or blooming.

Furthermore, when the level of the FD 314 of the pixel in which the black spot phenomenon has occurred is too low, the operating point of the pre-stage circuit 310 cannot be secured, and the current id1 of the current source transistor 316 varies accordingly. Since the current source transistor 316 of each pixel is connected to a common power supply or ground, when a certain pixel suffers variations in current, variations in IR drop in the pixel affect a sample level of another pixel. A pixel in which the black spot phenomenon occurs becomes an aggressor, and a pixel in which the sample level varies in a manner that depends on the pixel (aggressor) becomes a victim. As a result, streaking noise occurs.

Note that, in a case where the discharge transistor 317 is provided as in the second embodiment, in a pixel suffering a black spot (blooming), overflow charges are discharged toward the discharge transistor 317, so that the black spot phenomenon is less likely to occur. However, even if the discharge transistor 317 is provided, some charges may flow to the FD 314, and there is a possibility that the black spot phenomenon is difficult to get rid of completely. Moreover, there is also a disadvantage that a ratio of the effective area/the charge amount for each pixel decreases due to the addition of the discharge transistor 317. It is therefore desirable to suppress the black spot phenomenon without using the discharge transistor 317.

As a method for suppressing the black spot phenomenon without using the discharge transistor 317, there are two possible methods. The first is adjustment of a clip level of the FD 314. The second is a method in which whether or not the black spot phenomenon has occurred at the time of reading is determined, and when the black spot phenomenon has occurred, the output is replaced with the full code.

Under the first method, the high level of the FD reset signal rst (in other words, the gate of the FD reset transistor 313) in the drawing corresponds to the power supply voltage VDD, and the low level corresponds to the clip level of the FD 314. In the first embodiment, a difference between the high level and the low level (that is, amplitude) is set to a value corresponding to a dynamic range. On the other hand, in the fifth embodiment, the value is adjusted to a value plus an additional margin. Here, the value corresponding to the dynamic range corresponds to a difference between the power supply voltage VDD and the potential of the FD 314 when the digital signal becomes the full code.

Lowering the gate voltage (the low level of the FD reset signal rst) when the FD reset transistor 313 is off makes it possible to prevent the FD 314 from being excessively lowered due to blooming and the operating point of the pre-stage amplification transistor 315 from being lost.

Note that the dynamic range varies in a manner that depends on the analog gain of the ADC. When the analog gain is low, the dynamic range needs to be larger, and on the other hand, when the analog gain is high, the dynamic range can be less. It is therefore possible to change the gate voltage when the FD reset transistor 313 is off in accordance with the analog gain.

Figure 30:
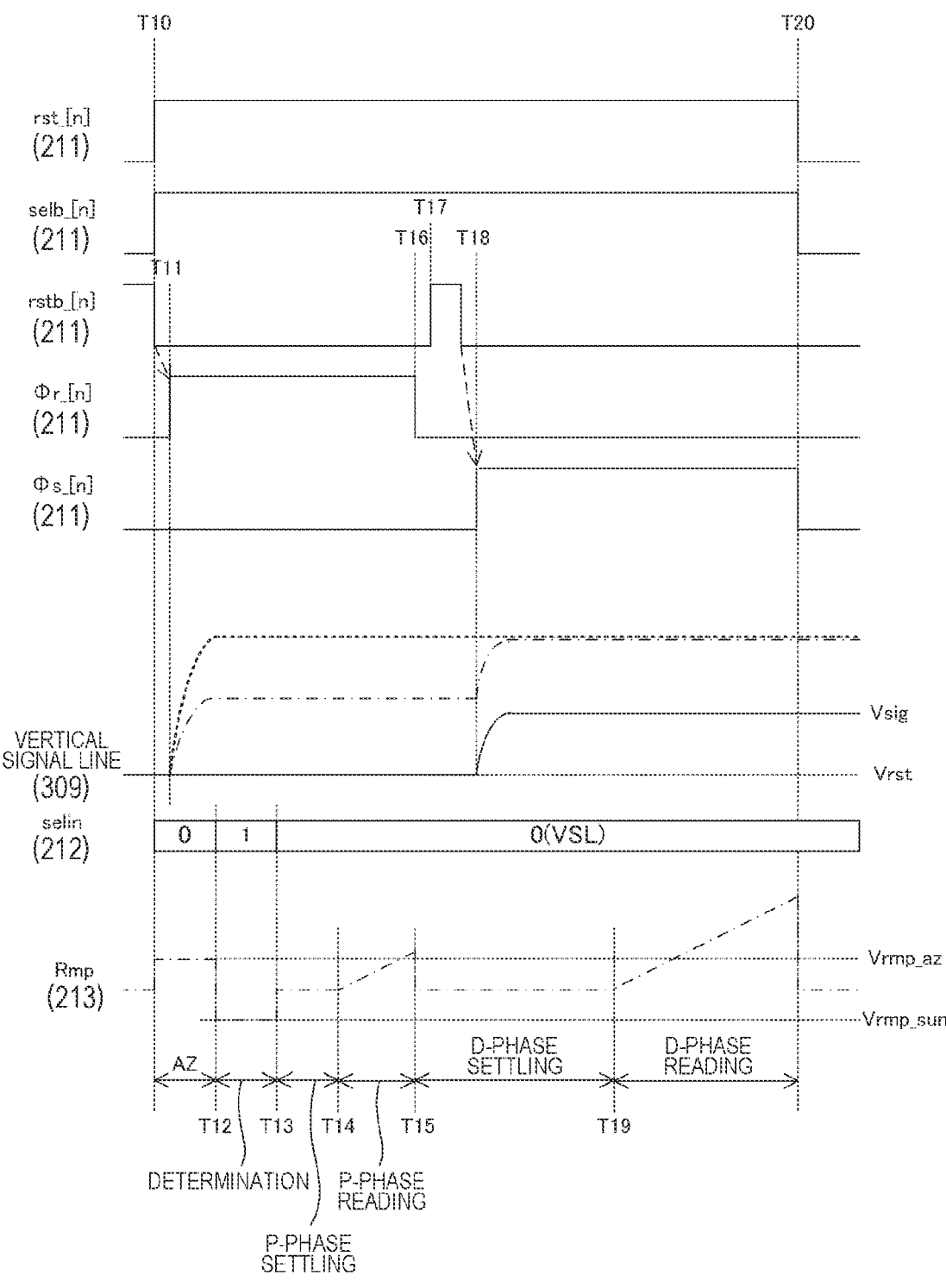
FIG. 30 is a timing chart depicting an example of a read operation according to the fifth embodiment of the present technology.

FIG. 30 is a timing chart depicting an example of a read operation according to the fifth embodiment of the present technology. When the selection signal Φr becomes the high level at timing T11 immediately after timing T10 that is the start of reading, the potential of the vertical signal line 309 varies in the pixel on which sunlight is incident. A long dashed short dashed line in the drawing indicates variations in potential of the vertical signal line 309 when weak sunlight is incident. A dotted line in the drawing indicates variations in potential of the vertical signal line 309 when strong sunlight is incident.

In an auto-zero period from timing T10 to timing T12, the timing control circuit 212 supplies, for example, the input-side selection signal selin of "0" to connect the comparator element 285 to the vertical signal line 309. Within this auto-zero period, the timing control circuit 212 performs auto-zeroing using the auto-zero signal Az.

Under the second method, the timing control circuit 212 supplies, for example, the input-side selection signal selin of "1" within a determination period from timing T12 to timing T13. The input-side selection signal selin disconnects the comparator element 285 from the vertical signal line 309 and connects the comparator element 285 to the node of the reference voltage VREF. The reference voltage VREF is set to an expected value of the level of the vertical signal line 309 when blooming does not occur. For example, when the gate-source voltage of the post-stage amplification transistor 351 is denoted as Vgs2, Vrst corresponds to Vreg–Vgs2. Furthermore, the DAC 213 lowers the level of the ramp signal Rmp from Vrmp_az to Vrmp_sun within the determination period.

Furthermore, in a case where blooming does not occur within the determination period, the reset level Vrst of the vertical signal line 309 is almost the same as the reference voltage VREF, and is not much different from when the potential of the inverting input terminal (+) of the comparator element 285 is auto-zero. On the other hand, since the non-inverting input terminal (−) lowers from Vrmp_az to Vrmp_sun, the comparison result VCO becomes the high level.

Conversely, in a case where blooming occurs, the reset level Vrst becomes sufficiently higher than the reference voltage VREF, and the comparison result VCO becomes the low level when the following expression is satisfied.

$$Vrst - VREF > \text{Vrmp\_az} - \text{Vrmp\_sun} \qquad \text{Expression 7}$$

That is, the timing control circuit 212 can determine whether or not blooming has occurred on the basis of whether or not the comparison result VCO becomes the low level within the determination period.

Note that it is necessary to secure some large margin for sun determination (the right side of Expression 7) so as to prevent erroneous determination due to variations in threshold voltage of the post-stage amplification transistor 351, IR drop differences of the in-plane Vreg, or the like.

After timing T13 after the end of the determination period, the timing control circuit 212 connects the comparator element 285 to the vertical signal line 309. Furthermore, after a P-phase settling period from timing T13 to timing T14, the P-phase is read within a period from timing T14 to timing T15. After a D-phase settling period from timing T15 to timing T19 elapses, the D-phase is read within a period from timing T19 to timing T20.

When determining that blooming has not occurred over the determination period, the timing control circuit 212 controls the selector 292 in accordance with the output-side selection signal selout to output the digital signal CDS_out subjected to the CDS processing as it is.

On the other hand, when determining that blooming has occurred over the determination period, the timing control circuit 212 controls the selector 292 in accordance with the output-side selection signal selout to output the full code FULL instead of the digital signal CDS_out subjected to the CDS processing. It is therefore possible to suppress the black spot phenomenon.

Note that the first to third modification examples of the first embodiment, or the second to fourth embodiments may also be applied to the fifth embodiment.

As described above, according to the fifth embodiment of the present technology, since the timing control circuit 212 determines whether or not the black spot phenomenon has occurred on the basis of the comparison result VCO, and outputs the full code when the black spot phenomenon has occurred, it is possible to suppress the black spot phenomenon.

6. Sixth Embodiment

In the first embodiment described above, the vertical scanning circuit 211 performs control to simultaneously expose all the rows (all the pixels) (that is, the global shutter operation). In a case where the simultaneity of exposure is not required, but low noise is required, such as at the time of test or analysis, it is, however, desirable to perform a rolling shutter operation. A solid-state imaging element 200 of this sixth embodiment is different from the solid-state imaging element 200 of the first embodiment in that the rolling shutter operation is performed at the time of test or the like.

Figure 31:
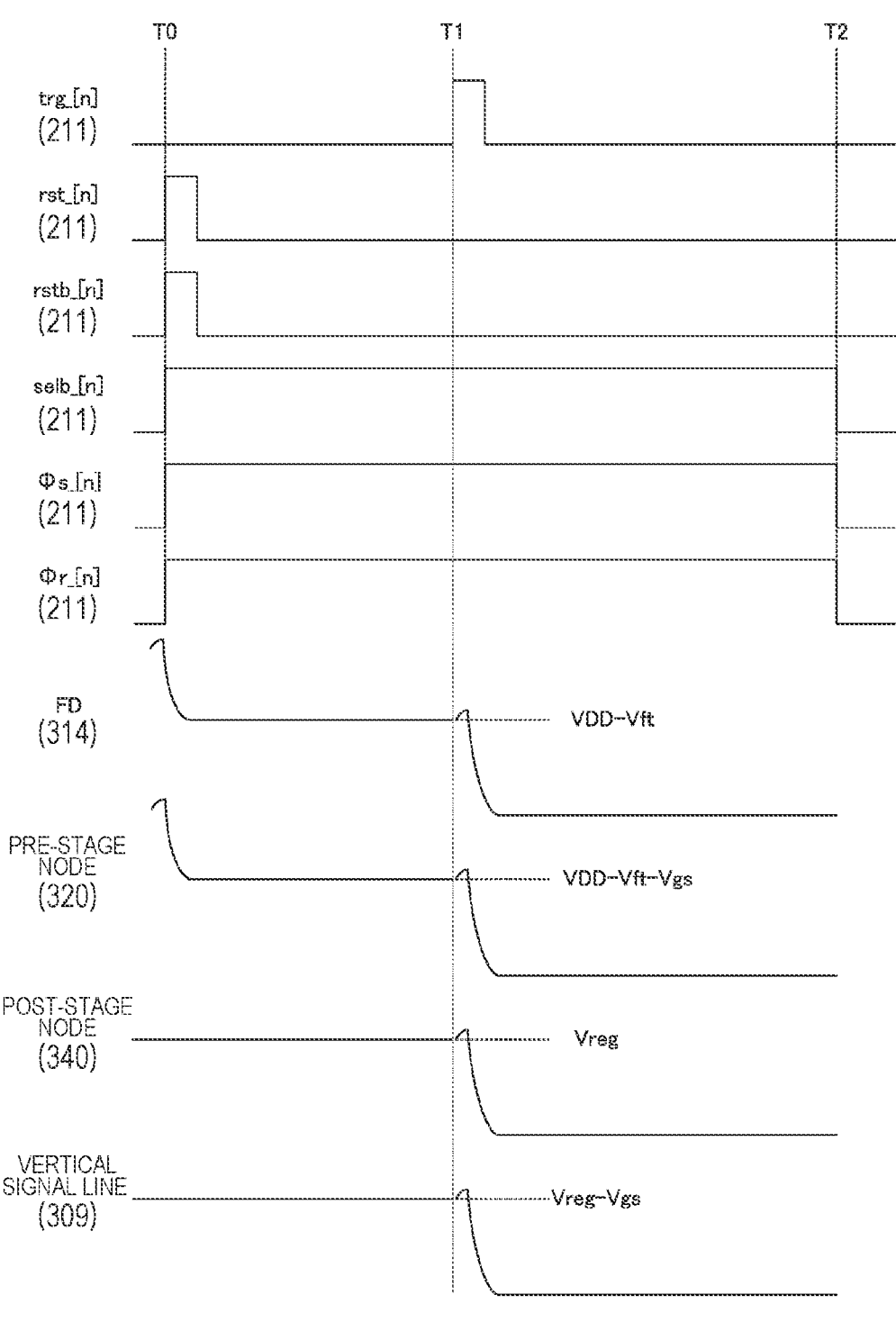
FIG. 31 is a timing chart depicting an example of a rolling shutter operation according to a sixth embodiment of the present technology.

FIG. 31 is a timing chart depicting an example of the rolling shutter operation according to the sixth embodiment of the present technology. The vertical scanning circuit 211 performs control to sequentially select a plurality of rows and start exposure. This drawing depicts exposure control of the n-th row.

Over a period from timing T0 to timing T2, the vertical scanning circuit 211 supplies the high-level post-stage selection signal selb, the high-level selection signal ør, and the high-level selection signal Φs to the n-th row. Furthermore, at timing T0 that is the start of exposure, the vertical scanning circuit 211 supplies the high-level FD reset signal rst and the high-level post-stage reset signal rstb to the n-th row over the pulse period. At timing T1 that is the end of exposure, the vertical scanning circuit 211 supplies the transfer signal trg to the n-th row. The rolling shutter operation in the drawing allows the solid-state imaging element 200 to generate low-noise image data.

Note that, during normal imaging, the solid-state imaging element 200 of the sixth embodiment performs the global shutter operation in a manner similar to the first embodiment.

Note that the first to third modification examples of the first embodiment, or the second to fifth embodiments may also be applied to the sixth embodiment.

As described above, according to the sixth embodiment of the present technology, since the vertical scanning circuit 211 performs control to sequentially select a plurality of rows and start exposure (that is, the rolling shutter operation), it is possible to generate low-noise image data.

7. Seventh Embodiment

In the first embodiment described above, the source of the pre-stage source follower (the pre-stage amplification transistor 315 and the current source transistor 316) is connected to the power supply voltage VDD, and row-by-row reading is performed with the source follower in the on state. There is, however, a possibility that this driving method causes circuit noise of the pre-stage source follower at the time of row-by-row reading to propagate to the subsequent stages, and random noise increases accordingly. A solid-state imaging element 200 of this seventh embodiment is different from the solid-state imaging element 200 of the first embodiment in that the pre-stage source follower is brought into the off state at the time of reading to reduce noise.

Figure 32:
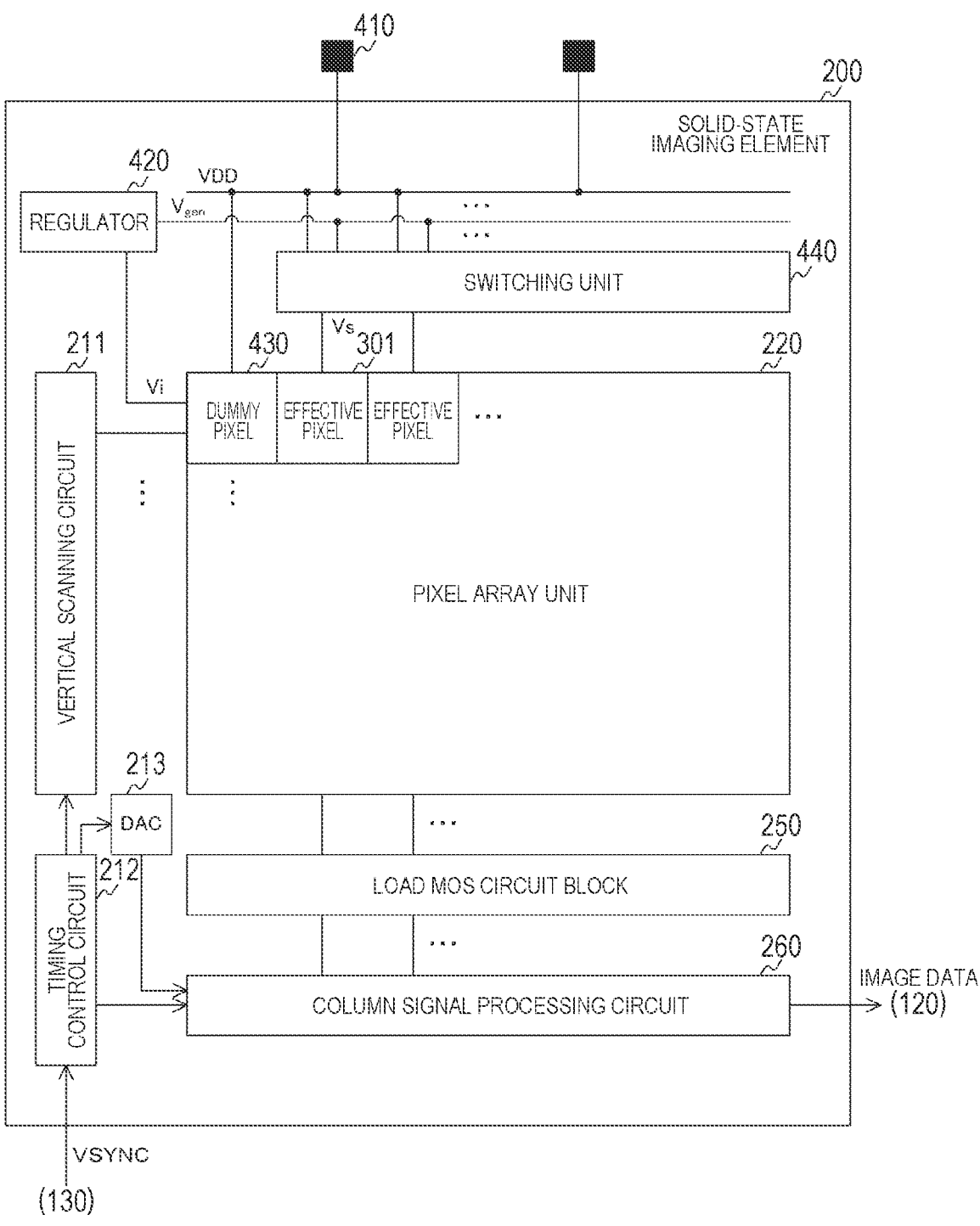
FIG. 32 is a block diagram depicting a configuration example of a solid-state imaging element according to a seventh embodiment of the present technology.

FIG. 32 is a block diagram depicting a configuration example of the solid-state imaging element 200 according to the seventh embodiment of the present technology. The solid-state imaging element 200 of this seventh embodiment is different from the solid-state imaging element 200 of the first embodiment in that a regulator 420 and a switching unit 440 are further provided. Furthermore, in the pixel array unit 220 of the seventh embodiment, a plurality of effective pixels 301 and a predetermined number of dummy pixels 430 are arranged. The dummy pixels 430 are arranged around a region where the effective pixels 301 are arranged.

Furthermore, the power supply voltage VDD is supplied to each of the dummy pixels 430, and the power supply voltage VDD and a source voltage Vs are supplied to each of the effective pixels 440. A signal line through which the power supply voltage VDD is supplied to the effective pixels 301 is omitted in the drawing. Furthermore, the power supply voltage VDD is supplied from a pad 410 located outside the solid-state imaging element 200.

The regulator 420 generates a constant generated voltage $V_{gen}$ on the basis of an input potential Vi from the dummy pixel 430 and supplies the generated voltage $V_{gen}$ to the switching unit 440. The switching unit 440 selects either the power supply voltage VDD from the pad 410 or the generated voltage $V_{gen}$ from the regulator 420, and supplies the selected voltage as the source voltage Vs to each of the columns of the effective pixels 301.

Figure 33A:
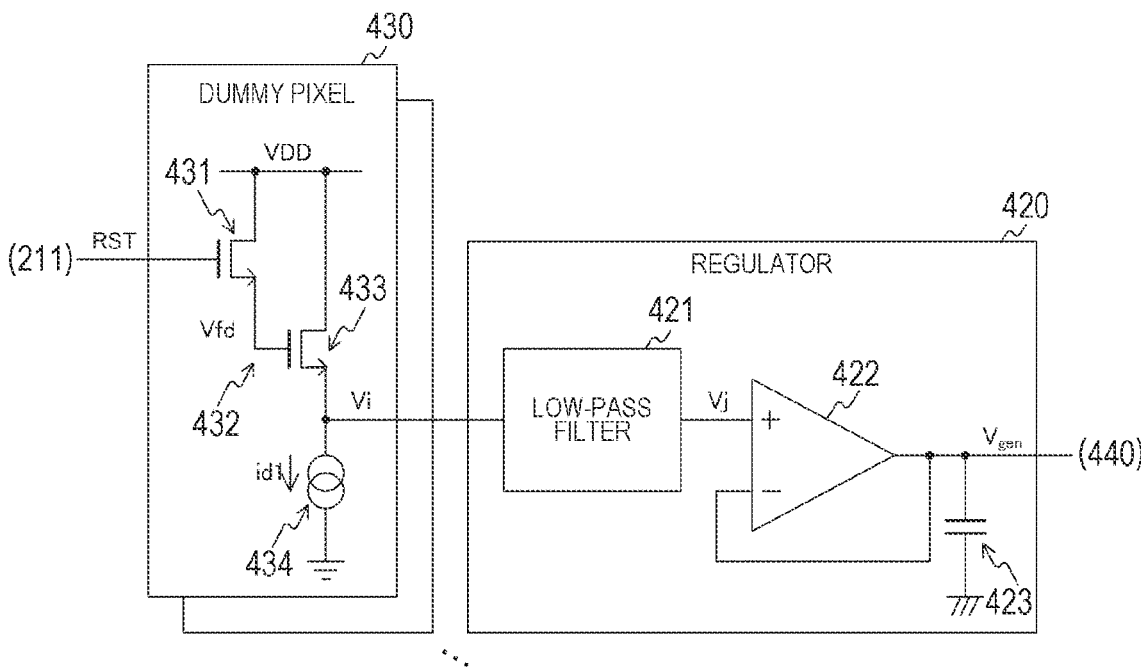
FIGS. 33A and 33B are circuit diagrams depicting a configuration example of a dummy pixel, a regulator, and a switching unit according to the seventh embodiment of the present technology.
Figure 33B:
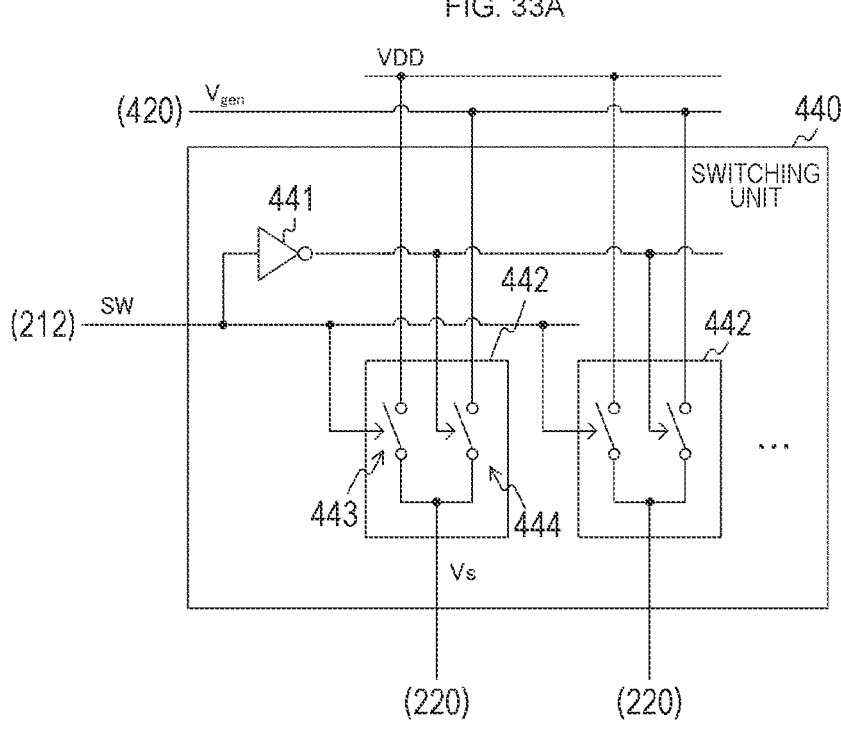

FIGS. 33A and 33B are circuit diagrams depicting a configuration example of the dummy pixel 430, the regulator 420, and the switching unit 440 according to the seventh embodiment of the present technology. Of the drawing, FIG. 33A indicates a circuit diagram of the dummy pixel 430 and the regulator 420, and FIG. 33B of the drawing indicates a circuit diagram of the switching unit 440.

As depicted in FIG. 33A of the drawing, the dummy pixel 430 includes a reset transistor 431, an FD 432, an amplification transistor 433, and a current source transistor 434. The reset transistor 431 initializes the FD 432 in accordance with a reset signal RST from the vertical scanning circuit 211. The FD 432 accumulates charges, and generates a voltage corresponding to a charge amount. The amplification transistor 433 amplifies a level of a voltage of the FD 432 and supplies the amplified voltage as the input voltage Vi to the regulator 420.

Furthermore, the FD reset transistor 431 and the amplification transistor 433 have their respective sources connected to the power supply voltage VDD. The current source transistor 434 is connected to a drain of the amplification transistor 433. The current source transistor 434 supplies the current id1 under the control of the vertical scanning circuit 211.

The regulator 420 includes a low-pass filter 421, a buffer amplifier 422, and a capacitor element 423. The low-pass filter 421 passes, as an output voltage Vj, a component in a low-frequency band below a predetermined frequency out of a signal of the input voltage Vi.

The output voltage Vj is input to a non-inverting input terminal (+) of the buffer amplifier 422. An inverting input terminal (−) of the buffer amplifier 422 is connected to an output terminal of the buffer amplifier 422. The capacitor element 423 holds a voltage of the output terminal of the buffer amplifier 422 as $V_{gen}$. This $V_{gen}$ is supplied to the switching unit 440.

As depicted in FIG. 33B of the drawing, the switching unit 440 includes an inverter 441 and a plurality of switching circuits 442. The switching circuits 442 are each arranged for a corresponding one of the columns of the effective pixels 301.

The inverter 441 inverts a switching signal SW sent from the timing control circuit 212. The inverter 441 supplies the inverted signal to each of the switching circuits 442.

The switching circuit 442 selects either the power supply voltage VDD or the generated voltage $V_{gen}$ and supplies the selected voltage as the source voltage Vs to the corresponding column in the pixel array unit 220. The switching circuit 442 includes switches 443 and 444. The switch 443 opens and closes a path between the node of the power supply voltage VDD and the corresponding column in accordance with the switching signal SW. The switch 444 opens and closes a path between the node of the generated voltage $V_{gen}$ and the corresponding column in accordance with the inverted signal of the switching signal SW.

Figure 34:
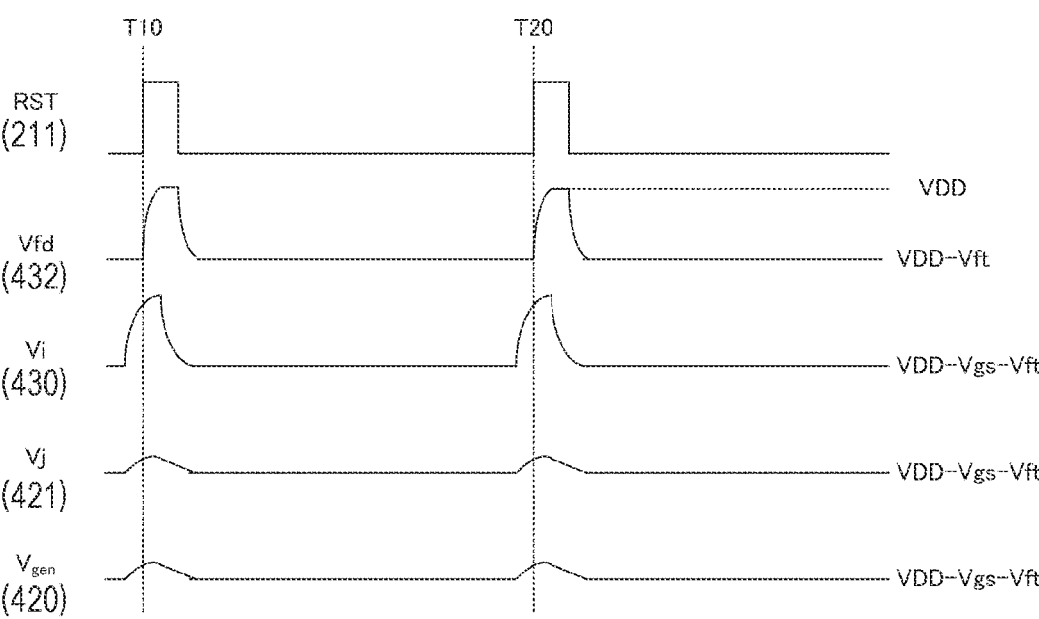
FIG. 34 is a timing chart depicting an example of how the dummy pixel and the regulator operate according to the seventh embodiment of the present technology.

FIG. 34 is a timing chart depicting an example of how the dummy pixel 430 and the regulator 420 operate according to the seventh embodiment of the present technology. At timing T10 immediately before reading of a certain row, the vertical scanning circuit 211 supplies a high-level reset signal RST (here, the power supply voltage VDD) to each of the dummy pixels 430. A potential Vfd of the FD 432 in the dummy pixel 430 is initialized to the power supply voltage VDD. Then, when the reset signal RST becomes the low level, reset feedthrough causes a change to VDD−Vft.

Furthermore, the input voltage Vi decreases to VDD−Vgs−Vsig after the reset. Passing through the low-pass filter 421 makes Vj and $V_{gen}$ almost constant.

After timing T20 immediately before reading of the next row, similar control is performed for each row, and the constant generated voltage $V_{gen}$ is supplied.

Figure 35:
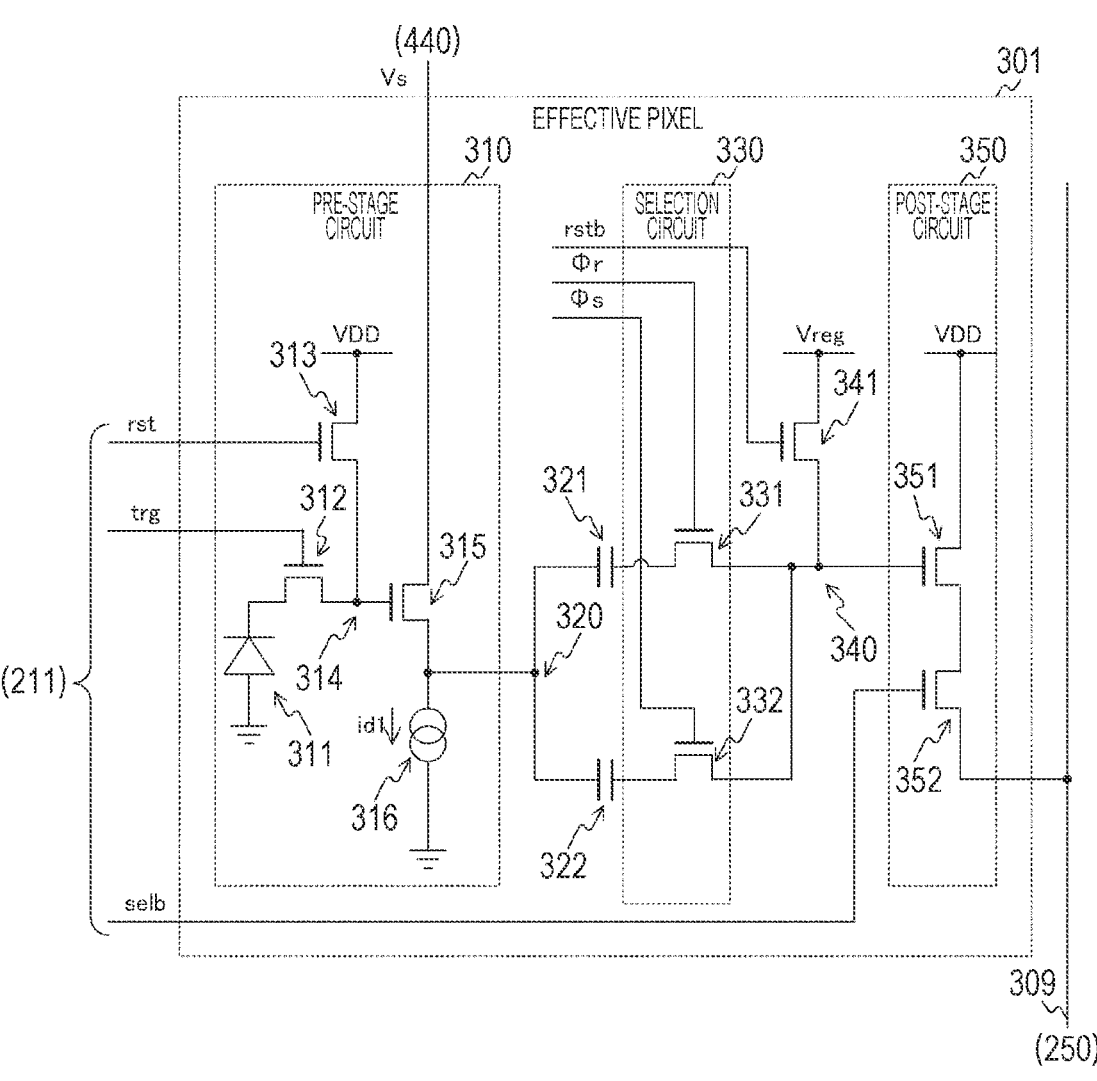
FIG. 35 is a circuit diagram depicting a configuration example of an effective pixel according to the seventh embodiment of the present technology.

FIG. 35 is a circuit diagram depicting a configuration example of the effective pixel 301 according to the seventh embodiment of the present technology. The effective pixel 301 is similar in circuit configuration to the pixel 300 of the first embodiment except that the source voltage Vs from the switching unit 440 is supplied to the source of the pre-stage amplification transistor 315.

Figure 36:
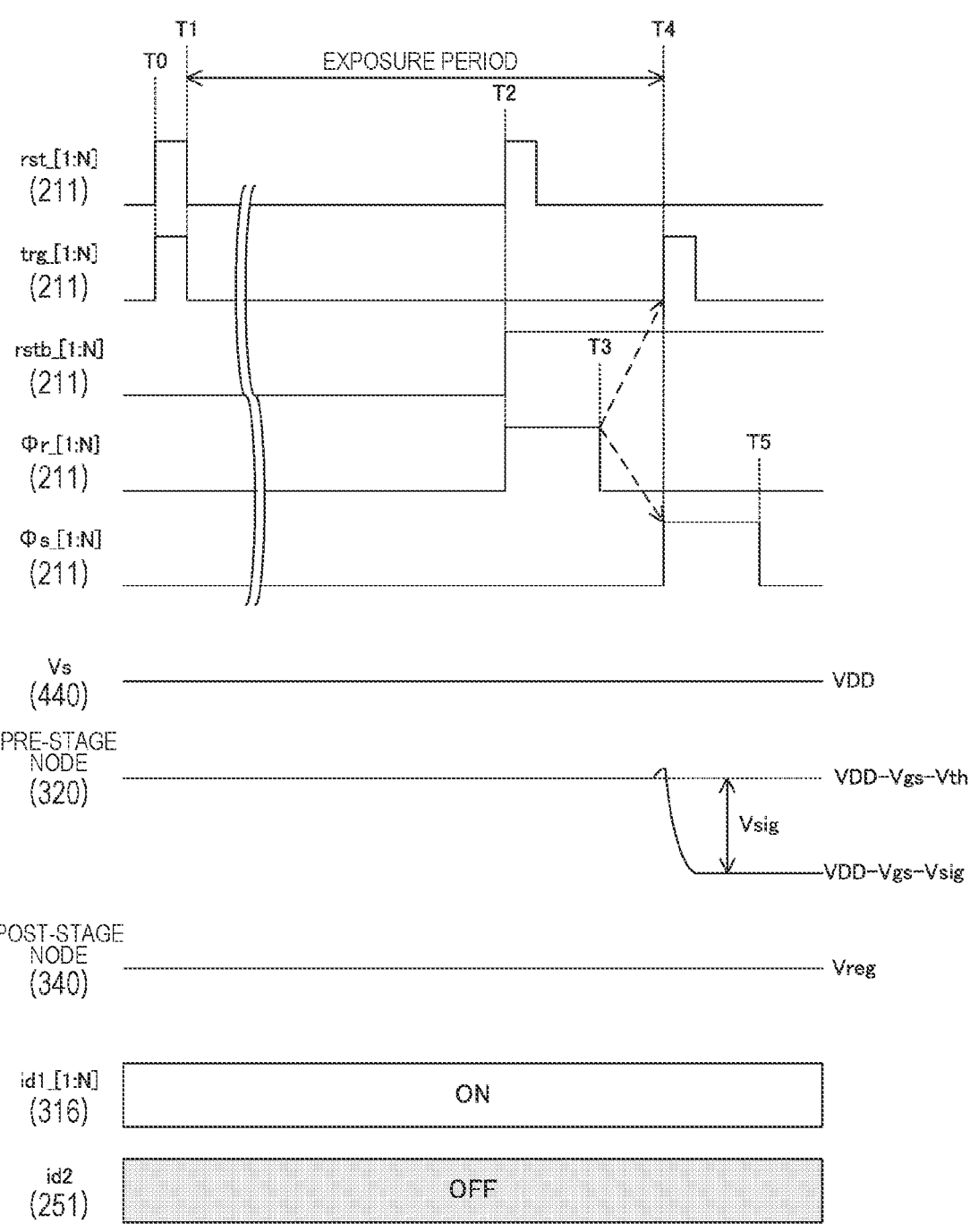
FIG. 36 is a timing chart depicting an example of a global shutter operation according to the seventh embodiment of the present technology.

FIG. 36 is a timing chart depicting an example of a global shutter operation according to the seventh embodiment of the present technology. In the seventh embodiment, when all the pixels are exposed simultaneously, the switching unit 440 selects the power supply voltage VDD and supplies the power supply voltage VDD as the source voltage Vs. Furthermore, the voltage of the pre-stage node decreases from VDD−Vgs−Vth to VDD−Vgs−Vsig at timing T4. Here, Vth represents a threshold voltage of the transfer transistor 312.

Figure 37:
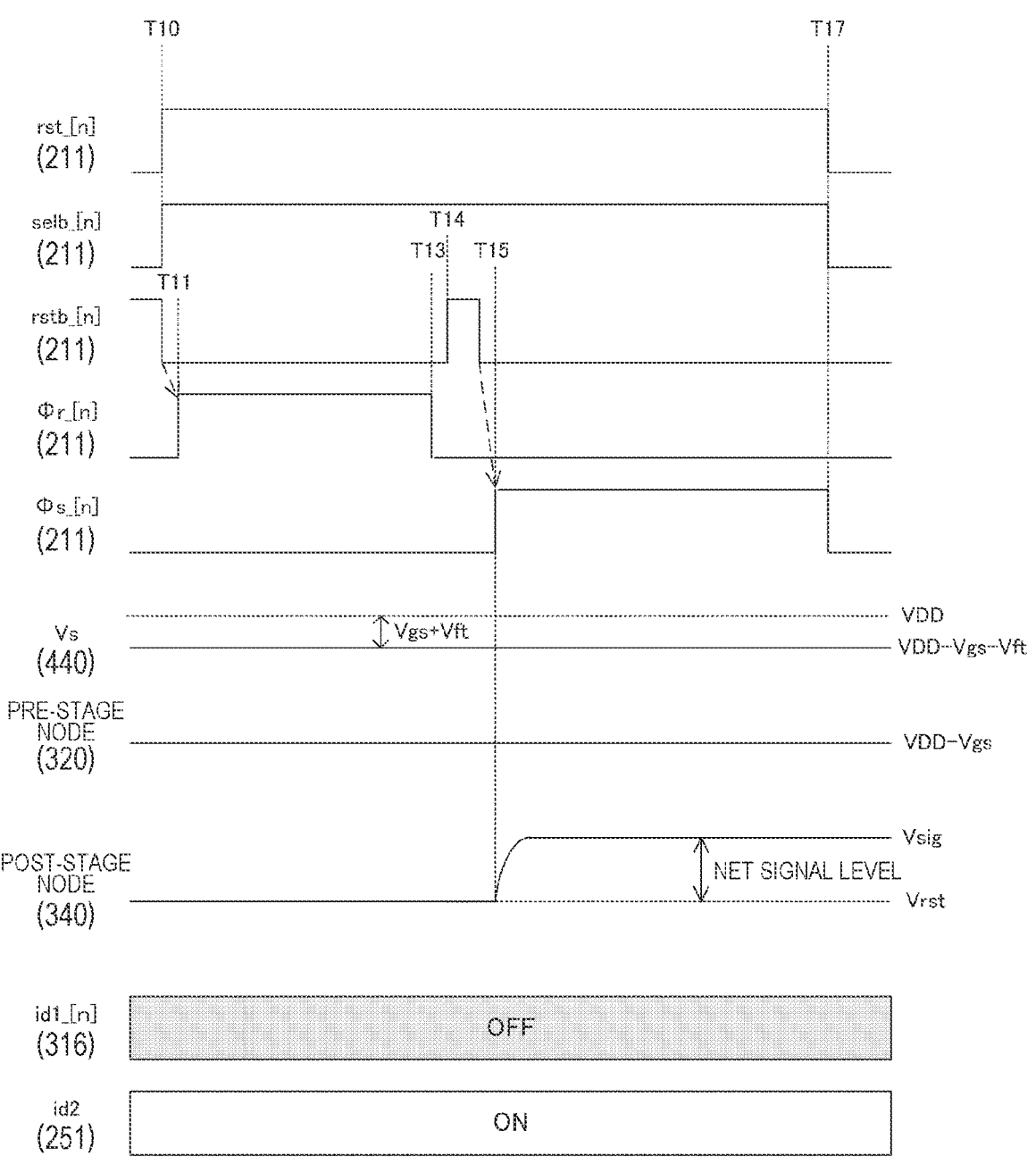
FIG. 37 is a timing chart depicting an example of a read operation according to the seventh embodiment of the present technology.

FIG. 37 is a timing chart depicting an example of a read operation according to the seventh embodiment of the present technology. In the seventh embodiment, at the time of reading, the switching unit 440 selects the generated voltage $V_{gen}$ and supplies the generated voltage $V_{gen}$ as the source voltage Vs. The generated voltage $V_{gen}$ is adjusted to VDD−Vgs−Vft. Furthermore, in the seventh embodiment, the vertical scanning circuit 211 controls the current source transistors 316 of all the rows (all the pixels) to stop the supply of the current id1.

FIG. 38 is a diagram for describing effects according to the seventh embodiment of the present technology. In the first embodiment, the source follower (the pre-stage amplification transistor 315 and the current source transistor 316) of the pixel 300 to be read is turned on during row-by-row reading. There is, however, a possibility that this driving method causes circuit noise of the pre-stage source follower to propagate to the subsequent stages (capacitor element, and post-stage source follower and ADC), and readout noise increases accordingly.

For example, in the first embodiment, as depicted in the drawing, kTC noise generated in a pixel during the global shutter operation is 450 (µVrms). Furthermore, noise generated in the pre-stage source follower (the pre-stage amplification transistor 315 and the current source transistor 316) during the row-by-row reading is 380 (µVrms). Noise generated in the pre-stage source follower and the subsequent stages is 160 (µVrms). Therefore, the total noise is 610 (µVrms). As described above, in the first embodiment, a proportion of the noise of the pre-stage source follower in the total noise becomes relatively large.

In order to reduce the noise of the pre-stage source follower in the seventh embodiment, the voltage (Vs) that can be adjusted is supplied to the source of the pre-stage source follower as described above. During the global shutter (exposure) operation, the switching unit 440 selects the power supply voltage VDD and supplies the selected power supply voltage as the source voltage Vs. Then, after the end of exposure, the switching unit 440 switches the source voltage Vs to VDD−Vgs−Vft. Furthermore, the timing control circuit 212 turns on the pre-stage current source transistor 316 during the global shutter (exposure) operation, and turns off the pre-stage current source transistor 316 after the end of exposure.

As depicted in FIGS. 36 and 37, the above-described control makes the potential of the pre-stage node during the global shutter operation and the potential during the row-by-row reading identical to each other and thus allows an improvement in PRNU. Furthermore, since the pre-stage source follower is in the off state during the row-by-row reading, circuit noise of the source follower does not occur and becomes zero (µVrms) as depicted in FIG. 38. Note that, in the pre-stage source follower, the pre-stage amplification transistor 315 is in the on state.

As described above, according to the seventh embodiment of the present technology, since the pre-stage source follower is brought into the off state at the time of reading, noise generated in the source follower can be reduced.

8. Eighth Embodiment

In the VD.GS of the first embodiment described above, the conversion efficiency at which charges are converted into a voltage is constant, but this configuration cannot expand the dynamic range while suppressing an increase in frame rate. A solid-state imaging element 200 of this eighth embodiment is different from the solid-state imaging element 200 of the first embodiment in that the conversion efficiency is switched on the basis of a comparison result between the signal level and a threshold.

Figure 39:
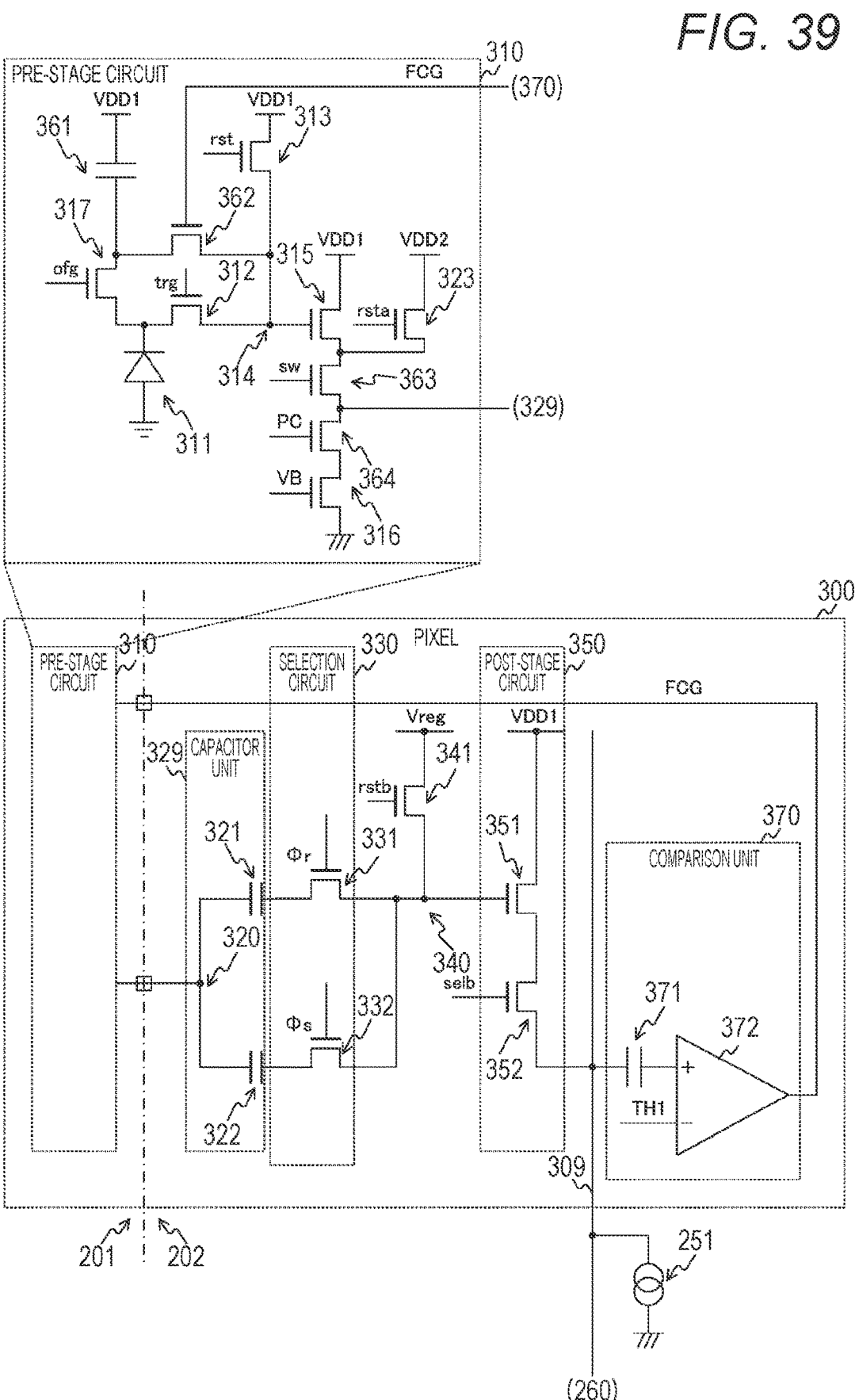
FIG. 39 is a circuit diagram depicting a configuration example of a pixel according to an eighth embodiment of the present technology.

FIG. 39 is a circuit diagram depicting a configuration example of the pixel 300 according to the eighth embodiment of the present technology. The pixel 300 of this eighth embodiment includes the pre-stage circuit 310, a capacitor unit 329, the selection circuit 330, the post-stage reset transistor 341, the post-stage circuit 350, and a comparison unit 370.

In a case where the upper pixel chip 201 and the lower pixel chip 202 are stacked on top of each other, for example, the pre-stage circuit 310 is arranged in the upper pixel chip 201, and the post-stage circuits are arranged in the lower pixel chip 202. Note that it is also possible to arrange the elements in the pixel 300 in a single semiconductor substrate without stacking. Furthermore, as depicted in FIG. 17, a stack of three layers is also possible.

Furthermore, the pre-stage circuit 310 includes the photoelectric conversion element 311, the transfer transistor 312, the FD reset transistor 313, the FD 314, the pre-stage amplification transistor 315, and the current source transistor 316 as in the first embodiment. The pre-stage circuit 310 further includes the discharge transistor 317 as in the second embodiment. The pre-stage circuit 310 further includes the pre-stage reset transistor 323 described with reference to FIG. 12. In addition to such elements, the pre-stage circuit 310 further includes an additional capacitor 361, a conversion efficiency control transistor 362, a switching transistor 363, and a precharge transistor 364. As the conversion efficiency control transistor 362, the switching transistor 363, and the precharge transistor 364, for example, an nMOS transistor is used.

The connection configuration of the photoelectric conversion element 311, the transfer transistor 312, the FD reset transistor 313, the FD 314, the pre-stage amplification transistor 315, and the current source transistor 316 is similar to the connection configuration of the first embodiment. In the eighth embodiment, however, the switching transistor 363 and the precharge transistor 364 are interposed between the pre-stage amplification transistor 315 and the current source transistor 316.

The connection configuration of the discharge transistor 317 is similar to the connection configuration of the second embodiment. In the eighth embodiment, however, the additional capacitor 361 is interposed between the discharge transistor 317 and the power supply voltage VDD1.

The conversion efficiency control transistor 362 opens and closes a path between the FD 314 and the additional capacitor 361 in accordance with a control signal FCG from the comparison unit 370. The switching transistor 363 opens and closes a path between the source of the pre-stage amplification transistor 315 and the pre-stage node 320 in accordance with a control signal sw from the vertical scanning circuit 211. The precharge transistor 364 opens and closes a path between the pre-stage node 320 and the current source transistor 316 in accordance with a control signal PC from the vertical scanning circuit 211.

Furthermore, the capacitor unit 329 includes the capacitor elements 321 and 322. As such capacitor elements, for example, an element having a metal insulator metal (MIM) structure is used. The connection configuration of such elements is similar to the connection configuration of the first embodiment. The circuit configuration of the selection circuit 330, the post-stage reset transistor 341, and the post-stage circuit 350 is similar to the circuit configuration of the first embodiment.

The comparison unit 370 includes a capacitor element 371 and a comparator 372. The capacitor element 371 is interposed between the vertical signal line 309 and a non-inverting input terminal (+) of the comparator 372. A predetermined threshold TH1 is input to an inverting input terminal (−) of the comparator 372. The comparator 372 compares the signal level output through the vertical signal line 309 with the threshold TH1, and feeds back the comparison result to the pre-stage circuit 310 as the control signal FCG.

The pre-stage circuit 310 can switch the conversion efficiency used for converting charges into a voltage by turning on and off the conversion efficiency control transistor 362 described above. In a case where the conversion efficiency control transistor 362 is in the off state, charges are converted into a voltage by the FD 314. On the other hand, in a case where the conversion efficiency control transistor 362 is in the on state, the additional capacitor 361 is connected, and charges are converted into a voltage by the additional capacitor 361 and the FD 314. Therefore, the conversion efficiency in a case where the conversion efficiency control transistor 362 is in the off state is higher than the conversion efficiency in a case where the conversion efficiency control transistor 362 is in the on state. Hereinafter, the higher conversion efficiency is referred to as "high conversion gain (HCG)", and the lower conversion efficiency is referred to as "low conversion gain (LCG)".

The signal level output from the post-stage circuit 350 increases as intensity increases. In a case where the signal level is high (that is, intensity is high), it is desirable that the LGC be set. On the other hand, in a case where the signal level is low (that is, intensity is low), it is desirable that the HCG be set. Before the start of reading, the conversion efficiency control transistor 362 is in the off state, and the HCG is set accordingly.

During reading, the pre-stage circuit 310 generates, with the HCG, the signal level before the reset level. The selection transistor 332 shifts to the on state to cause the capacitor element 322 to hold the signal level. The comparison unit 370 compares the signal level generated with the HCG with the threshold TH1.

In a case where the signal level corresponding to the HCG is less than the threshold TH1, the conversion efficiency control transistor 362 is brought into the off state on the basis of the comparison result (FCG), and the conversion efficiency remains at the HCG. The pre-stage circuit 310 generates the reset level with the HCG, and the selection transistor 331 shifts to the on state to cause the capacitor element 321 to hold the reset level. The post-stage circuit 350 reads the reset level and outputs the reset level to the vertical signal line 309.

On the other hand, in a case where the signal level corresponding to the HCG is equal to or greater than the threshold TH1, the conversion efficiency control transistor 362 is brought into the on state on the basis of the comparison result (FCG), and the conversion efficiency is switched to the LCG. The pre-stage circuit 310 generates the signal level with the LCG, and the selection transistor 332 shifts to the on state to cause the capacitor element 322 to hold the signal level. The post-stage circuit 350 reads the signal level and outputs the signal level to the vertical signal line 309. Next, the pre-stage circuit 310 generates the reset level with the LCG, and the selection transistor 331 shifts to the on state to cause the capacitor element 321 to hold the reset level. The post-stage circuit 350 reads the reset level and outputs the reset level to the vertical signal line 309.

In summary, the comparison unit 370 compares the signal level with the threshold TH1 and outputs the comparison result as the control signal FCG. The pre-stage circuit 310 converts charges into a voltage (the signal level or the reset level) at a conversion efficiency selected from the HCG and the LCG on the basis of the control signal FCG (comparison result) and outputs the voltage. The capacitor unit 329 holds the voltage. The post-stage circuit 350 reads the held voltage and outputs the voltage to the vertical signal line 309.

Furthermore, adding the discharge transistor 317 makes it possible to suppress, as described above in the second embodiment, variations in potential of the FD 314 and the pre-stage node 320 due to overflow charges during the FD reset.

Furthermore, providing the pre-stage reset transistor 323 makes it possible to initialize, as described above with reference to FIG. 12, the level of the pre-stage node 320 with the power supply voltage VDD2.

Furthermore, the vertical scanning circuit 211 brings only the switching transistor 363 of the switching transistor 363 and the precharge transistor 364 into the on state in the exposure period in accordance with the control signals sw and PC. Next, the vertical scanning circuit 211 brings only the precharge transistor 364 into the on state in the exposure period in accordance with the control signals sw and PC. At the time of reading, both the switching transistor 363 and the precharge transistor 364 are controlled to the off state. This control allows a reduction in influence of noise generated in the current source transistor 316.

Note that although the discharge transistor 317 and the pre-stage reset transistor 323 are arranged, a configuration where one or both of the elements are not arranged may be employed. Furthermore, although the switching transistor 363 and the precharge transistor 364 are arranged, a configuration where neither of the elements is arranged may be employed. Furthermore, although the additional capacitor 361 is arranged, a configuration where the additional capacitor 361 is not arranged may be employed.

Figure 40:
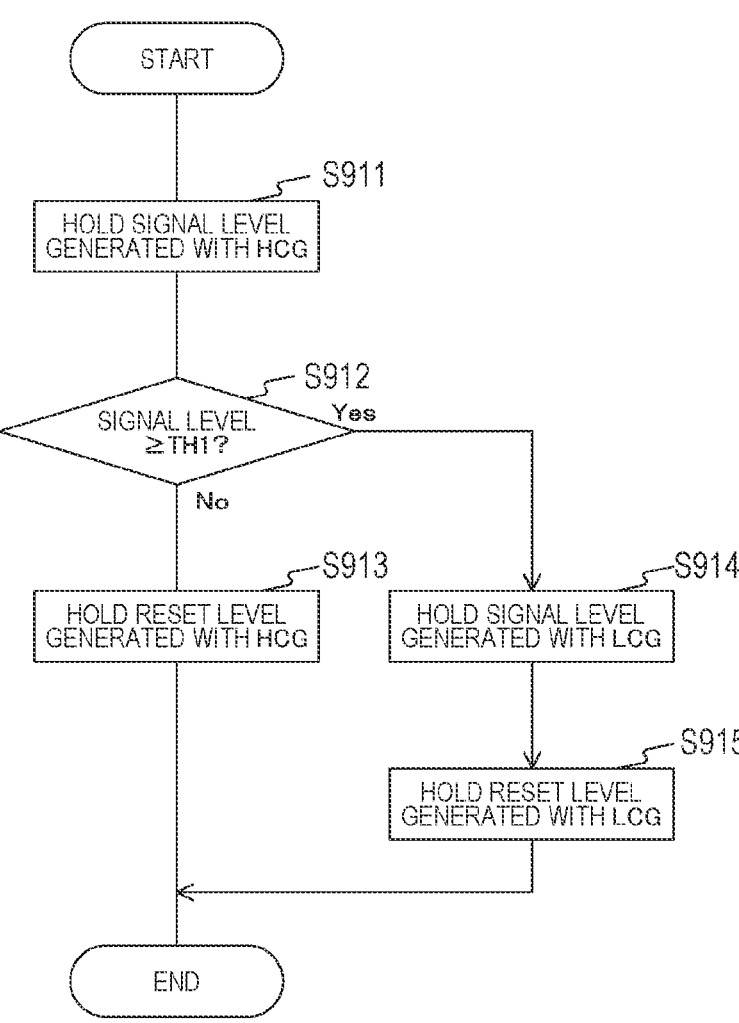
FIG. 40 is a flowchart depicting an example of a read operation of a solid-state imaging element according to the eighth embodiment of the present technology.

FIG. 40 is a flowchart depicting an example of a read operation of the solid-state imaging element 200 according to the eighth embodiment of the present technology. This read operation is performed every time a row is selected during the read period after the exposure period.

Each pixel 300 in the selected row generates the signal level with the HCG and holds the signal level (step S911). The comparison unit 370 in the pixel 300 determines whether or not the signal level is equal to or greater than the threshold TH1 (step S912). In a case where the signal level is less than the threshold TH1 (step S912: No), the pixel 300 generates the reset level with the HCG and holds the reset level (step S913).

On the other hand, in a case where the signal level is equal to or greater than the threshold TH1 (step S912: Yes), the pixel 300 switches the conversion efficiency to the LCG, and generates and holds the signal level (step S914). Then, the pixel 300 generates the reset level with the LCG and holds the reset level (step S915). After step S913 or S915, the read operation for one row is brought to an end.

As depicted in the drawing, switching the conversion efficiency for each pixel in accordance with the intensity threshold makes it possible to expand the dynamic range of image data as compared with a case where the conversion efficiency is not switched.

Here, a configuration where the comparison unit 370 is not provided, and the number of the capacitor elements in the capacitor unit 329 and the number of the selection transistors in the selection circuit 330 are doubled is assumed as a second comparative example.

Figure 41:
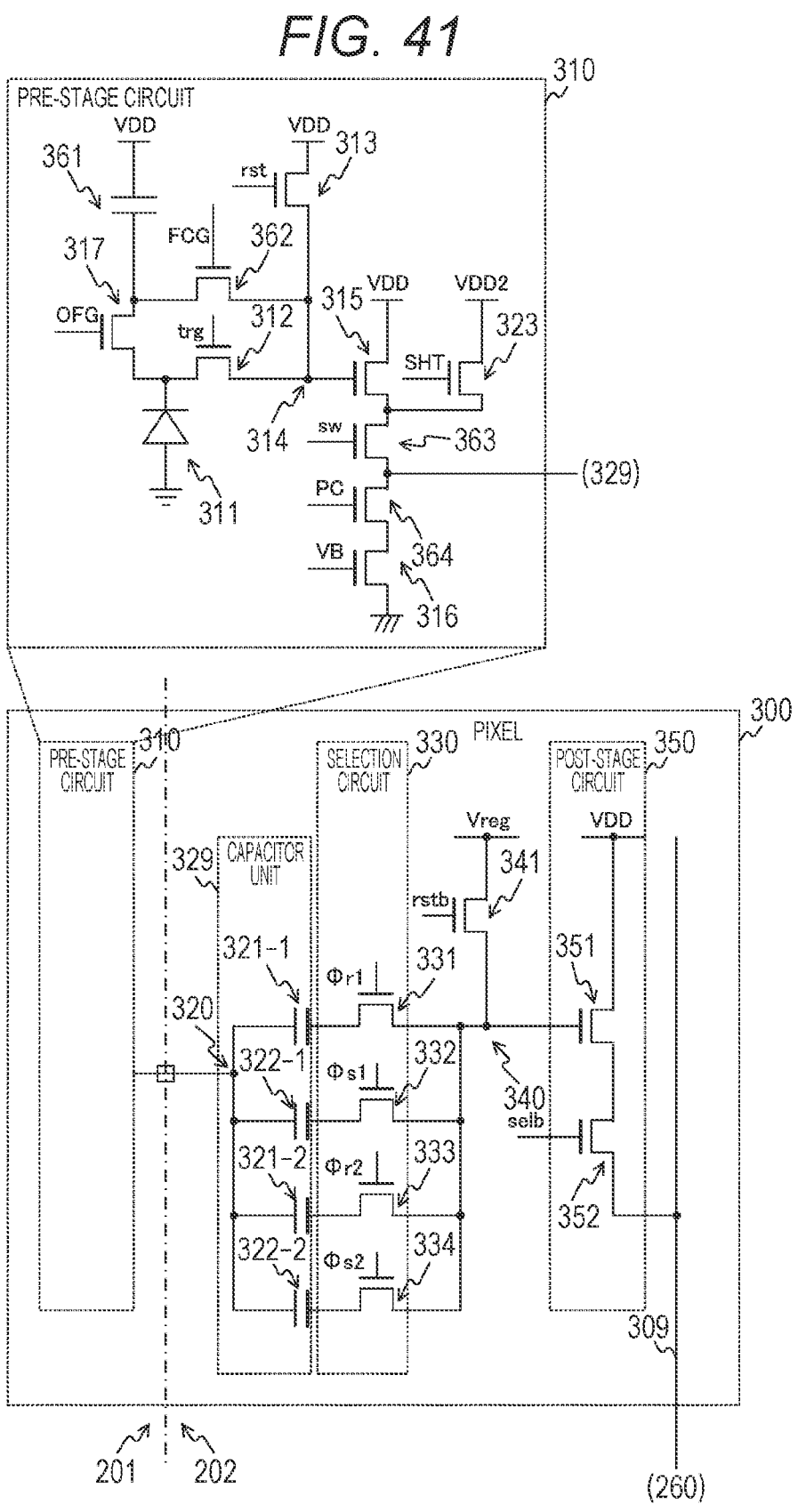
FIG. 41 is a circuit diagram depicting a configuration example of a pixel according to a second comparative example.

FIG. 41 is a circuit diagram depicting a configuration example of a pixel 300 according to the second comparative example. As depicted in the drawing, in the second comparative example, the comparison unit 370 is not arranged, and the control signal FCG generated by the vertical scanning circuit 211 is input to the conversion efficiency control transistor 362. Furthermore, capacitor elements 321-1 and 322-1 are arranged instead of the capacitor elements 321 and 322, and capacitor elements 321-2 and 322-2 and selection transistors 333 and 334 are further arranged.

The capacitor elements 321-2 and 322-2 have their respective one ends commonly connected to the pre-stage node 320. Selection signals φr1 and φs1 are input to the selection transistors 331 and 332, respectively. Furthermore, the selection transistor 333 opens and closes a path between the capacitor element 321-2 and the post-stage node 340 in accordance with a selection signal Φr2. The selection transistor 334 opens and closes a path between the capacitor element 322-2 and the post-stage node 340 in accordance with a selection signal Φs2.

In a case where the dynamic range is expanded in the second comparative example, the pixel 300 sequentially generates and holds the signal level and the reset level with the HCG, and then switches to the LCG to sequentially generate and hold the signal level and the reset level. It is therefore necessary to read a voltage four times for each row, which increases the number of times of reading as compared with the first embodiment.

As depicted in the drawing, in the second comparative example without the comparison unit 370, both the number of capacitor elements (MIM) and the number of selection transistors increase. In a case where the area of the pixel 300 is uniform, the capacitance value of each MIM decreases as the number of MIMs is increased. When the capacitance value of the MIM decreases, dark current noise or SN characteristics deteriorate. As a result, there is a possibility that image quality deteriorates. Furthermore, in the second comparative example, since the voltage is held for each row and the number of times of reading increases as described above, the frame rate decreases.

On the other hand, according to the eighth embodiment in which the comparison unit 370 is provided, since the conversion efficiency is switched on the basis of the comparison result, the number of capacitor elements (MIMs) and the number of selection transistors can be each reduced to half of a corresponding number according to the second comparative example. The reduction in the number of MIMs allows an increase in the capacitance value of each MIM as compared with the second comparative example, and makes it possible to suppress dark current noise and deterioration of SN characteristics. Furthermore, in a case of an image sensor in which high dynamic range characteristics are limited by transition SN characteristics at the time of switching the conversion efficiency, the SN characteristics are improved due to a reduction in random noise, so that the eighth embodiment allows expansion of the dynamic range. Moreover, the reduction in the number of MIMs allows a reduction in the number of times of voltage reading as compared with the second comparative example, so that it is possible to suppress a decrease in frame rate. As described above, it is possible to improve image quality while suppressing a decrease in frame rate.

Note that the third embodiment or the seventh embodiment may also be applied to the eighth embodiment.

As described above, according to the eighth embodiment of the present technology, since the pre-stage circuit 310 switches the conversion efficiency on the basis of the comparison result of the comparison unit 370, the number of capacitor elements (MIMs) can be reduced as compared with the second comparative example. It is therefore possible to improve image quality while suppressing an increase in frame rate.

9. Ninth Embodiment

In the VD.GS of the eighth embodiment described above, the conversion efficiency is switched in two levels of the HCG and the LCG, but there is a possibility that the two levels are not sufficient for control for appropriate conversion efficiency. A solid-state imaging element 200 of this ninth embodiment is different from the solid-state imaging element 200 of the eighth embodiment in that the conversion efficiency is switched in three levels.

Figure 42:
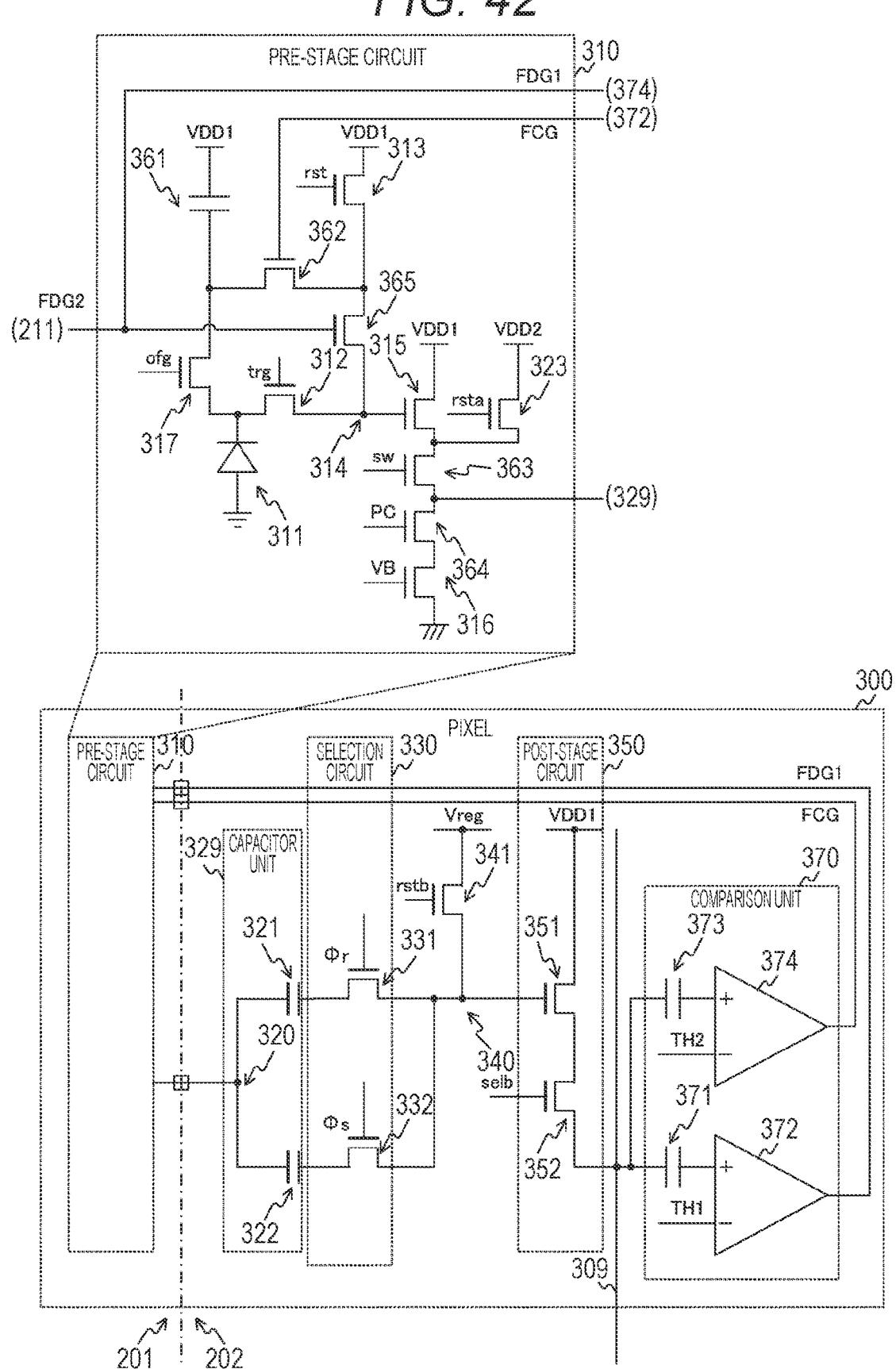
FIG. 42 is a circuit diagram depicting a configuration example of a pixel according to a ninth embodiment of the present technology.

FIG. 42 is a circuit diagram depicting a configuration example of the pixel 300 according to the ninth embodiment of the present technology. The pixel 300 of this ninth embodiment is different from the pixel 300 of the eighth embodiment in that a conversion efficiency control transistor 365, a capacitor element 373, and a comparator 374 are further provided. As the conversion efficiency control transistor 365, for example, an nMOS transistors is used. Note that the conversion efficiency control transistors 365 and 362 are examples of first and second conversion efficiency control transistors described in the claims.

The capacitor element 373 is interposed between the vertical signal line 309 and a non-inverting input terminal (+) of the comparator 374. A predetermined threshold TH2 is input to an inverting input terminal (−) of the comparator 374. The comparator 374 compares the signal level output through the vertical signal line 309 with the threshold TH2, and feeds back the comparison result to the pre-stage circuit 310 as the control signal FCG. The comparator 372 of the ninth embodiment feeds back the comparison result as a control signal FDG1. Note that the thresholds TH1 and TH2 are examples of first and second thresholds described in the claims. Furthermore, the comparators 372 and 374 are examples of first and second comparators described in the claims.

The conversion efficiency control transistor 365 opens and closes a path between a connection node between the FD reset transistor 313 and the conversion efficiency control transistor 362 and the FD 314 in accordance with the control signal FDG1 from the comparison unit 370. Furthermore, a control signal FDG2 from the vertical scanning circuit 211 is also input to a gate of the conversion efficiency control transistor 365. When initializing the FD 314, the vertical scanning circuit 211 brings the FD reset transistor 313 and the conversion efficiency control transistor 365 into the on state over the pulse period in accordance with the FD reset signal rst and the control signal FDG2.

A case where only the conversion efficiency control transistor 365 of the conversion efficiency control transistors 362 and 365 is in the on state is lower in conversion efficiency than a case where both the conversion efficiency control transistors 362 and 365 are in the off state. Furthermore, a case where both the conversion efficiency control transistors 362 and 365 are in the on state is lower in conversion efficiency than the case where only the conversion efficiency control transistor 365 is in the on state. As described above, the conversion efficiency is controlled in three levels. Among the three levels, the highest conversion efficiency is referred to as HCG, and the lowest conversion efficiency is referred to as LCG. Furthermore, a conversion efficiency between the HCG and the LCG is referred to as "middle conversion gain (MCG)". Switching the conversion efficiency in three levels allows control for more appropriate conversion efficiency as compared with a case where of the conversion efficiency is switched in two levels.

Note that although the conversion efficiency has three levels, the conversion efficiency may have four or more levels. In a case where the conversion efficiency has four or more levels, it is only required that an additional capacitor, a conversion efficiency control transistor, and a comparator be added in accordance with the number of levels.

Figure 43:
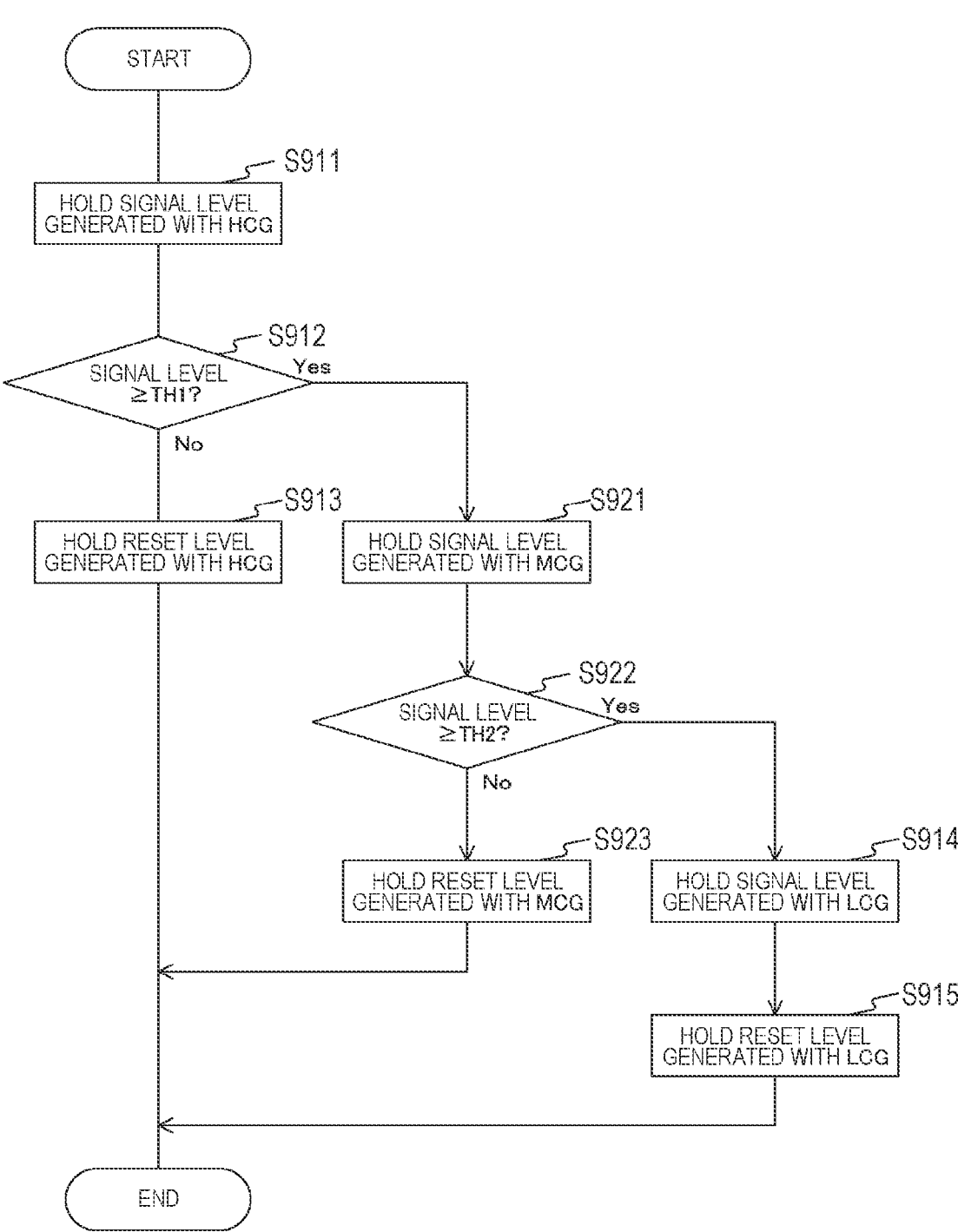
FIG. 43 is a flowchart depicting an example of a read operation of a solid-state imaging element according to the ninth embodiment of the present technology.

FIG. 43 is a flowchart depicting an example of a read operation of the solid-state imaging element 200 according to the ninth embodiment of the present technology. The read operation of the ninth embodiment is different from the read operation of the eighth embodiment in that steps S921 to S923 are further executed.

In a case where the signal level is equal to or greater than the threshold TH1 (step S912: Yes), the pixel 300 switches the conversion efficiency to the MCG and generates and holds the signal level (step S921). Then, the comparison unit 370 determines whether or not the signal level is equal to or greater than the threshold TH2 (step S922). In a case where the signal level is less than the threshold TH1 (step S922: No), the pixel 300 generates the reset level with the MCG and holds the reset level (step S923).

In a case where the signal level is equal to or greater than the threshold TH2 (step S922: Yes), the pixel 300 executes steps S914 and S915. After step S913, S923, or S915, the read operation for one row is brought to an end.

Figure 44:
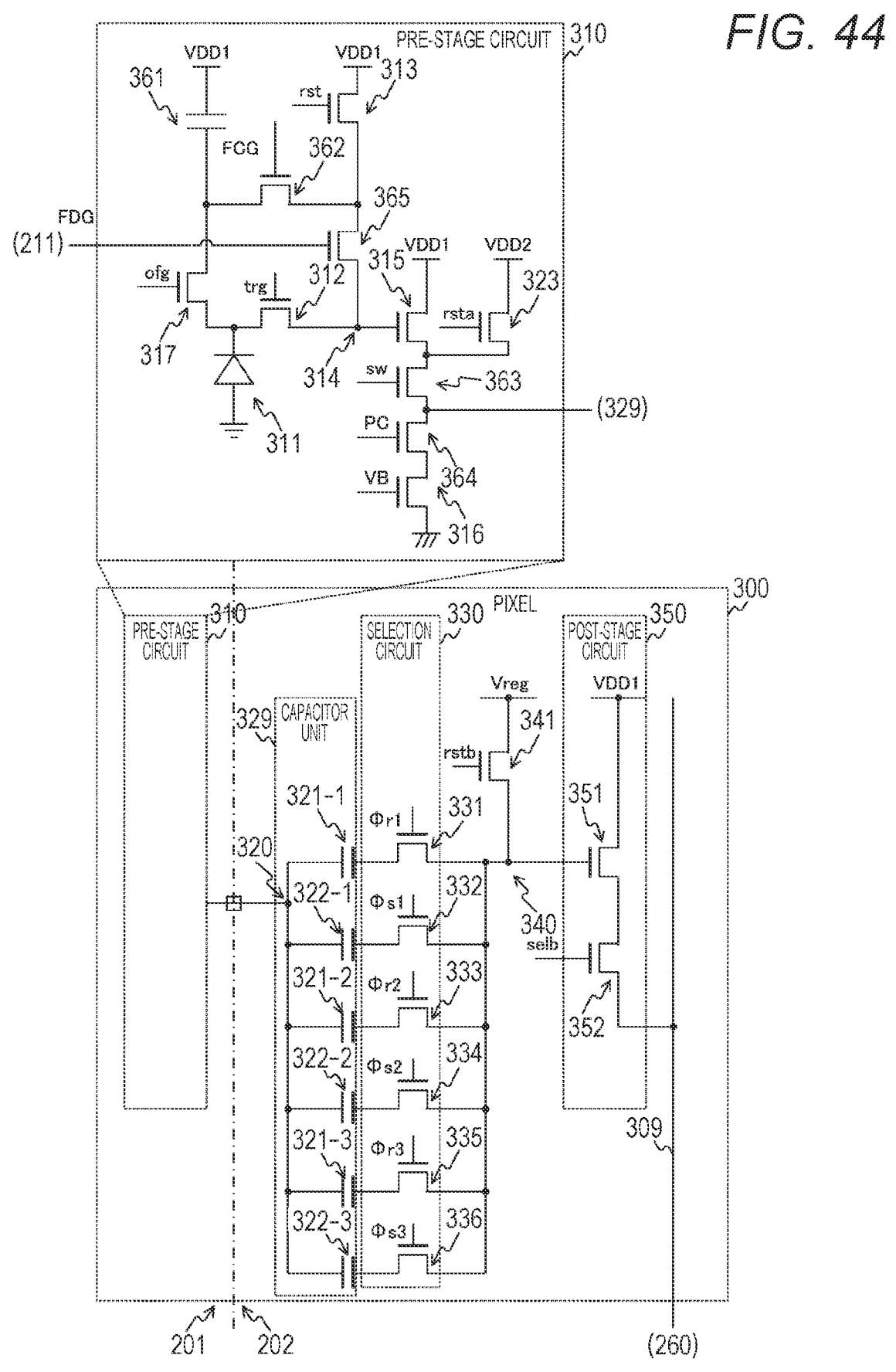

FIG. 44 is a circuit diagram depicting a configuration example of the pixel 300 according to the second comparative example with three levels of conversion efficiency. In the second comparative example where the comparison unit 370 is not provided, in a case where the number of levels of the conversion efficiency is increased to three levels, it is necessary to add capacitor elements (MIMs) 321-3 and 322-3 and selection transistors 335 and 336 as depicted in the drawing. As described above, in the second comparative example, it is necessary to increase the number of MIMs in accordance with the number of levels of the conversion efficiency.

Figure 45:
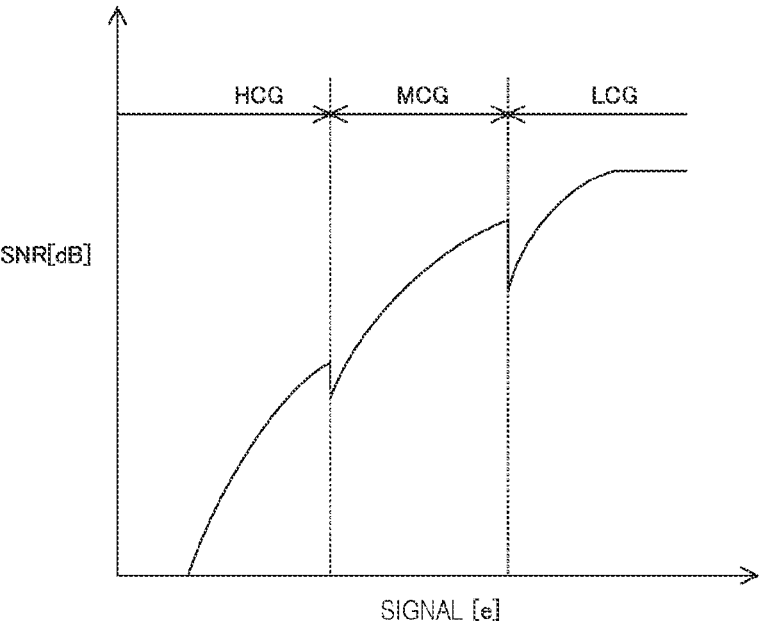
FIG. 45 is a graph depicting an example of SN characteristics according to the second comparative example with three levels of conversion efficiency.

FIG. 45 is a graph depicting an example of SN characteristics according to the second comparative example with the three levels of conversion efficiency. In the drawing, the vertical axis represents a signal-noise ratio (SNR), and the horizontal axis represents a signal level. As depicted in the drawing, there is a difference in SNR when the HCG is switched to the MCG and when the MCG is switched to the LCG. In the second comparative example, it is required to improve characteristics of these conversion efficiency transition portions.

According to the eighth embodiment in which the comparison unit 370 is provided, since the conversion efficiency is switched on the basis of the comparison result, the number of capacitor elements (MIMs) and the number of selection transistors can be each reduced to one third of a corresponding number according to the second comparative example. The reduction in the number of MIMs makes it possible to reduce a difference at each transition portion in FIG. 45 to improve SN characteristics as compared with the second comparative example. Furthermore, the frame rate can be increased as compared with the second comparative example.

As described above, according to the ninth embodiment of the present technology, since the conversion efficiency is switched in the three levels on the basis of the comparison result between the thresholds TH1 and TH2 and the signal level, it is possible to achieve control for more appropriate conversion efficiency as compared with the case where the conversion efficiency is switched in two levels.

10. Tenth Embodiment

In the VD.GS of the ninth embodiment described above, the signal level held in the capacitor unit 329 is compared with the threshold, but it is difficult for this configuration to further increase the frame rate. A solid-state imaging element 200 of this tenth embodiment is different from the solid-state imaging element 200 of the ninth embodiment in that a signal level before being held in the capacitor unit 329 is compared with a threshold.

Figure 46:
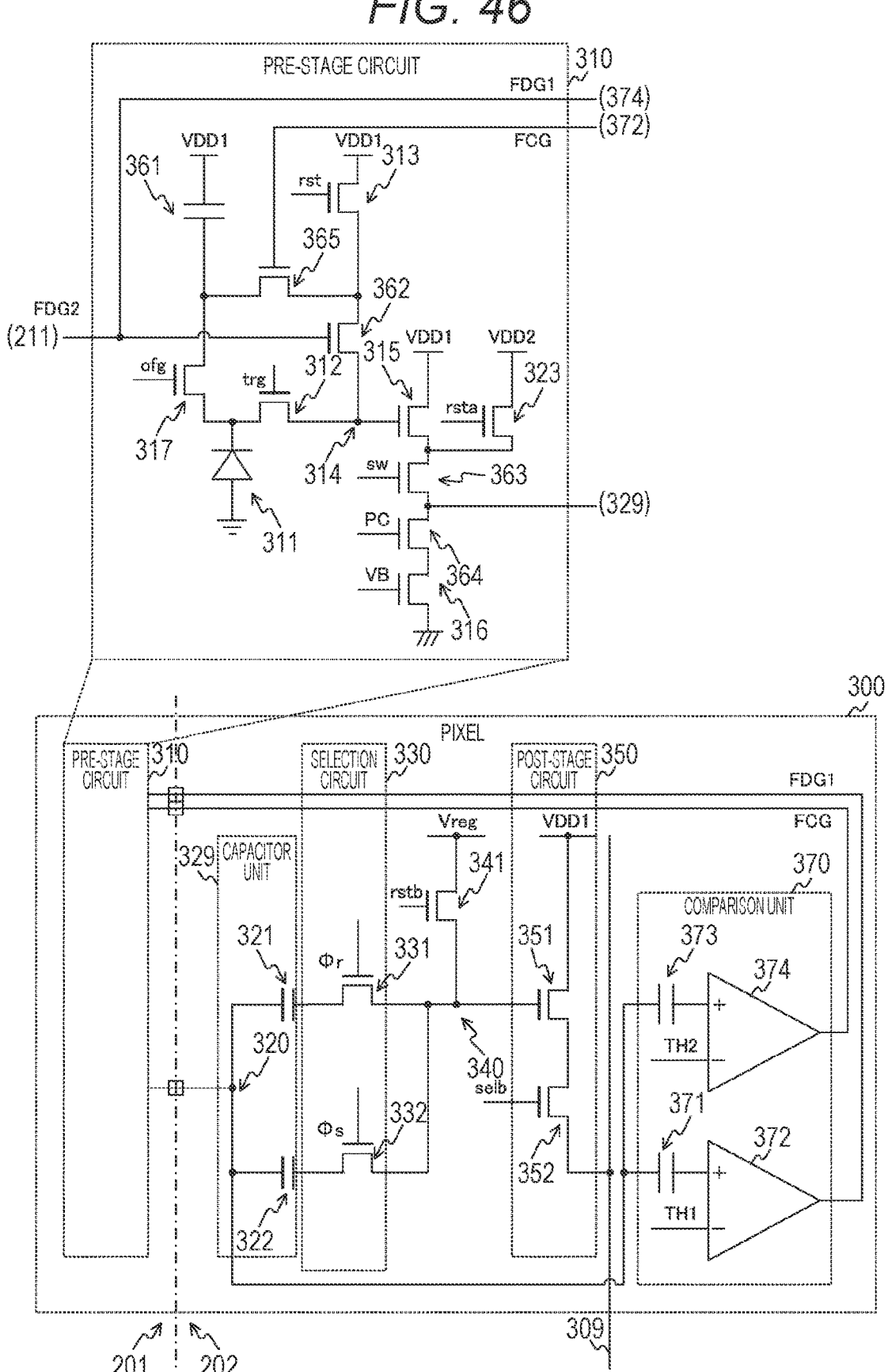
FIG. 46 is a circuit diagram depicting a configuration example of a pixel according to a tenth embodiment of the present technology.

FIG. 46 is a circuit diagram depicting a configuration example of the pixel 300 according to the tenth embodiment of the present technology. The pixel 300 of the tenth embodiment is different from the pixel 300 of the ninth embodiment in that the comparison unit 370 compares the signal level output from the pre-stage circuit 310 with the thresholds TH1 and TH2.

Figure 47:
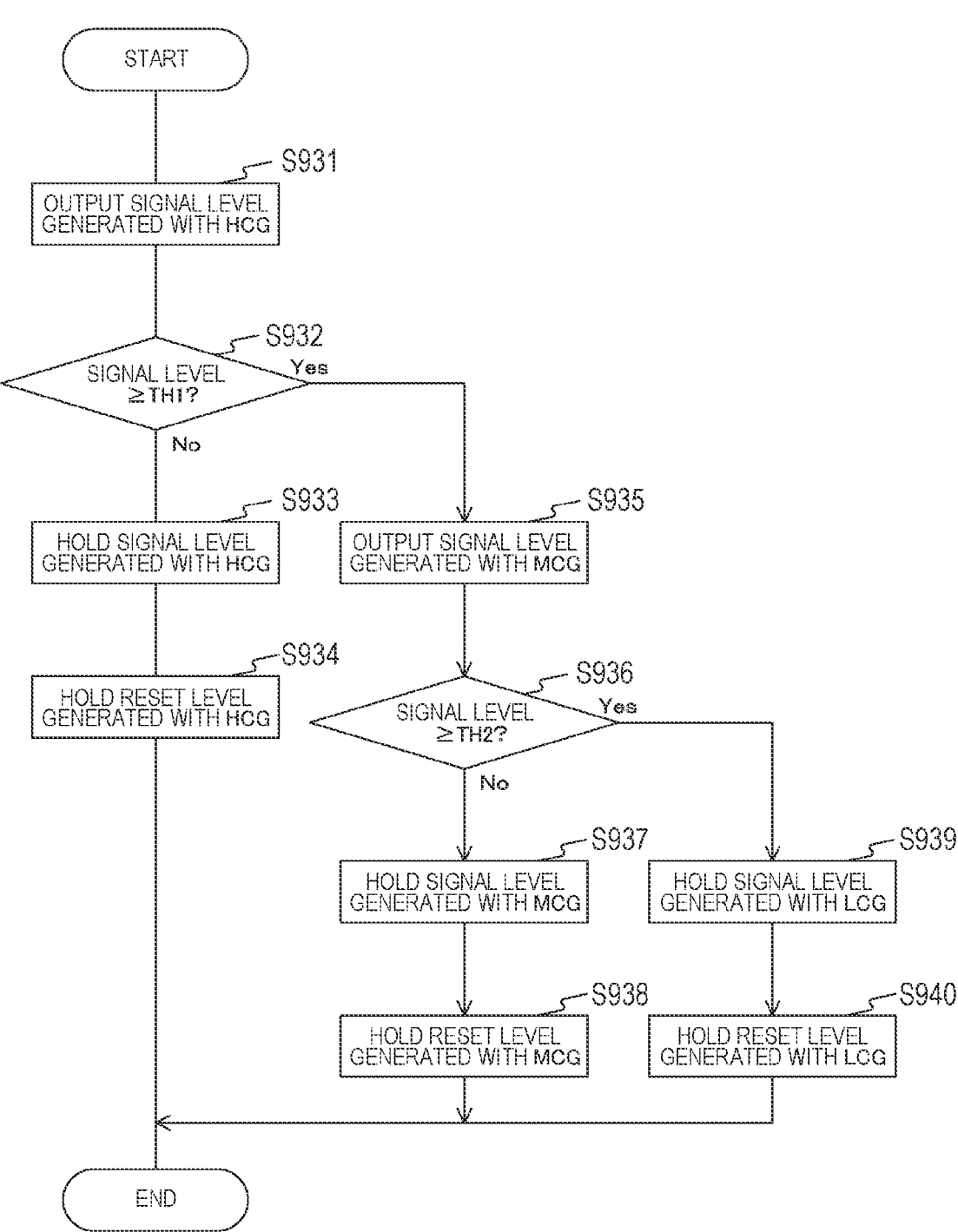
FIG. 47 is a flowchart depicting an example of a read operation of a solid-state imaging element according to the tenth embodiment of the present technology.

FIG. 47 is a flowchart depicting an example of a read operation of the solid-state imaging element 200 according to the tenth embodiment of the present technology. The pre-stage circuit 310 in the pixel 300 generates the signal level with the HCG and outputs the signal level (step S931). The comparison unit 370 determines whether or not the signal level is equal to or greater than the threshold TH1 (step S932). In a case where the signal level is less than the threshold TH1 (step S932: No), the pixel 300 holds the signal level corresponding to the HCG (step S933), and generates the reset level with the HCG and holds the reset level (step S934).

On the other hand, in a case where the signal level is equal to or greater than the threshold TH1 (step S932: Yes), the pre-stage circuit 310 switches the conversion efficiency to the MCG and generates and outputs the signal level (step S935). The comparison unit 370 determines whether or not the signal level is equal to or greater than the threshold TH2 (step S936). In a case where the signal level is less than the threshold TH2 (step S936: No), the pixel 300 holds the signal level corresponding to the MCG (step S937), and generates the reset level with the MCG and holds the reset level (step S938).

In a case where the signal level is equal to or greater than the threshold TH2 (step S936: Yes), the pre-stage circuit 310 switches the conversion efficiency to the LCG, generates and holds the signal level (step S939), and generates the reset level with the LCG and holds the reset level (step S940). After steps S934, S938, or S940, the read operation for one row is brought to an end.

As depicted in the drawing, the comparison unit 370 compares the signal level before being held in the capacitor unit 329 with the threshold, so that it is possible to speed up the reading as compared with a case where the held signal level is compared with the threshold. It is therefore possible to increase the frame rate.

Note that although the conversion efficiency has three levels according to the tenth embodiment, the conversion efficiency may have two levels as in the eighth embodiment.

In a case where the conversion efficiency has two levels, it is only required to remove the conversion efficiency control transistor 365, the capacitor element 373, and the comparator 374. Furthermore, in the tenth embodiment, the conversion efficiency may have four or more levels.

As described above, according to the tenth embodiment of the present technology, since the comparison unit 370 compares the signal level before being held in the capacitor unit 329 with the threshold, the frame rate can be increased.

11. Example of Application to Mobile Body

The technology according to the present disclosure (the present technology) can be applied to various products. For example, the technology according to the present disclosure may be implemented as a device mounted on any type of mobile body such as an automobile, an electric vehicle, a hybrid electric vehicle, a motorcycle, a bicycle, a personal mobility, an airplane, a drone, a ship, a robot, and the like.

Figure 48:
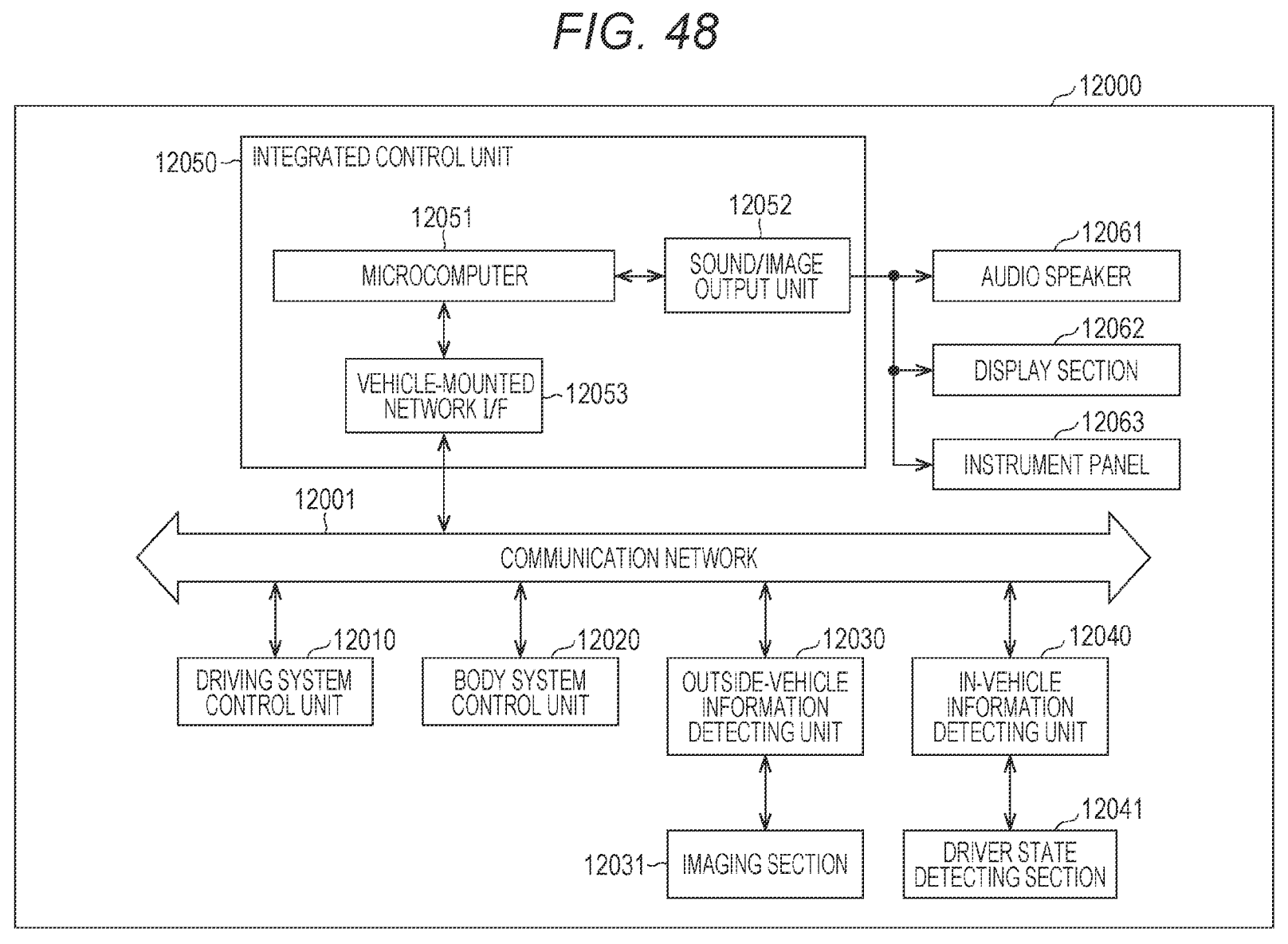

FIG. 48 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 48, the vehicle control system 12000 includes a driving system control unit 12010, a body system control unit 12020, an outside-vehicle information detecting unit 12030, an in-vehicle information detecting unit 12040, and an integrated control unit 12050. Furthermore, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the information about the outside of the vehicle obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 48, an audio speaker 12061, a display section 12062, and an instrument panel 12063 are illustrated as the output device. The display section 12062 may, for example, include at least one of an on-board display and a head-up display.

Figure 49:
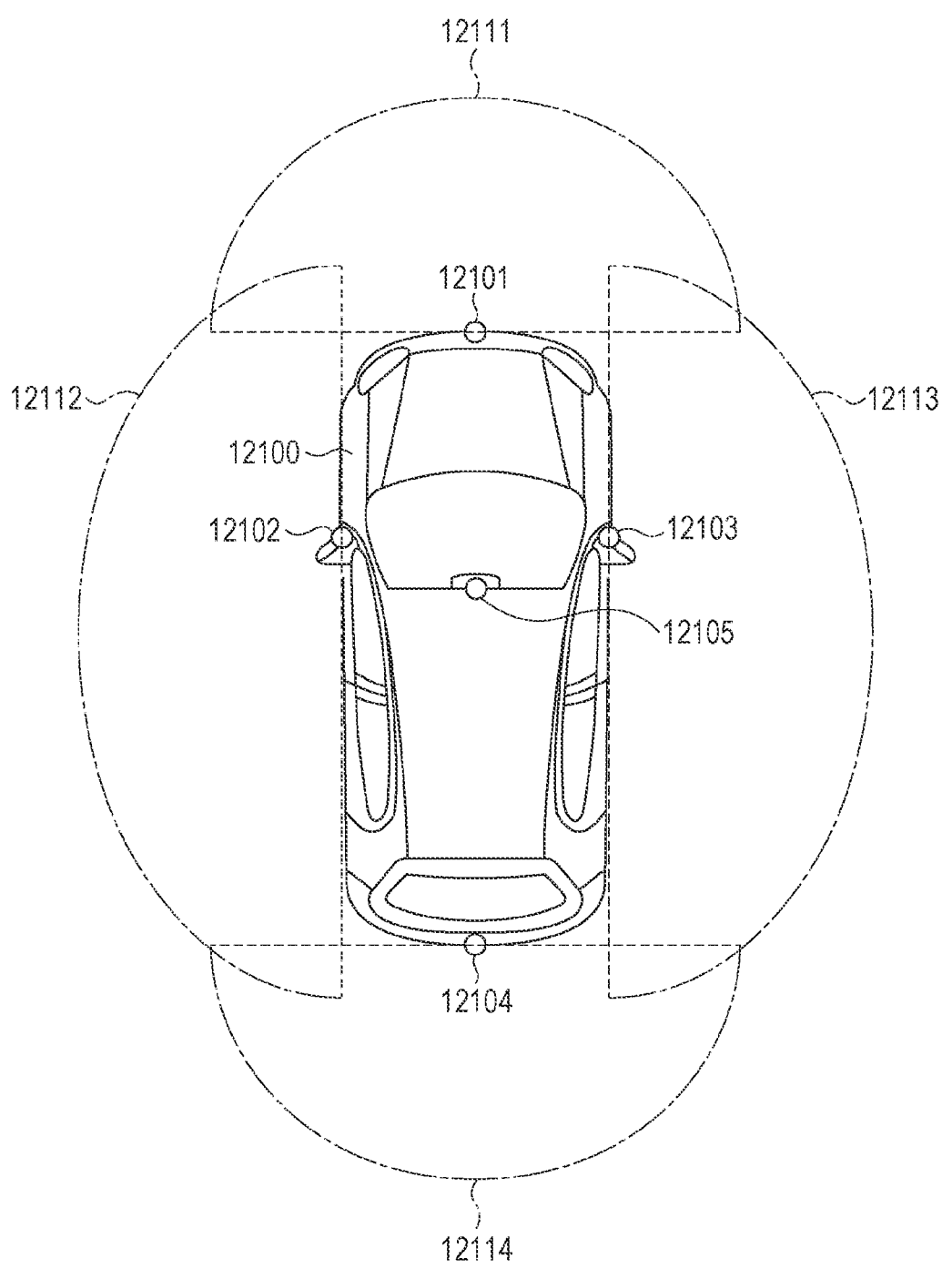
FIG. 49 is an explanatory diagram depicting an example of an installation position of an imaging section.

FIG. 49 is a diagram depicting an example of the installation position of the imaging section 12031.

In FIG. 49, the imaging section 12031 includes imaging sections 12101, 12102, 12103, 12104, and 12105.

The imaging sections 12101, 12102, 12103, 12104, 12105 are provided, for example, at positions such as a front nose, sideview mirrors, a rear bumper, and a back door of a vehicle 12100 as well as an upper portion of a windshield in the interior of the vehicle 12100. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 49 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to an embodiment of the present disclosure can be applied to the imaging section 12031 among the configurations described above. Specifically, for example, the imaging device 100 in FIG. 1 can be applied to the imaging section 12031. By applying the technology according to an embodiment of the present disclosure to the imaging section 12031, kTC noise can be reduced, and a more easily viewable captured image can be obtained, so that driver's fatigue can be reduced.

Note that the embodiments described above show examples for embodying the present technology, and the matters in the embodiments and the matters specifying the invention in the claims have corresponding relationships, respectively. Similarly, the matters specifying the invention in the claims and matters with the same names in the embodiments of the present technology have correspondence relationships, respectively. However, the present technology is not limited to the embodiments, and can be embodied by applying various modifications to the embodiments without departing from the gist of the present technology.

Note that effects described in the present specification are merely examples and are not limited, and other effects may be provided.

Note that the present technology may also have the following configuration.

(1) A solid-state imaging element including:
a comparison unit configured to compare a signal level corresponding to an exposure amount with a threshold that is predetermined and output a comparison result;
a pre-stage circuit configured to convert charges into a voltage at a conversion efficiency selected from among a plurality of different conversion efficiencies on the basis of the comparison result and output the voltage;
a capacitor unit configured to hold the voltage; and
a post-stage circuit configured to read the voltage held and output the voltage to a vertical signal line.
(2) The solid-state imaging element according to the above (1), in which
the pre-stage circuit selects one of first and second conversion efficiencies, and
the comparison unit includes a comparator configured to compare the signal level with the threshold.
(3) The solid-state imaging element according to the above (1), in which
the pre-stage circuit selects one of first, second, and third conversion efficiencies,
the threshold includes first and second thresholds different from each other, and
the comparison unit includes:
a first comparator configured to compare the signal level with the first threshold; and
a second comparator configured to compare the signal level with the second threshold.
(4) The solid-state imaging element according to any one of the above (1) to (3), in which
the voltage is either a predetermined reset level or the signal level, and
the comparison unit compares the signal level output through the vertical signal line with the threshold.
(5) The solid-state imaging element according to any one of the above (1) to (3), in which
the voltage is either a predetermined reset level or the signal level, and
the comparison unit compares the signal level output from the pre-stage circuit with the threshold.
(6) The solid-state imaging element according to the above (1), in which
the pre-stage circuit includes:
a photoelectric conversion element configured to generate the charges by photoelectric conversion; and
a pre-stage transfer transistor configured to transfer the charges from the photoelectric conversion element to a floating diffusion layer.
(7) The solid-state imaging element according to the above (6), in which
the pre-stage circuit further includes:
an additional capacitor; and
a conversion efficiency control transistor configured to open and close a path between the floating diffusion layer and the additional capacitor on the basis of the comparison result.
(8) The solid-state imaging element according to the above (6), in which
the comparison result includes first and second comparison results, and
the pre-stage circuit further includes:
an additional capacitor;
a second conversion efficiency control transistor configured to open and close a path between the floating diffusion layer and a predetermined node on the basis of the second comparison result; and a first conversion efficiency control transistor configured to open and close a path between the predetermined node and the additional capacitor on the basis of the first comparison result.

(9) The solid-state imaging element according to any one of the above (1) to (8), in which the capacitor unit includes first and second capacitor elements.

(10) The solid-state imaging element according to the above (9), further including:

a selection circuit configured to sequentially perform control to connect one of the first and second capacitor elements to a post-stage node that is predetermined, control to disconnect both of the first and second capacitor elements from the post-stage node, and control to connect another of the first and second capacitor elements to the post-stage node; and a post-stage reset transistor configured to initialize a level of the post-stage node when both of the first and second capacitor elements are disconnected from the post-stage node, in which the post-stage circuit reads, via the post-stage node, the voltage held.

(11) The solid-state imaging element according to the above (10), in which the pre-stage circuit includes:

a photoelectric conversion element;

a pre-stage transfer transistor configured to transfer charges from the photoelectric conversion element to a floating diffusion layer;

a first reset transistor configured to initialize the floating diffusion layer; and a pre-stage amplification transistor configured to amplify a voltage of the floating diffusion layer and output the voltage to a pre-stage node that is predetermined, and the first and second capacitor elements have their respective one ends commonly connected to the pre-stage node and have their respective other ends connected to the selection circuit.

(12) The solid-state imaging element according to the above (11), further including a switching unit configured to adjust a source voltage to be supplied to a source of the pre-stage amplification transistor, in which the pre-stage circuit further includes a current source transistor connected to a drain of the pre-stage amplification transistor, and the current source transistor shifts from an on state to an off state after an end of an exposure period.

(13) The solid-state imaging element according to the above (12), in which the switching unit supplies a power supply voltage that is predetermined as the source voltage during the exposure period, and supplies a generated voltage different from the power supply voltage as the source voltage after the end of the exposure period.

(14) The solid-state imaging element according to the above (11), further including a control circuit configured to control a reset power supply voltage of the pre-stage circuit, in which the first reset transistor initializes the voltage of the floating diffusion layer to the reset power supply voltage, and the control circuit sets, during a read period in which the reset level and the signal level are read, the reset power supply voltage different from the voltage during the exposure period.

(15) The solid-state imaging element according to any one of the above (1) to (14), in which the pre-stage circuit is provided on a first chip, and the capacitor unit and the post-stage circuit are provided on a second chip.

(16) The solid-state imaging element according to the above (15), further including an analog to digital converter configured to sequentially convert the voltage output through the vertical signal line into a digital signal, in which the analog to digital converter is provided on the second chip.

(17) The solid-state imaging element according to the above (15), further including an analog to digital converter configured to sequentially convert the voltage output through the vertical signal line into a digital signal, in which the analog to digital converter is provided on a third chip.

(18) An imaging device including:

a comparison unit configured to compare a signal level corresponding to an exposure amount with a threshold that is predetermined and output a comparison result;

a pre-stage circuit configured to convert charges into a voltage at a conversion efficiency selected from among a plurality of different conversion efficiencies on the basis of the comparison result and output the voltage;

a capacitor unit configured to hold the voltage;

a post-stage circuit configured to read the voltage held and output the voltage as a pixel signal to a vertical signal line; and a signal processing circuit configured to perform predetermined signal processing on the pixel signal.

(19) A method for controlling a solid-state imaging element, the method including:

causing a comparison unit to compare a signal level corresponding to an exposure amount with a threshold that is predetermined and output a comparison result;

causing a pre-stage circuit to convert charges into a voltage at a conversion efficiency selected from among a plurality of different conversion efficiencies on the basis of the comparison result and output the voltage; and causing a post-stage circuit to read the voltage held in a capacitor unit and output the voltage to a vertical signal line.

REFERENCE SIGNS LIST

100 Imaging device
110 Imaging lens
120 Recording unit
130 Imaging control unit
200 Solid-state imaging element
201 Upper pixel chip
202 Lower pixel chip
203 Circuit chip
211 Vertical scanning circuit
212 Timing control circuit
213 DAC
220 Pixel array unit
221 Upper pixel array unit
222 Lower pixel array unit
250 Load MOS circuit block
251 Load MOS transistor
260 Column signal processing circuit
261, 270 ADC
262, 290 Digital signal processing unit
271 Counter
280, 372, 374 Comparator
281, 292 Selector 282, 283, 321, 322, 321-1 to 321-3, 322-1 to 322-3, 371, 373 Capacitor element
284, 286 Auto-zero switch
285 Comparator element
291 CDS processing unit
300 Pixel
301 Effective pixel
310 Pre-stage circuit
311 Photoelectric conversion element
312 Transfer transistor
313 FD reset transistor
314 FD
315 Pre-stage amplification transistor
316 Current source transistor
317 Discharge transistor
323 Pre-stage reset transistor
324 Pre-stage selection transistor
329 Capacitor unit
330 Selection circuit
331, 332, 333, 334, 335, 336 Selection transistor
341 Post-stage reset transistor
350 Post-stage circuit
351 Post-stage amplification transistor
352 Post-stage selection transistor
361 Additional capacitor
362, 365 Conversion efficiency control transistor
363 Switching transistor
364 Precharge transistor
370 Comparison unit
420 Regulator
421 Low-pass filter
422 Buffer amplifier
423 Capacitor element
430 Dummy pixel
431 Reset transistor
432 FD
433 Amplification transistor
434 Current source transistor
440 Switching unit
441 Inverter
442 Switching circuit
443, 444 Switch
12031 Imaging section

The invention claimed is:

1. A solid-state imaging element, comprising:
a comparison unit configured to:
   compare a signal level with a set of thresholds, wherein the signal level corresponds to an exposure amount associated with an exposure of a pixel of the solid-state imaging element; and
   output a comparison result based on the comparison of the signal level with the set of thresholds;
a pre-stage circuit configured to:
   select a conversion efficiency from a plurality of conversion efficiencies based on the comparison result;
   convert charges into a first voltage at the selected conversion efficiency; and
   output the first voltage based on the conversion;
a capacitor unit configured to hold the first voltage, wherein the capacitor unit includes a first capacitor element and a second capacitor element;
a selection circuit configured to sequentially execute control to:
   connect one of the first capacitor element or the second capacitor element to a post-stage node;

disconnect each of the first capacitor element and the second capacitor element from the post-stage node; and
   connect other of the one of the first capacitor element or the second capacitor element to the post-stage node;
a post-stage reset transistor configured to initialize a level of the post-stage node based on the disconnection of each of the first capacitor element and the second capacitor element from the post-stage node; and
a post-stage circuit configured to:
   read the held first voltage via the post-stage node; and
   output a second voltage to a vertical signal line based on the read of the first voltage.

2. The solid-state imaging element according to claim 1, wherein
   the pre-stage circuit is further configured to select one of a first conversion efficiency of the plurality of conversion efficiencies or a second conversion efficiency of the plurality of conversion efficiencies, and
   the comparison unit includes a comparator configured to compare the signal level with the set of thresholds.

3. The solid-state imaging element according to claim 1, wherein
   the pre-stage circuit is further configured to select one of a first conversion efficiency of the plurality of conversion efficiencies, a second conversion efficiency of the plurality of conversion efficiencies, or a third conversion efficiency of the plurality of conversion efficiencies,
   the set of thresholds includes a first threshold and a second threshold,
   the first threshold is different from the second threshold, and
   the comparison unit includes:
      a first comparator configured to compare the signal level with the first threshold; and
      a second comparator configured to compare the signal level with the second threshold.

4. The solid-state imaging element according to claim 1, wherein
   the first voltage is one of a reset level or the signal level,
   the comparison unit is further configured to compare an output signal level with the set of thresholds, and
   the output signal level corresponds to the second voltage that is output through the vertical signal line.

5. The solid-state imaging element according to claim 1, wherein
   the first voltage one of a reset level or the signal level,
   the comparison unit is further configured to compare an output signal level with the set of thresholds, and
   the output signal level corresponds to the first voltage that is output from the pre-stage circuit.

6. The solid-state imaging element according to claim 1, wherein the pre-stage circuit includes:
   a photoelectric conversion element configured to generate the charges by photoelectric conversion; and
   a pre-stage transfer transistor configured to transfer the charges from the photoelectric conversion element to a floating diffusion layer.

7. The solid-state imaging element according to claim 6, wherein the pre-stage circuit further includes:
   an additional capacitor; and
   a conversion efficiency control transistor configured to open and close a path between the floating diffusion layer and the additional capacitor based on the comparison result.

8. The solid-state imaging element according to claim 6, wherein the comparison result includes a first comparison result, the solid-state imaging element further comprises a comparator configured to output a second comparison result, and the pre-stage circuit further includes:

an additional capacitor;

a first conversion efficiency control transistor configured to open and close a first path between the floating diffusion layer and a specific node based on the first comparison result; and a second conversion efficiency control transistor configured to open and close a second path between the specific node and the additional capacitor based on the second comparison result.

9. The solid-state imaging element according to claim 1, wherein the pre-stage circuit includes:

a photoelectric conversion element;

a pre-stage transfer transistor configured to transfer the charges from the photoelectric conversion element to a floating diffusion layer;

a first reset transistor configured to initialize the floating diffusion layer; and a pre-stage amplification transistor configured to:

amplify a third voltage of the floating diffusion layer; and output the first voltage to a pre-stage node based on the amplification of the third voltage, a first end of each of the first capacitor element and the second capacitor element is connected to the pre-stage node, and a second end of the each of the first capacitor element and the second capacitor element is connected to the selection circuit.

10. The solid-state imaging element according to claim 9, further comprising a switching unit configured to:

adjust a source voltage; and supply the adjusted source voltage to a source of the pre-stage amplification transistor, wherein the pre-stage circuit further includes a current source transistor connected to a drain of the pre-stage amplification transistor, and the current source transistor shifts from an on state to an off state based on an end of an exposure period of the exposure of the pixel.

11. The solid-state imaging element according to claim 10, further comprising a regulator configured to generate a generated voltage, wherein the switching unit is further configured to:

supply a power supply voltage as the source voltage during the exposure period; and supply the generated voltage as the source voltage after the end of the exposure period, wherein the generated voltage is different from the power supply voltage.

12. The solid-state imaging element according to claim 9, further comprising a control circuit configured to control a reset power supply voltage of the pre-stage circuit, wherein the first reset transistor configured to initialize the third voltage of the floating diffusion layer to the reset power supply voltage, the control circuit is further configured to set, during a read period, the reset power supply voltage to a fourth voltage, the fourth voltage is different from a value of the reset power supply voltage during an exposure period of the exposure of the pixel, and a reset level of the floating diffusion layer and the signal level are read in the read period.

13. The solid-state imaging element according to claim 1, further comprising:

a first chip that includes the pre-stage circuit; and a second chip that includes the capacitor unit and the post-stage circuit.

14. The solid-state imaging element according to claim 13, further comprising an analog to digital converter configured to sequentially convert the second voltage into a digital signal, wherein the second voltage is output through the vertical signal line, and the second chip includes the analog to digital converter.

15. The solid-state imaging element according to claim 13, further comprising:

an analog to digital converter configured to sequentially convert the second voltage into a digital signal, wherein the second voltage is output through the vertical signal line; and a third chip that includes the analog to digital converter.

16. An imaging device, comprising:

a comparison unit configured to:

compare a signal level with a threshold, wherein the signal level corresponds to an exposure amount associated with an exposure of a pixel of the imaging device; and output a comparison result based on the comparison of the signal level with the threshold;

a pre-stage circuit configured to:

select a conversion efficiency from a plurality of conversion efficiencies based on the comparison result;

convert charges into a first voltage at the selected conversion efficiency; and output the first voltage based on the conversion;

a capacitor unit configured to hold the first voltage, wherein the capacitor unit includes a first capacitor element and a second capacitor element;

a selection circuit configured to sequentially execute control to:

connect one of the first capacitor element or the second capacitor element to a post-stage node;

disconnect each of the first capacitor element and the second capacitor element from the post-stage node; and connect other of the one of the first capacitor element or the second capacitor element to the post-stage node;

a post-stage reset transistor configured to initialize a level of the post-stage node based on the disconnection of each of the first capacitor element and the second capacitor element from the post-stage node;

a post-stage circuit configured to:

read the held first voltage via the post-stage node; and output a second voltage to a vertical signal line based on the read of the first voltage, wherein the second voltage is output as a pixel signal; and a signal processing circuit configured to execute a signal processing operation on the pixel signal.

17. A method for controlling a solid-state imaging element, the method comprising:

controlling a comparison unit to:

compare a signal level with a threshold, wherein the signal level corresponds to an exposure amount associated with an exposure of a pixel of the solid-state imaging element; and output a comparison result based on the comparison of the signal level with the threshold;

controlling a pre-stage circuit to:

select a conversion efficiency from a plurality of conversion efficiencies based on the comparison result;

convert charges into a first voltage at the selected conversion efficiency; and output the first voltage based on the conversion;

controlling a capacitor unit to hold the first voltage, wherein the capacitor unit includes a first capacitor element and a second capacitor element;

controlling a selection circuit to sequentially execute control to:

connect one of the first capacitor element or the second capacitor element to a post-stage node;

disconnect each of the first capacitor element and the second capacitor element from the post-stage node; and connect other of the one of the first capacitor element or the second capacitor element to the post-stage node;

controlling a post-stage reset transistor to initialize a level of the post-stage node based on the disconnection of the each of the first capacitor element and the second capacitor element from the post-stage node; and controlling a post-stage circuit to:

read the held first voltage via the post-stage node; and output a second voltage to a vertical signal line based on the read of the first voltage.

* * * * *